(12) United States Patent
Koyama

(10) Patent No.: US 8,991,942 B2
(45) Date of Patent: Mar. 31, 2015

(54) BRAKE CONTROL APPARATUS

(75) Inventor: Kotaro Koyama, Isehara (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 483 days.

(21) Appl. No.: 13/446,018

(22) Filed: Apr. 13, 2012

(65) Prior Publication Data

US 2012/0319465 A1 Dec. 20, 2012

(30) Foreign Application Priority Data

Jun. 15, 2011 (JP) .................................. 2011-132770

(51) Int. Cl.
| | | |
|---|---|---|
| B60T 13/18 | (2006.01) | |
| B60T 13/74 | (2006.01) | |
| B60T 8/64 | (2006.01) | |
| B60T 1/10 | (2006.01) | |
| B60T 7/04 | (2006.01) | |
| B60T 8/40 | (2006.01) | |
| B60T 8/44 | (2006.01) | |
| B60T 8/48 | (2006.01) | |
| B60T 13/58 | (2006.01) | |
| B60T 13/66 | (2006.01) | |
| B60T 13/68 | (2006.01) | |
| B60W 10/08 | (2006.01) | |
| B60W 10/188 | (2012.01) | |
| B60W 30/18 | (2012.01) | |

(52) U.S. Cl.
CPC . *B60T 1/10* (2013.01); *B60T 7/042* (2013.01); *B60T 8/4059* (2013.01); *B60T 8/442* (2013.01); *B60T 8/4872* (2013.01); *B60T 13/588* (2013.01); *B60T 13/662* (2013.01); *B60T 13/686* (2013.01); *B60W 10/08* (2013.01); *B60W 10/188* (2013.01); *B60W 30/18127* (2013.01); *B60T 2270/604* (2013.01)
USPC .................................. 303/152; 303/3; 303/11

(58) Field of Classification Search
USPC .......................................... 303/3, 10, 11, 152
See application file for complete search history.

(56) References Cited

U.S. PATENT DOCUMENTS

| | | | |
|---|---|---|---|
| 6,851,762 B2 | 2/2005 | Kamiya et al. | |
| 2012/0161504 A1* | 6/2012 | Higuma et al. | 303/3 |
| 2013/0221733 A1* | 8/2013 | Matsuoka | 303/3 |

FOREIGN PATENT DOCUMENTS

JP 2002-302031 A 10/2002

* cited by examiner

*Primary Examiner* — Vishal Sahni
(74) *Attorney, Agent, or Firm* — Crowell & Moring LLP

(57) ABSTRACT

A brake control apparatus for a vehicle provided with a regenerative braking system includes a hydraulic circuit where a first passage connects a master cylinder to a wheel cylinder. A second passage connects a discharge side of a pump to a first portion of the first passage. A third passage connects a suction side of the pump to a second portion of the first passage between the master cylinder and the first portion. A fourth passage connects the suction side of the pump to a third portion of the first passage between an inflow valve and the wheel cylinder. A reservoir is connected to the third passage and a portion of the fourth passage between an outflow valve and the suction side of the pump. A shut-off valve restricts brake fluid discharge through a discharge-side valve from the pump being driven.

17 Claims, 36 Drawing Sheets

BRAKE CONTROL APPARATUS

BACKGROUND OF THE INVENTION

The present invention relates to brake control apparatuses.

Japanese Patent Application Publication 2002-302031, which corresponds to U.S. Pat. No. 6,851,762, discloses a brake control apparatus that implements a braking force boosting function by driving a pump to raise brake fluid pressure.

SUMMARY OF THE INVENTION

It is desirable to provide a brake control apparatus which is capable of replacing regenerative braking force with frictional braking force in quick response to a request, when the brake control apparatus is applied to a vehicle provided with a regenerative braking system. It is also desirable to provide a brake control apparatus which is capable of allowing a driver to drive such a vehicle with an improved braking feel while the vehicle is under cooperative control of a frictional braking system and a regenerative braking system.

According to one aspect of the present invention, a brake control apparatus for a vehicle provided with a regenerative braking system, the brake control apparatus comprises: a braking operation detecting section configured to detect a condition of driver's braking operation; a first brake fluid passage hydraulically connecting a master cylinder to a wheel cylinder, wherein the master cylinder generates a brake fluid pressure in response to driver's braking operation, and wherein the brake fluid pressure acts on the wheel cylinder; a pump configured to suck brake fluid from the master cylinder, and provided with a discharge-side valve on a discharge side of the pump; a second brake fluid passage hydraulically connecting the discharge side of the pump to a first connecting portion of the first brake fluid passage; a third brake fluid passage hydraulically connecting a suction side of the pump to a second connecting portion of the first brake fluid passage, wherein the second connecting portion is between the master cylinder and the first connecting portion; an inflow valve disposed in a section of the first brake fluid passage between the wheel cylinder and the first connecting portion of the first brake fluid passage; a fourth brake fluid passage hydraulically connecting the suction side of the pump to a third connecting portion of the first brake fluid passage, wherein the third connecting portion is between the inflow valve and the wheel cylinder; an outflow valve disposed in the fourth brake fluid passage; a reservoir hydraulically connected to the third brake fluid passage, and hydraulically connected to a connecting portion of the fourth brake fluid passage, wherein the connecting portion of the fourth brake fluid passage is between the outflow valve and the suction side of the pump; and a pump discharge restricting section configured to restrict discharge of brake fluid through the discharge-side valve from the pump when the pump is being driven.

According to another aspect of the present invention, a brake control apparatus for a vehicle provided with a regenerative braking system, the brake control apparatus comprises: a hydraulic braking device configured to control hydraulic pressure of a wheel cylinder provided at a road wheel of the vehicle, wherein the hydraulic braking device includes a pump configured to suck brake fluid from the master cylinder; a braking operation detecting section configured to detect a condition of driver's braking operation; a driver request calculating section configured to calculate an estimated driver request value of braking force based on the detected condition of driver's braking operation; a first brake fluid passage hydraulically connecting a master cylinder to a wheel cylinder, wherein the master cylinder generates a brake fluid pressure in response to driver's braking operation, and wherein the brake fluid pressure acts on the wheel cylinder; a motor configured to drive the pump; a pump suction shut-off valve disposed on a suction side of the pump; and a control unit configured to calculate a command to produce a braking force in conformance with the estimated driver request value of braking force by operating the hydraulic braking device in cooperation with a braking force generated by the regenerative braking system; wherein the control unit is further configured to implement the calculation of the command by calculating a first command to drive the motor constantly and calculating a second command to drive the pump suction shut-off valve while the braking operation detecting section is detecting presence of driver's braking operation.

According to a further aspect of the present invention, a brake control apparatus comprises: a stroke sensor configured to detect an amount of stroke of a brake pedal resulting from driver's braking operation; a master cylinder pressure sensor configured to detect a brake fluid pressure in a master cylinder, wherein the master cylinder generates the brake fluid pressure in response to driver's braking operation; a wheel cylinder pressure sensor configured to detect a brake fluid pressure in a wheel cylinder provided at a road wheel; a first brake fluid passage hydraulically connecting the master cylinder to the wheel cylinder, wherein the brake fluid pressure generated by the master cylinder acts on the wheel cylinder; a driver request calculating section configured to calculate an estimated driver request value of braking force based on the detected amount of stroke; a hydraulic braking device configured to produce a braking force in conformance with at least part of the estimated driver request value of braking force, wherein the hydraulic braking device includes a pump configured to suck brake fluid from the master cylinder; a motor configured to drive the pump; a pump suction shut-off valve disposed on a suction side of the pump; a control unit configured to perform a control operation while the braking operation detecting section is detecting presence of the stroke of the brake pedal, wherein the control operation includes: driving constantly and controlling the pump based on the detected brake fluid pressure in the master cylinder and the detected brake fluid pressure in the wheel cylinder; and controlling operation of the pump suction shut-off valve at least based on rotational speed of the pump.

DETAILED DESCRIPTION OF THE INVENTION

First Embodiment

Figure 1:
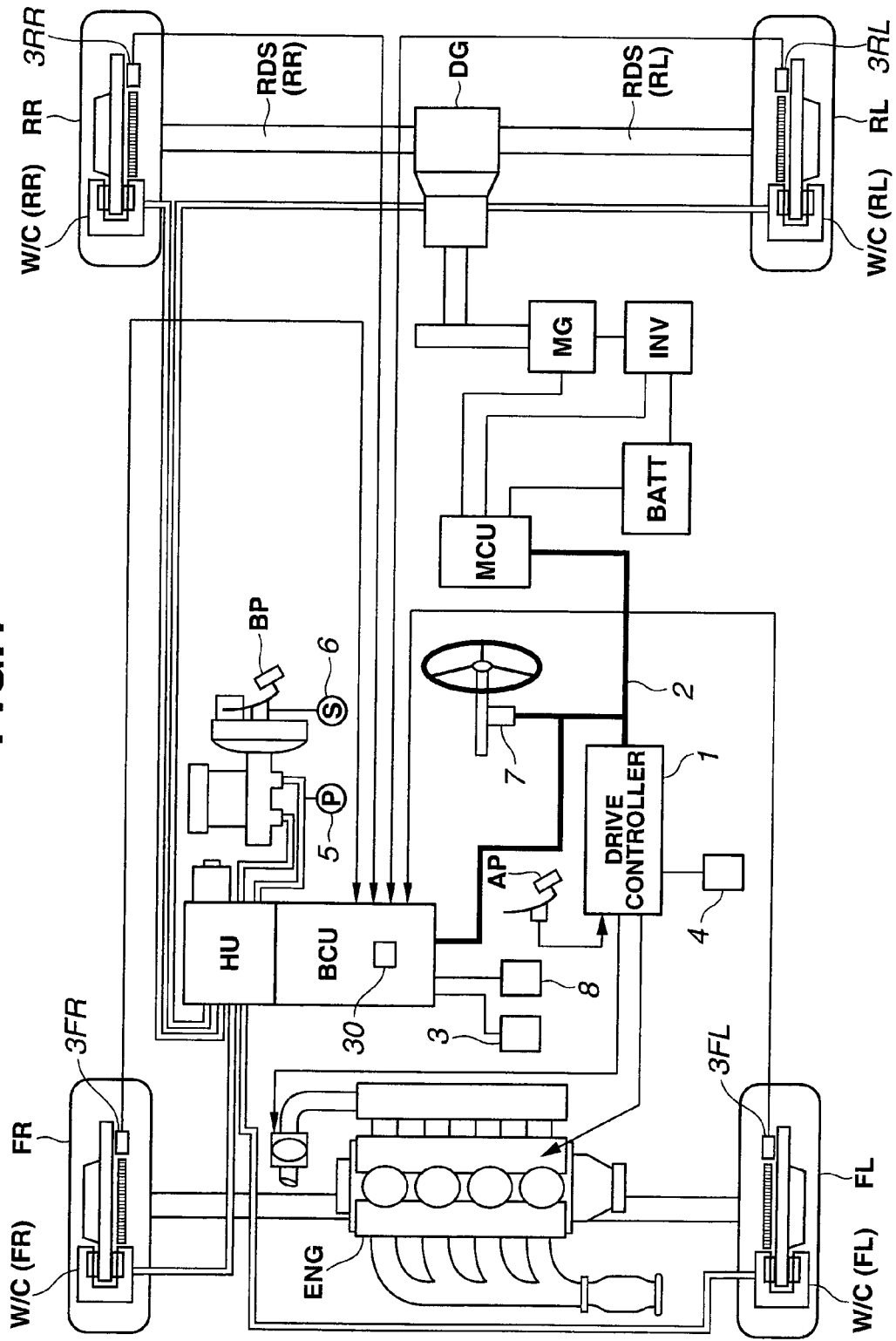
FIG. 1 is a schematic diagram showing a brake system of a motor vehicle provided with a brake control apparatus according to a first embodiment of the present invention.
Figure 2:
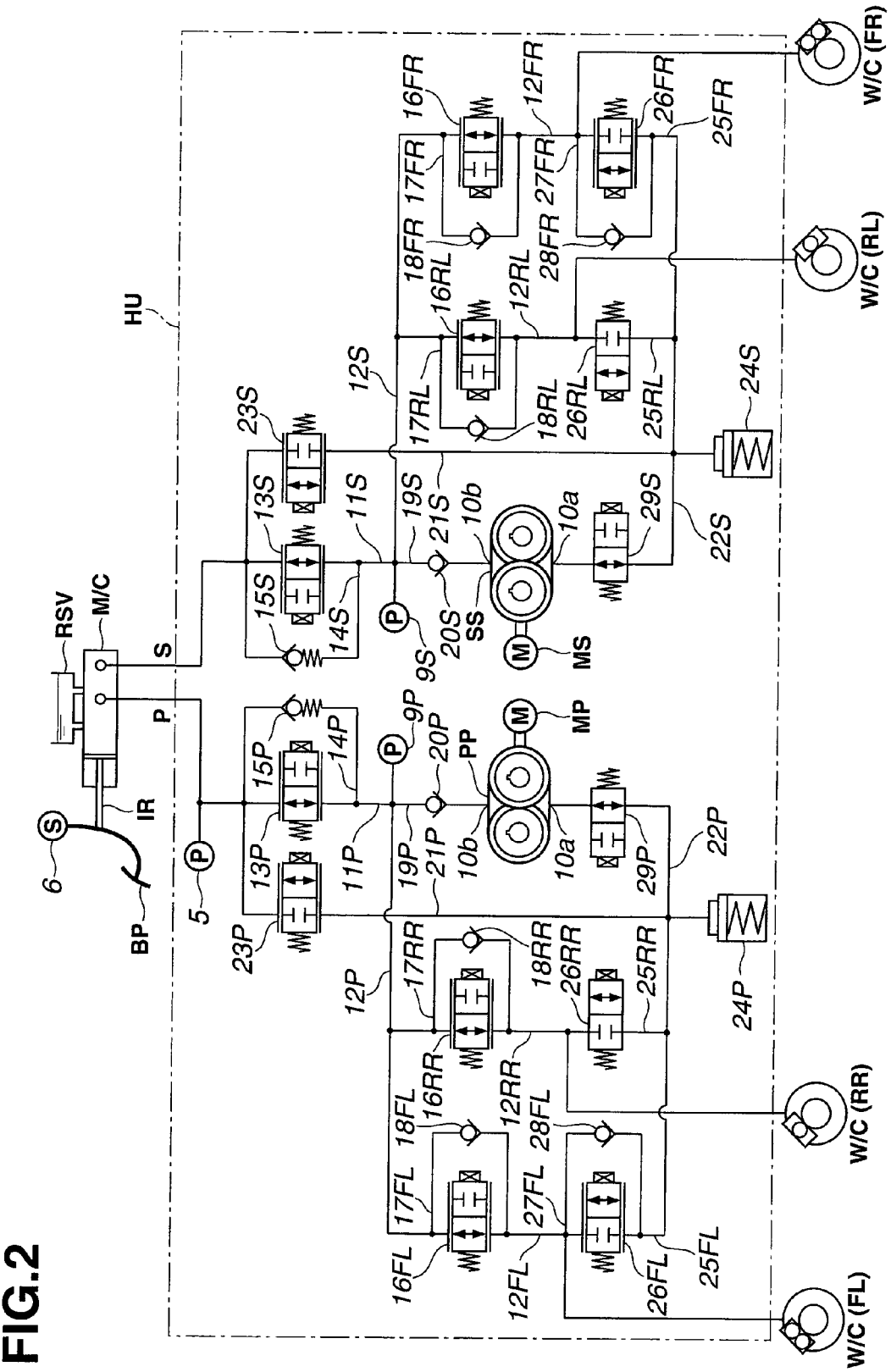
FIG. 2 is a schematic diagram showing a hydraulic circuit of the brake control apparatus.

FIG. 1 schematically shows a brake system of a motor vehicle provided with a brake control apparatus according to a first embodiment of the present invention. FIG. 2 schematically shows a hydraulic circuit of the brake control apparatus.

<System Configuration> In response to a frictional braking force command from a brake control unit BCU as a brake fluid pressure control section, a hydraulic pressure control unit HU as a hydraulic braking device increases or reduces or holds the internal pressure of each of a left front wheel cylinder W/C(FL) at a left front road wheel FL, a right front wheel cylinder W/C(FR) at a right front road wheel FR, a left rear wheel cylinder W/C(RL) at a left rear road wheel RL, and a right rear wheel cylinder W/C(RR) at a right rear road wheel RR.

A motor generator MG is a three-phase alternating-current motor. Motor generator MG is coupled to a left rear drive shaft RDS(RL) for left rear road wheel RL and a right rear drive shaft RDS(RR) for right rear road wheel RR through a differential gear DG. Motor generator MG rotates in power run state or in regeneration run state, and applies to left and right rear road wheels RL, RR driving forces or regenerative braking forces, depending on a command from a motor control unit MCU.

An inverter INV receives a drive signal from motor control unit MCU, and performs based on the drive signal a conversion to an alternating current from a direct current supplied from a battery BATT, and supplies the converted current to motor generator MG so that motor generator MG rotates under power. On the other hand, in response to a regeneration signal from motor control unit MCU, inverter INV allows motor generator MG to run in regenerative mode, by performing a conversion to a direct current from an alternating current generated at motor generator MG, and supplying the converted current to battery BATT for charging the same.

Motor control unit MCU receives a drive signal from a drive controller 1, and outputs to inverter INV a drive signal that is generated depending on the received drive signal. In response to a regenerative braking command from brake control unit BCU, motor control unit MCU outputs a regeneration signal to inverter INV. Motor control unit MCU sends information to brake control unit BCU and drive controller 1 through a communication line 2, wherein the information includes a condition of output control of driving torque or regenerative braking torque of motor generator MG, and an upper limit of regenerative braking torque generated by motor generator MG (or an upper limit of regenerative braking force at road wheels). This upper limit may be calculated based on an estimated value of a battery SOC (state of charge) which is obtained with reference to the terminal voltage and current of battery BATT, and based on an estimated or calculated value of vehicle body speed or vehicle speed. When the vehicle is turning, the upper limit may be calculated in account of steer characteristics of the vehicle. Specifically, when the battery SOC is at or close to a full level, the upper limit is set in consideration of preventing the battery BATT from being overcharged, and thereby protecting the battery BATT. When the vehicle is decelerated by braking, the maximum possible value of regenerative braking force decreases as the vehicle speed decreases. On the other hand, when the vehicle is traveling at high speed, regenerative braking operation may cause a high load applied to inverter INV. In view of the foregoing, the upper limit of regenerative braking force is set for protection of inverter INV.

The setting of the upper limit of regenerative braking force is further advantageous as follows. In the case of the vehicle according to this embodiment, regenerative braking torque is applied to the rear wheels. If the regenerative braking force is excessively higher than the frictional braking force when the vehicle is turning, namely, if the total braking force of rear wheels is excessively higher than the total braking force of front wheels, the vehicle may be fall in oversteer tendency, so that turning behavior of the vehicle may become unstable. In such situations, it is desirable to conform braking force distribution between the front side and the rear side during turning to an ideal one determined by specifications of the vehicle (front:rear=6:4, for example). This problem is solved by the setting of the upper limit of regenerative braking force in this embodiment. Motor generator MG, inverter INV, battery BATT, and motor control unit MCU constitute a regenerative braking system for producing a regenerative torque at left and right rear road wheels RL, RR. Drive controller 1 receives information from various sensors, and performs various control operations depending on the received information, wherein the control operations include a control operation of controlling operation of an automatic transmission not shown, and a control operation of controlling operation of motor generator MG by outputting a drive command to motor control unit MCU.

Brake control unit BCU receives input of information from various sensors directly or through the communication line 2. The sensors include a master cylinder pressure sensor 5 as a master cylinder condition detecting section for obtaining and providing information about a brake fluid pressure P1 detailed below, and a brake pedal stroke sensor 6 as a braking operation detecting section for obtaining and providing information about a brake pedal stroke S, and a steering wheel angle sensor 7 for obtaining and providing information about steering wheel angle $\theta$, and a road wheel speed sensor 3 for obtaining and providing information about road wheel speeds V(FL), V(FR), V(RL) and V(RR), and a yaw rate sensor 8 for obtaining and providing information about vehicle body yaw rate $\gamma$, and a wheel cylinder pressure sensor 9 as a wheel cylinder condition detecting section for obtaining and providing information about a brake fluid pressure P2 detailed below. Brake control unit BCU also receives input of information about battery SOC, etc., through the communication line 2.

Brake control unit BCU includes a driving force request calculating section (or driver request calculating section) 30 configured to calculate or estimate a driver request value of braking force, based on information about brake pedal stroke S from brake pedal stroke sensor 6 and other information from other sensors. Brake control unit BCU allocates the driver request value of braking force to a component of regenerative braking force and a component of frictional braking force, and controls operation of hydraulic pressure control unit HU depending on a desired value of frictional braking force, and outputs a regenerative braking force command to motor control unit MCU to control operation of motor generator MG.

In the present embodiment, a cooperative regenerative braking control is performed in which regenerative braking is prioritized higher than frictional braking so that if a driver request of braking force can be fulfilled by regenerative braking force, brake control unit BCU uses regenerative braking force only, as long as the driver requests is below the upper limit of regenerative braking force. This serves to enhance energy recovery efficiency overall from a low speed region to a high sped region, especially when the vehicle accelerates and decelerates repeatedly. When the vehicle speed decreases or increases so that the regenerative braking force is limited to the upper limit, brake control unit BCU decreases the distribution for regenerative braking force and increases the distribution for frictional braking force, for achieving the driver request. In the following, the language "replacement of regenerative braking force with frictional braking force" is defined to mean an operation of reducing regenerative braking force and increasing frictional braking force (or an operation of reducing the distribution for regenerative braking force and increasing the distribution for frictional braking force), whereas the language "replacement of frictional braking force with regenerative braking force" is defined to mean an operation of increasing regenerative braking force and reducing frictional braking force (or an operation of increasing the distribution for regenerative braking force and reducing the distribution for frictional braking force).

Brake control unit BCU is configured to implement an automatic brake control by increasing and reducing and holding selectively the wheel cylinder pressures depending on the signals from the sensors, wherein the automatic brake control includes an antilock brake control (ABS), and controls needed to implement various vehicle dynamic behavior controls. An ABS control is a control of monitoring whether or not each road wheel tends to be locked when a brake pedal is operated, and controls, in response to detection of a road wheel close to lock state, the wheel cylinder pressure of the road wheel by reducing, holding and increasing repeatedly, for stably maximizing the generated frictional braking force of the road wheel while preventing the road wheel from locking. The automatic braking control also includes a vehicle behavior stabilizing control, a brake assist control (BAS control), and an electronic braking force distribution control (EBD control), and a control supporting auto-cruise control. The vehicle behavior stabilizing control is a control of stabilizing the vehicle behavior by regulating the wheel cylinder of a selected target one or more of the wheels in response to detection of a condition that the vehicle shows an oversteer tendency or understeer tendency while the vehicle is turning. The BAS control is a control of boosting the pressure of master cylinder M/C to enhance the wheel cylinder pressures when the master cylinder pressure is generated by operation of the brake pedal. The EBD control is a control of causing the front-rear distribution of braking force to a desired point by moderately increasing the distribution for rear wheels. For auto-cruise control, the braking force is controlled according to a positional relationship between the host vehicle to a preceding vehicle.

<Hydraulic Circuit> The following describes specific configuration of hydraulic pressure control unit HU. Hydraulic pressure control unit HU has an X-line arrangement including a P-line section and a S-line section. The P-line section is hydraulically connected to left front wheel cylinder W/C(FL) and right rear wheel cylinder W/C(RR), whereas the S-line section is hydraulically connected to right front wheel cylinder W/C(FR) and left rear wheel cylinder W/C(RL). In FIG. 2, each reference symbol having a last character of "P" represents an element associated with the P-line section, whereas each reference symbol having a last character of "S" represents an element associated with the S-line section. Similarly, each reference symbol having last two characters of "FL" represents an element associated with left front road wheel FL, and each reference symbol having last two characters of "FR" represents an element associated with right front road wheel FR, and each reference symbol having last two characters of "RL" represents an element associated with left rear road wheel RL, and each reference symbol having last two characters of "RR" represents an element associated with right rear road wheel RR. In the following description, these last characters are omitted if the described feature is common between the P-line section and S-line section or among road wheels FL, FR, RL and RR for conciseness of the description.

Hydraulic pressure control unit HU employs a closed hydraulic circuit, which is a hydraulic circuit in which brake fluid supplied to wheel cylinder W/C is returned to reservoir tank RSV through master cylinder M/C. Brake pedal BP is coupled to master cylinder M/C through an input rod IR.

The P-line section is provided with a pump PP, whereas the S-line section is provided with a pump PS. Each pump PP, PS is a single-gear pump, and is driven by a corresponding electric motor MP, MS, and is configured to suck brake fluid through a suction port 10a, and pressurize and discharge brake fluid through a discharge port 10b.

Master cylinder M/C and each wheel cylinder W/C are connected to each other through a fluid passage 11 and a fluid passage 12. Fluid passage 12P braches into a fluid passage 12FL and fluid passage 12RR, wherein fluid passage 12FL is hydraulically connected to left front wheel cylinder W/C (FL), and fluid passage 12RR is hydraulically connected to right rear wheel cylinder W/C(RR). On the other hand, fluid passage 12S braches into a fluid passage 12FR and fluid passage 12RL, wherein fluid passage 12FR is hydraulically connected to right front wheel cylinder W/C(FR), and fluid passage 12RL is hydraulically connected to left rear wheel cylinder W/C(RL). Fluid passage 11 and fluid passage 12 constitute a first brake fluid passage. The connecting point between fluid passage 11 and fluid passage 12 is provided with a wheel cylinder pressure sensor 9.

Fluid passage 11 is provided with a gate-out valve 13 therein, which is a normally open proportional electromagnetic valve. The p-line fluid passage 11P is provided with a master cylinder pressure sensor 5 therein, which is arranged between master cylinder M/C and gate-out valve 13P. Fluid passage 11 is provided with a fluid passage 14, wherein fluid passage 14 and gate-out valve 13 arranged in parallel. Fluid passage 14 is provided with a relief valve 15 therein. Relief valve 15 is a unidirectional valve that permits brake fluid to flow in a direction from master cylinder M/C to wheel cylinder W/C, and prevents brake fluid from inversely flowing. Relief valve 15 is provided with the setting of a threshold pressure Pr, wherein relief valve 15 functions to permit brake fluid to inversely flow, when the applied brake pressure is above threshold pressure Pr. Threshold pressure Pr is equivalent to an upper limit of regenerative braking force which is determined based on characteristics and capability of motor generator MG and/or inverter INV.

Fluid passage 12 is provided with a solenoid in-valve (or inflow valve) 16 therein, which is a normally open proportional electromagnetic valve corresponding to each wheel cylinder W/C. Fluid passage 12 is also provided with a fluid passage 17 therein, wherein solenoid in-valve 16 and fluid passage 17 are arranged in parallel. Fluid passage 17 is provided with a check valve 18 therein, which permits brake fluid to flow in a direction from wheel cylinder W/C to master cylinder M/C, and prevents brake fluid from inversely flowing.

The connecting point between fluid passage 11 and fluid passage 12 is connected to fluid discharge port 10b of pump P by a fluid passage 19. Fluid passage 19 constitutes a second brake fluid passage. Fluid passage 19 is provided with a discharge-side valve 20 therein. Discharge-side valve 20 permits brake fluid to flow in a direction from discharge port 10b to fluid passage 11 and fluid passage 12, and prevents brake fluid from inversely flowing.

The suction port 10a of pump P is connected to a point of fluid passage 11 between master cylinder M/C and gate-out valve 13 by a fluid passage 21 and a fluid passage 22. Fluid passage 21 and fluid passage 22 constitute a third brake fluid passage. Fluid passage 21 is provided with a gate-in valve 23 therein, which is a normally closed proportional electromagnetic valve. The connecting point between fluid passage 21 and fluid passage 22 is provided with a reservoir 24.

The suction port 10a of pump P is connected to a point of fluid passage 12 between solenoid in-valve 16 and wheel cylinder W/C by a fluid passage 25 and fluid passage 22. Fluid passage 25 and fluid passage 22 constitute a fourth brake fluid passage. Fluid passage 25 is provided with solenoid out-valve (or outflow valve) 26 therein, which is a normally closed electromagnetic valve. Of four solenoid out-valves 26, solenoid out-valve 26FL and solenoid out-valve 26FR are proportional electromagnetic valves, whereas solenoid out-valve 26RL and solenoid out-valve 26RR are on-off valves. Fluid passage 25FL, 25FR is provided with a fluid passage 27FL, 27FR therein, wherein solenoid out-valve 26FL, 26FR and fluid passage 27FL, 27FR are arranged in parallel. Fluid passage 27FL, 27FR is provided with a check valve 28FL, 28FR therein. Check valve 28 permits brake fluid to flow from reservoir 24 to wheel cylinder W/C, and prevents brake fluid from flowing inversely.

Fluid passage 22 is provided with a pump suction shut-off valve 29 therein, which is a normally open electromagnetic valve. Pump suction shut-off valve 29 serves as a pump discharge restricting section to restrict discharge of brake fluid from pump P through discharge-side valve 20.

Brake control unit BCU controls the brake fluid pressure by operating the gate-in valves 23, gate-out valves 13, solenoid in-valves 16, solenoid out-valves 26, pump suction shut-off valves 29, and electric motors M, based on the driver request of braking force, and the condition of braking regeneration of the regenerative braking system composed of motor generator MG, inverter INV and battery BATT. Brake control unit BCU performs PWM-control for gate-out valves 13, solenoid in-valves 16, and solenoid out-valves 26FL, 26FR, and performs on-off control for solenoid out-valve 26RR and solenoid out-valve 26RL and pump suction shut-off valves 29.

The following describes operation of the brake control apparatus described above in various situations, wherein the state of operation of the valves and pumps of the hydraulic pressure control unit HU and quantities about braking force (driver request braking force, regenerative braking force, and frictional braking force) are described for each situation with reference to combination of a schematic diagram showing how brake fluid flows in the hydraulic circuit, and a time chart showing how various variables of the brake system change with time. Although the diagram of hydraulic circuit only shows the P-line section, the S-line section operates similar to the P-line section except under conditions that the ABS control system is active so that the wheel cylinders are controlled asymmetrically.

In the present embodiment, electric motor M is driven constantly when the presence of brake pedal stroke S is detected by brake pedal stroke sensor 6, namely when the driver is operating the brake pedal BP. At the time, brake control unit BCU continues calculation of a rotational speed signal for constantly driving the motor M, and operates the motor M based on the signal.

In the present embodiment, while the brake pedal BP is operated by the driver, brake control unit BCU controls the brake pedal stroke S and brake fluid pressure P1 by regulating the gate-in valves 23 and gate-out valves 13 in such a manner to hold the brake pedal stroke S (measured by brake pedal stroke sensor 6) and the brake fluid pressure P1 (master cylinder pressure measured by brake pedal stroke sensor 6) constantly in a specific relationship which defines characteristics of operation of brake pedal BP. When the brake fluid pressure P1 is higher than a value determined by the specific relationship and the brake pedal stroke S, gate-in valves 23 are controlled to allow brake fluid to flow into reservoir 24, and thereby allow further increment of the brake pedal stroke S. On the other hand, when the brake fluid pressure P1 is lower than a value determined by the specific relationship and the brake pedal stroke S, gate-out valves 13 are controlled to allow brake fluid to flow back into master cylinder M/C.

Figure 3:
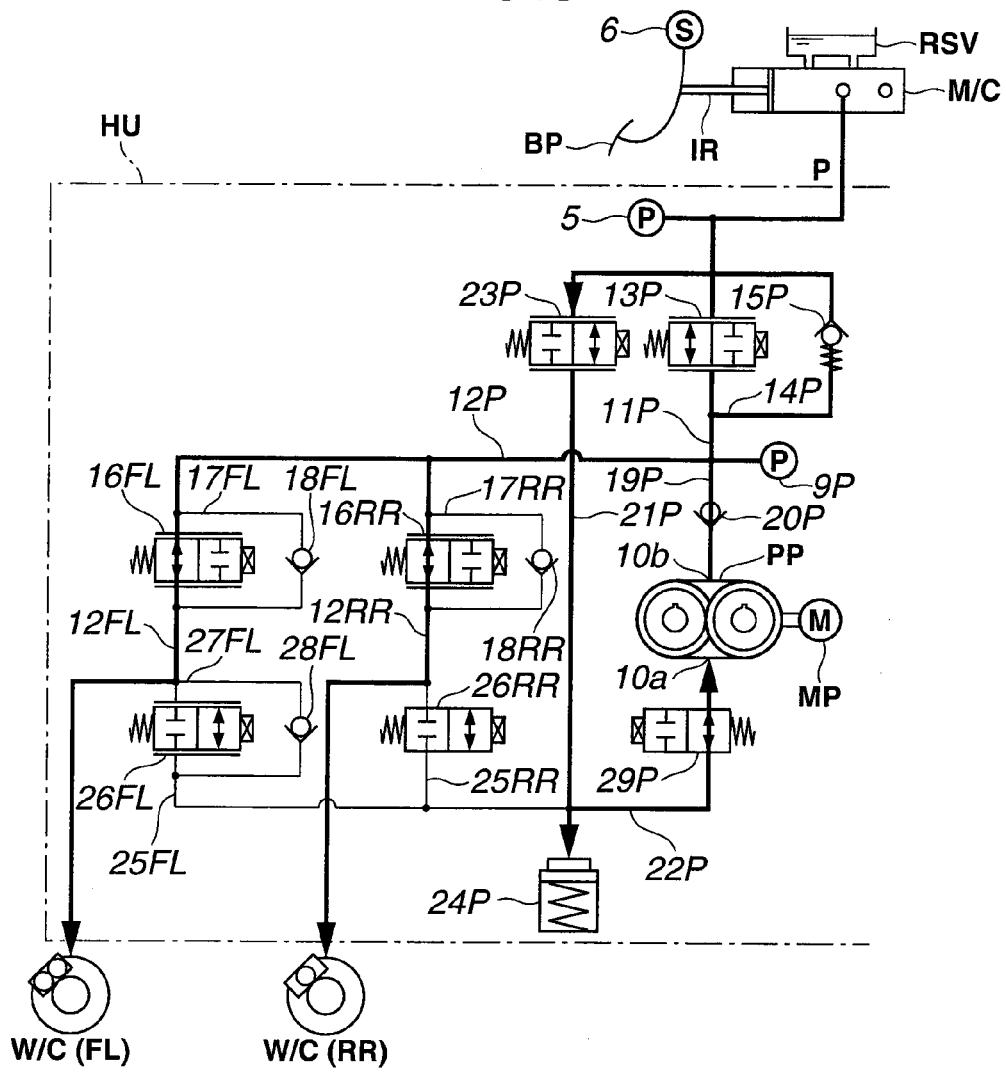
FIG. 3 is a schematic diagram showing how brake fluid flows in the hydraulic circuit when a brake pedal is depressed down in normal braking mode.
Figure 4:
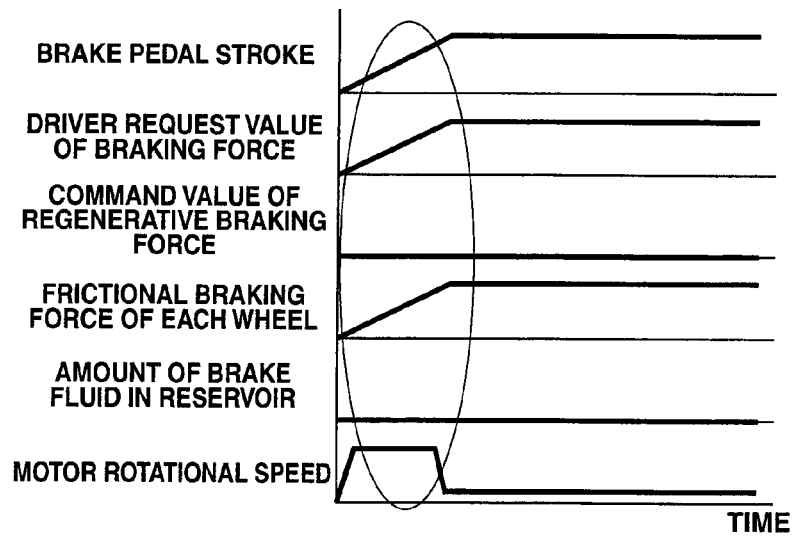
FIG. 4 is a time chart showing how various variables of the brake system change with time when the brake pedal is depressed down in normal braking mode.

<Normal Braking Mode> FIG. 3 schematically shows how brake fluid flows in the hydraulic circuit when a brake pedal is depressed down in normal braking mode. FIG. 4 shows how various variables of the brake system change with time when the brake pedal is depressed down in normal braking mode. The normal braking mode is a mode or situation in which no interruption about cooperative regenerative braking control is caused by the regenerative braking system, and no other automatic braking control such as the ABS control or vehicle behavior control is active, and brake control unit BCU produces frictional braking force only in response to operation of the brake pedal BP by the driver. Electric motor M is controlled to achieve the driver request driving force, wherein the rotational speed of electric motor M is controlled according to brake fluid pressure P2, namely, according to wheel cylinder pressure. When the brake pedal BP is depressed down to request an increase in the wheel cylinder pressures, the rotational speed of electric motor M is set to increase as the target rate of increase of wheel cylinder pressure increases. All of the brake fluid flown into reservoir 24 is sent to wheel cylinders W/C and master cylinder M/C by pump P.

Figure 5:
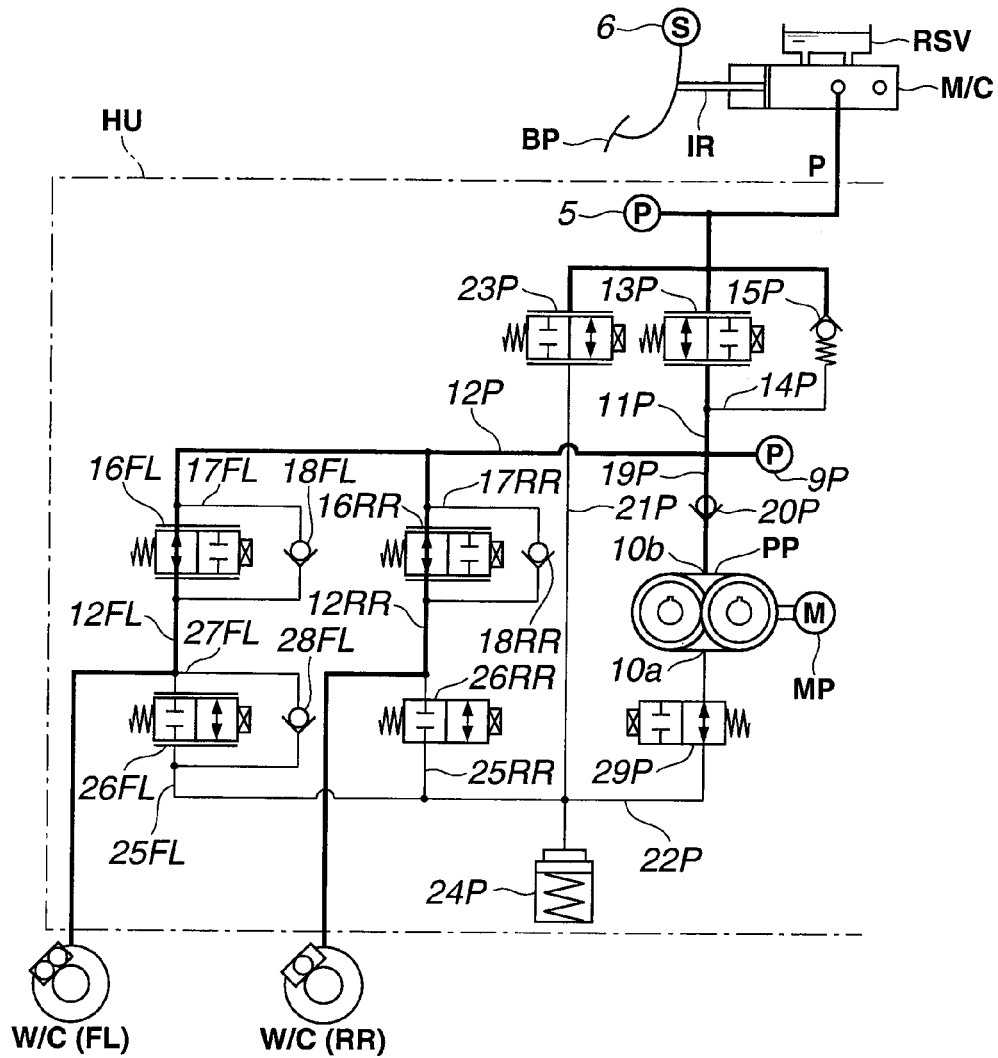
FIG. 5 is a schematic diagram showing how brake fluid flows in the hydraulic circuit when the brake pedal is held in a depressed position in normal braking mode.
Figure 6:
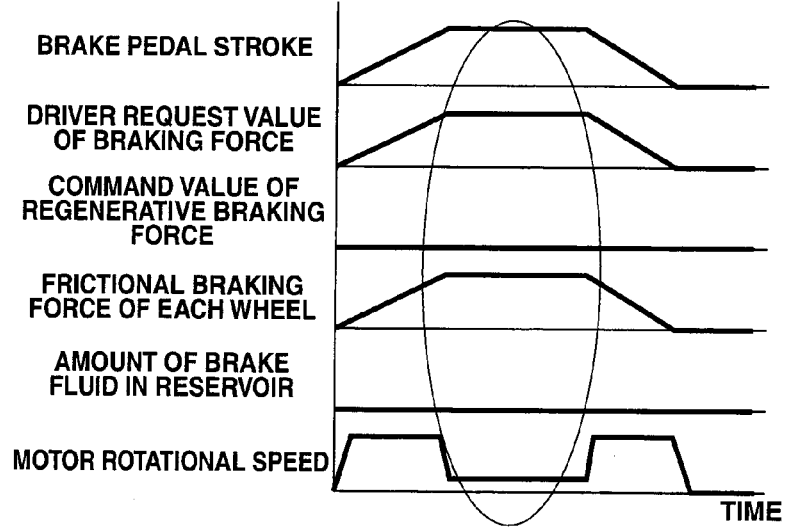
FIG. 6 is a time chart showing how the various variables of the brake system change with time when the brake pedal is held in the depressed position in normal braking mode.

FIG. 5 schematically shows how brake fluid flows in the hydraulic circuit when the brake pedal is held in a depressed position in normal braking mode. FIG. 6 shows how the various variables of the brake system change with time when the brake pedal is held in the depressed position in normal braking mode. Rotation of electric motor M is maintained for quickly responding to a future pressure increase due to depression of brake pedal BP, although the rotational speed of electric motor M is low.

Figure 7:
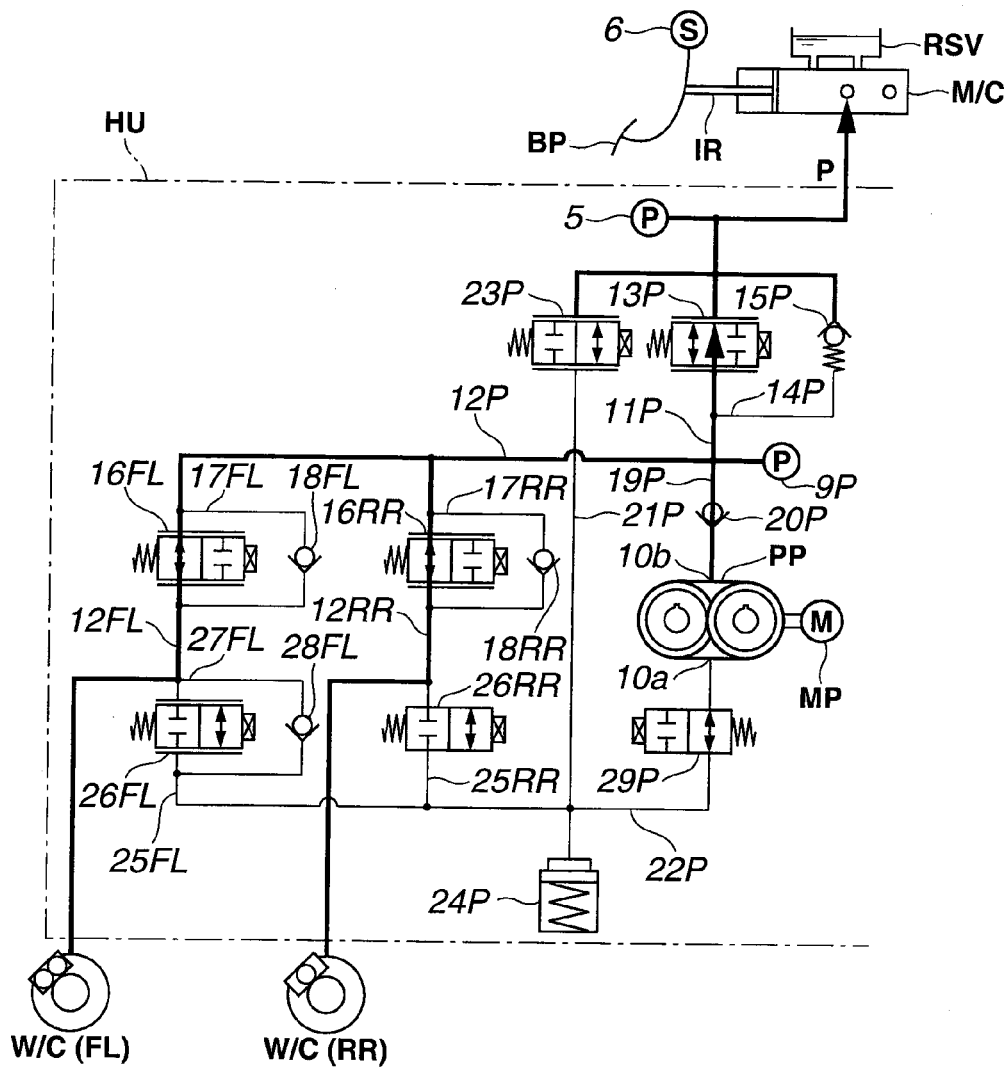
FIG. 7 is a schematic diagram showing how brake fluid flows in the hydraulic circuit when the brake pedal is released from the depressed position in normal braking mode.
Figure 8:
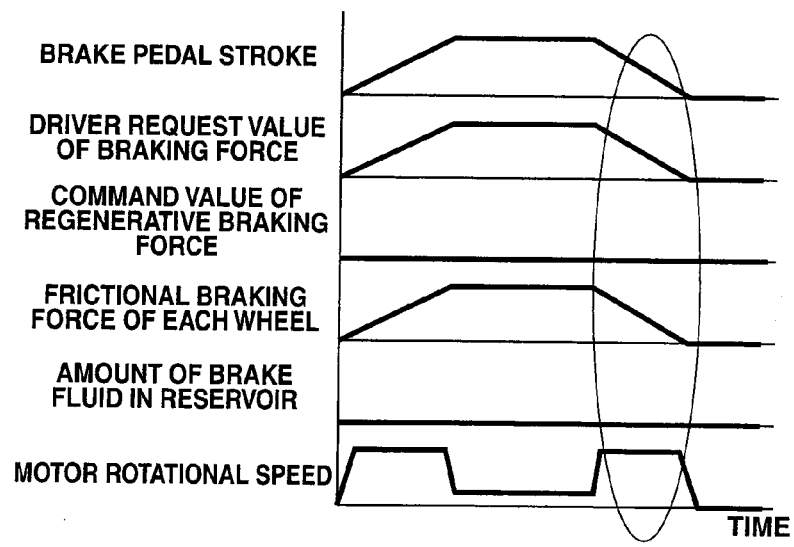
FIG. 8 is a time chart showing how the various variables of the brake system change with time when the brake pedal is released from the depressed position in normal braking mode.

FIG. 7 schematically shows how brake fluid flows in the hydraulic circuit when the brake pedal is released from the depressed position in normal braking mode. FIG. 8 shows how the various variables of the brake system change with time when the brake pedal is released from the depressed position in normal braking mode. In the situation of FIGS. 7 and 8, the brake fluid pressure control is accompanied by an increase of the rotational speed of electric motor M for generating a brake pedal reaction force by supplying to master cylinder M/C an amount of brake fluid equivalent to an amount of release of brake pedal BP. In this way, in normal braking mode, the brake control apparatus implements a boosting function by pressurizing by pump P the brake fluid that is flown from master cylinder M/C into hydraulic pressure control unit HU by operation of the brake pedal BP by the driver, and thereby producing a differential pressure between the master cylinder pressure and the wheel cylinder pressure.

Figure 9:
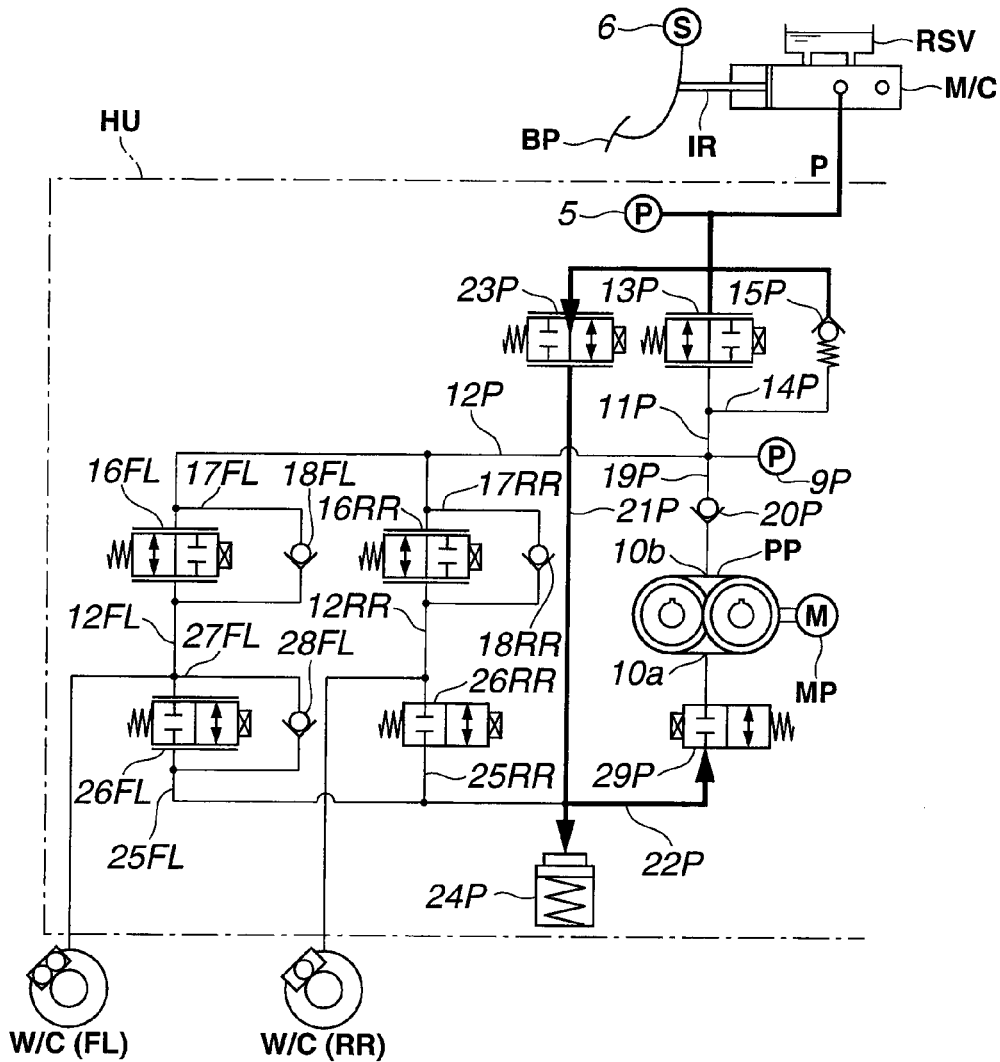
FIG. 9 is a schematic diagram showing how brake fluid flows in the hydraulic circuit when a regenerative braking force is produced immediately after start of depression of the brake pedal (P1<Pr).
Figure 10:
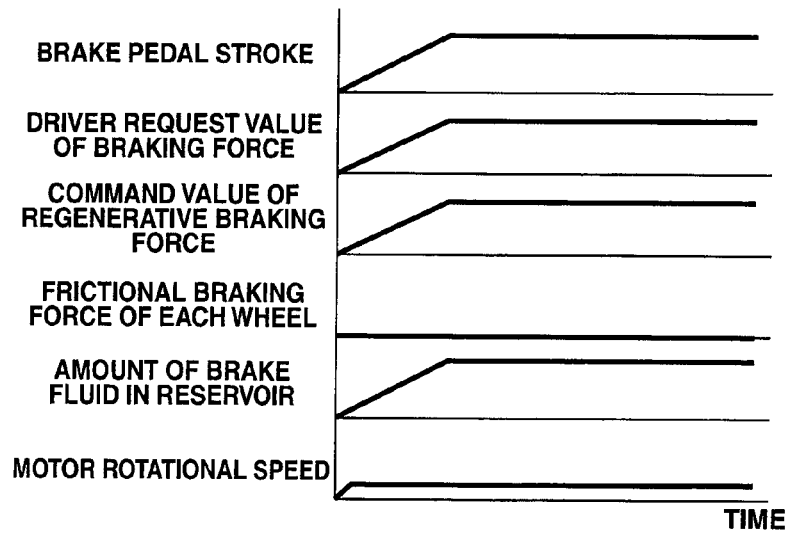
FIG. 10 is a time chart showing how the various variables of the brake system change with time when the regenerative braking force is produced immediately after start of depression of the brake pedal (P1<Pr).

<Cooperative Regenerative Braking Control> FIG. 9 schematically shows how brake fluid flows in the hydraulic circuit when a regenerative braking force is produced immediately after start of depression of the brake pedal (P1<Pr). FIG. 10 shows how the various variables of the brake system change with time when the regenerative braking force is produced immediately after start of depression of the brake pedal (P1<Pr). Electric motor M is controlled to continue to rotate at low speed for quickly responding to a pressure increase request. On the other hand, pump suction shut-off valve 29 is operated to prevent the wheel cylinder pressures from increasing due to the operation of pump P. Solenoid in-valve 16 is operated to prevent brake fluid from flowing into wheel cylinder W/C, and thereby maintain the wheel cylinder pressure to 0 MPa. At this moment, brake fluid pressure P1 and brake fluid pressure P2 are in a relationship of P1≥P2. For allowing the brake pedal stroke S, the corresponding amount of brake fluid is brought into and stored in reservoir 24. In this way, the driver request of braking force is covered only by the regenerative braking force, which is advantageous in enhancing the energy recovery efficiency.

Figure 11:
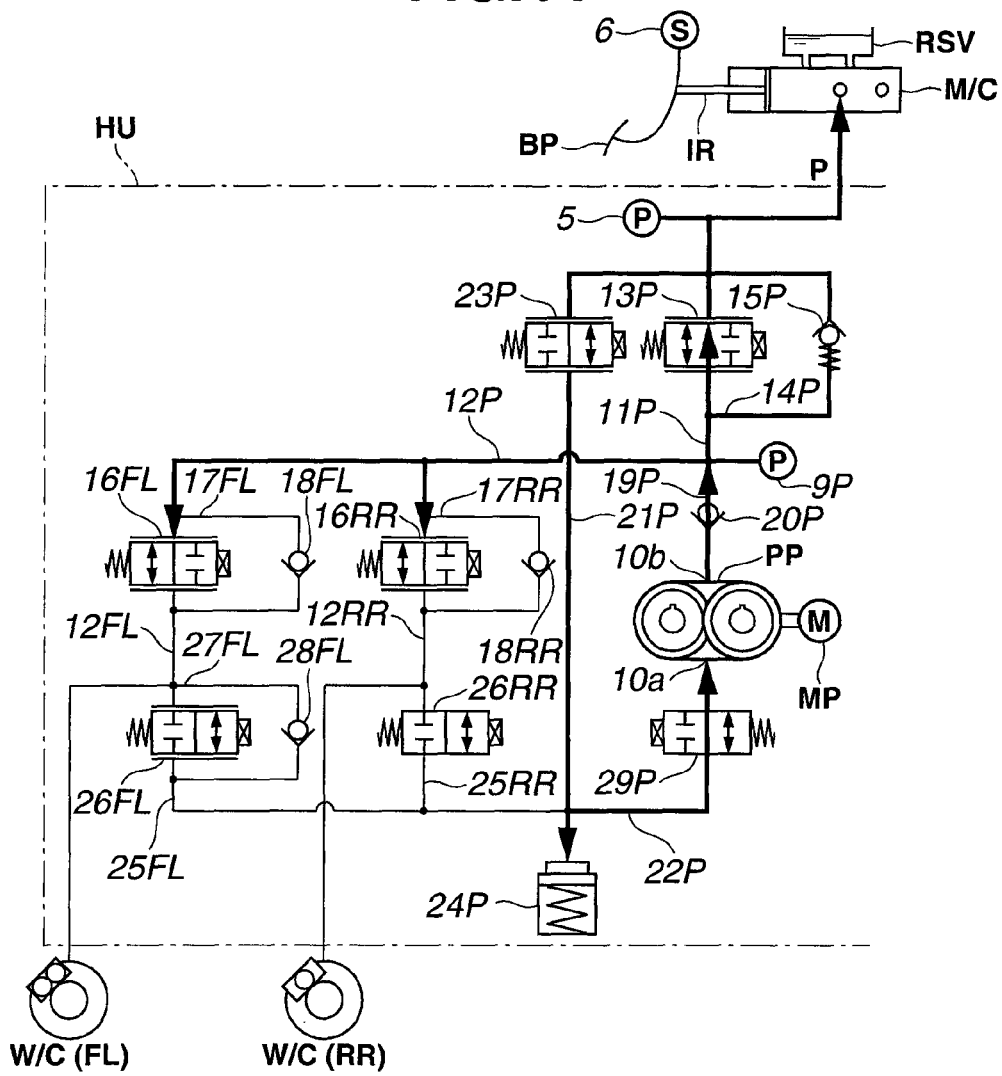
FIG. 11 is a schematic diagram showing how brake fluid flows in the hydraulic circuit when the brake pedal is released from a depressed position in a situation where the regenerative braking force is being produced with no frictional braking force.
Figure 12:
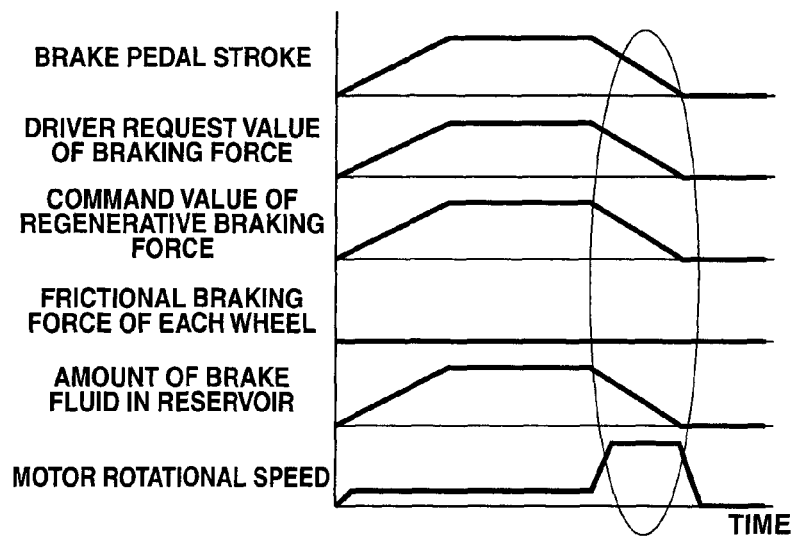
FIG. 12 is a time chart showing how the various variables of the brake system change with time when the brake pedal is released from the depressed position in a situation where the regenerative braking force is being produced with no frictional braking force.

FIG. 11 schematically shows how brake fluid flows in the hydraulic circuit when the brake pedal is released from the depressed position in a situation where the regenerative braking force is being produced with no frictional braking force. FIG. 12 shows how the various variables of the brake system change with time when the brake pedal is released from the depressed position in a situation where the regenerative braking force is being produced with no frictional braking force. In the situation, electric motor M and pump suction shut-off valve 29 are controlled to maintain the condition that brake fluid pressure P1 is higher than brake fluid pressure P2.

Figure 13:
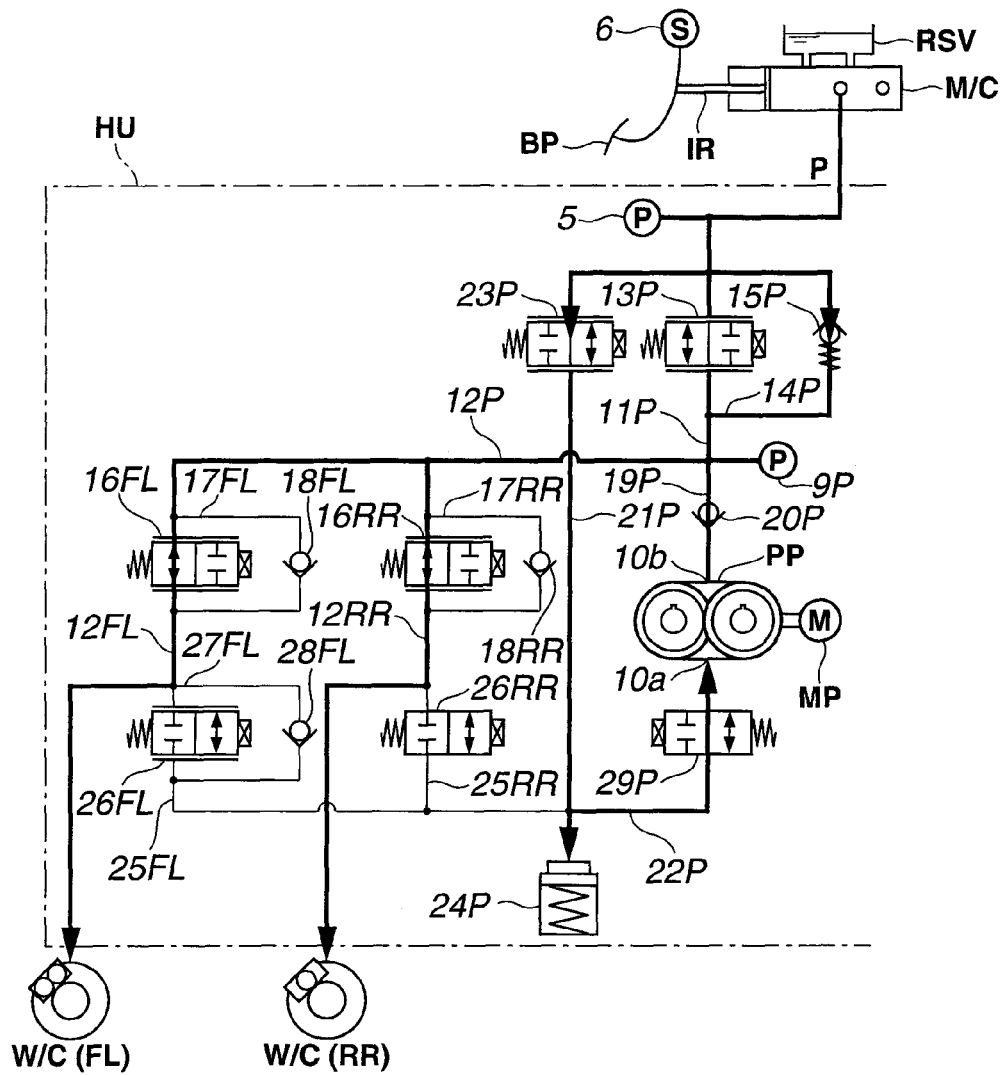
FIG. 13 is a schematic diagram showing how brake fluid flows in the hydraulic circuit when a regenerative braking force is produced immediately after start of depression of the brake pedal (P1≥Pr satisfied an interval after the start of depression of the brake pedal).
Figure 14:
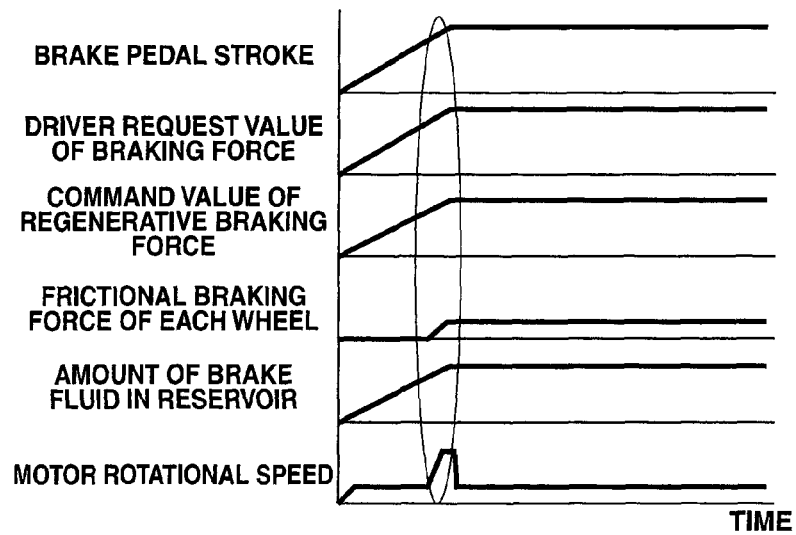
FIG. 14 is a time chart showing how the various variables of the brake system change with time when the regenerative braking force is produced immediately after start of depression of the brake pedal (P1≥Pr satisfied the interval after the start of depression of the brake pedal).

FIG. 13 schematically shows how brake fluid flows in the hydraulic circuit when a regenerative braking force is produced immediately after start of depression of the brake pedal (P1≥Pr satisfied an interval after the start of depression of the brake pedal). FIG. 14 shows how the various variables of the brake system change with time when the regenerative braking force is produced immediately after start of depression of the brake pedal (P1≥Pr satisfied an interval after the start of depression of the brake pedal). In this situation, electric motor M and pump suction shut-off valve 29 operate according to brake fluid pressure P2. When the difference (P1−P2) between brake fluid pressure P1 and brake fluid pressure P2 is greater than or equal to threshold pressure Pr of relief valve 15, brake fluid flows through relief valve 15 to wheel cylinder W/C until the difference (P1−P2) decreases below threshold pressure Pr. Since brake fluid pressure P1 is much higher than brake fluid pressure P2 (P1>>P2) in general, the quantity of (P1−P2) may be approximated to P1. In summary, when brake fluid pressure P1 is greater than threshold pressure Pr, brake fluid flows through relief valve 15 to wheel cylinder W/C until P1 decreases below threshold pressure Pr. When the amount of brake fluid that has flown through relief valve 15 is insufficient, the brake fluid stored in reservoir 24 is sucked by pump P, and then supplied to wheel cylinder W/C. In this way, when the regenerative braking force reaches the upper limit, the excess portion of the driver request braking force is covered by the frictional braking force.

Figure 15:
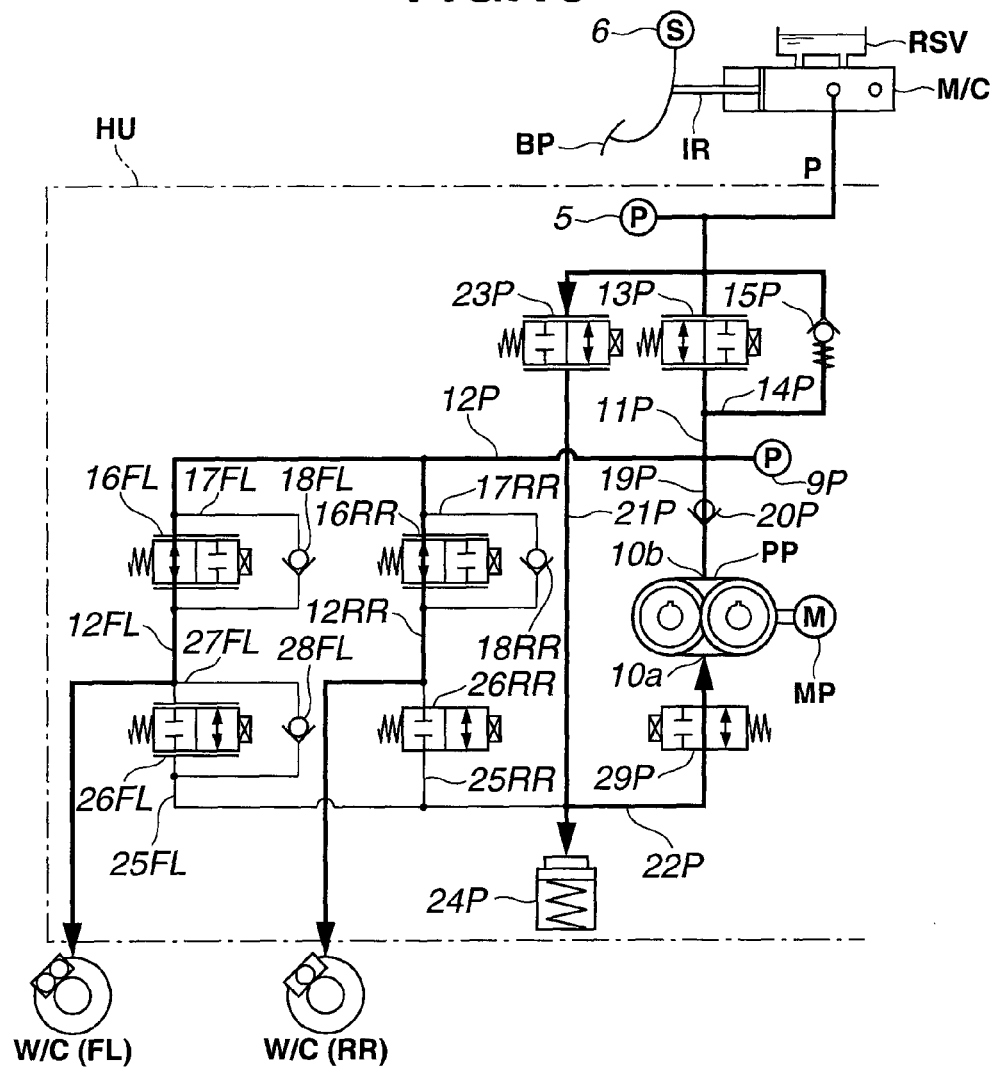
FIG. 15 is a schematic diagram showing how brake fluid flows in the hydraulic circuit when a regenerative braking force is produced immediately after start of depression of the brake pedal (P1≥Pr already satisfied at the start of depression of the brake pedal).
Figure 16:
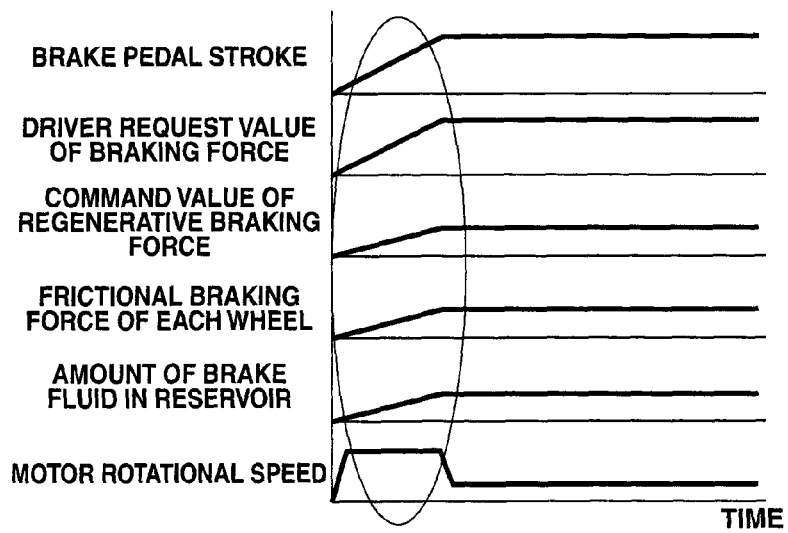
FIG. 16 is a time chart showing how the various variables of the brake system change with time when the regenerative braking force is produced immediately after start of depression of the brake pedal (P1≥Pr already satisfied at the start of depression of the brake pedal).

FIG. 15 schematically shows how brake fluid flows in the hydraulic circuit when a regenerative braking force is produced immediately after start of depression of the brake pedal (P1≥Pr already satisfied at the start of depression of the brake pedal). FIG. 16 shows how the various variables of the brake system change with time when the regenerative braking force is produced immediately after start of depression of the brake pedal (P1≥Pr already satisfied at the start of depression of the brake pedal). Electric motor M and pump suction shut-off valve 29 are controlled to operate according to brake fluid pressure P2. When the regenerative braking force is small, the brake fluid pressure P1 and brake fluid pressure P2 are in a relationship of P1<P2. Accordingly, the motor speed is set high and pump suction shut-off valve 29 is maintained inactive (i.e., maintained opened). On the other hand, when the regenerative braking force is large, the brake fluid pressure P1 and brake fluid pressure P2 are in a relationship of P1≥P2. Accordingly, the motor speed is set low and pump suction shut-off valve 29 is operated (i.e., closed fully or partly as appropriate). In situations where the amount of discharge of pump P is too large even when the motor speed is low, pump suction shut-off valve 29 is controlled to adjust the amount of suction of pump P. The foregoing feature serves to allow the regenerative braking force to increase quickly at the beginning of braking, and thereby satisfy the driver request braking force by combination of regenerative braking force and frictional braking force.

Figure 17:
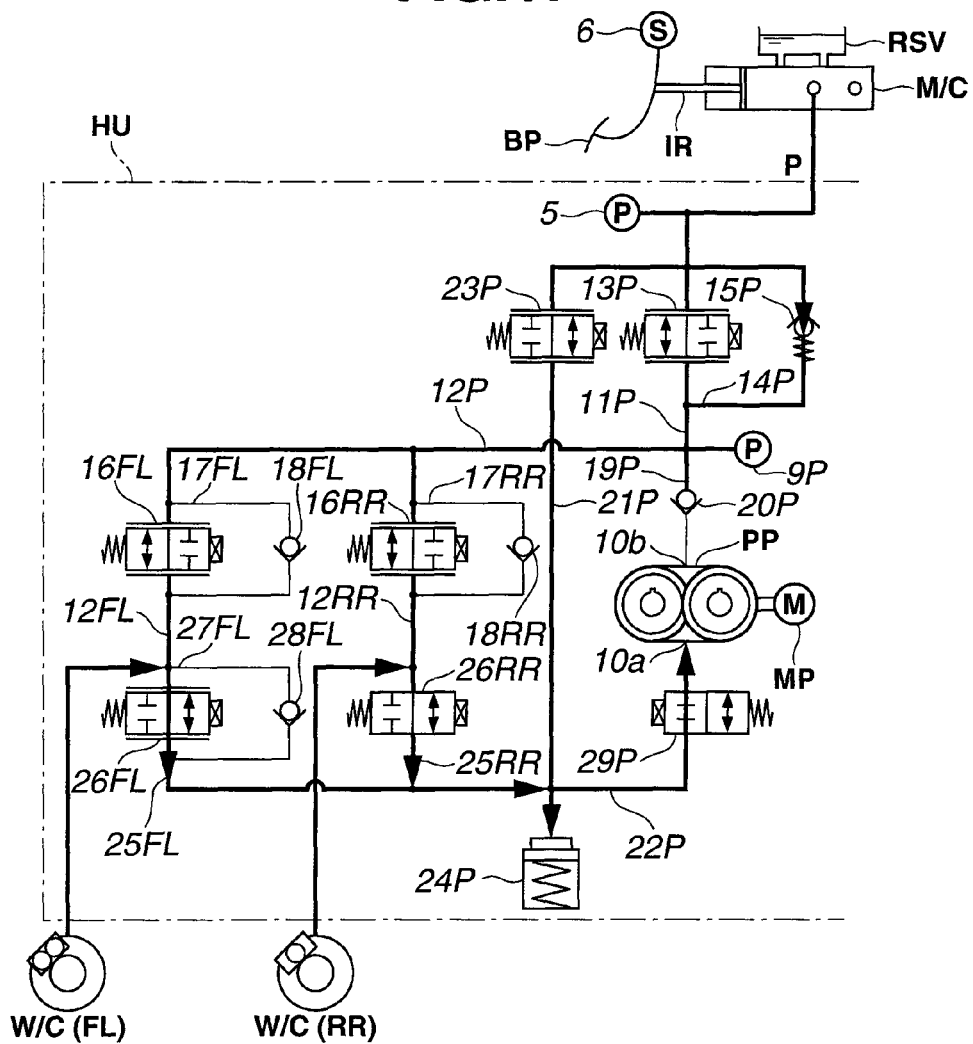
FIG. 17 is a schematic diagram showing how brake fluid flows in the hydraulic circuit when a regenerative braking force replaces a frictional braking force (P1≥Pr).
Figure 18:
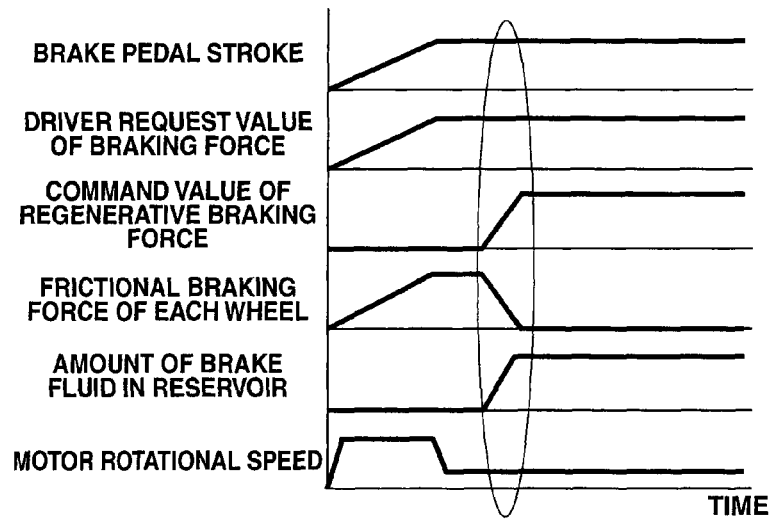
FIG. 18 is a time chart showing how the various variables of the brake system change with time when the regenerative braking force replaces the frictional braking force (P1≥Pr).

FIG. 17 schematically shows how brake fluid flows in the hydraulic circuit when a regenerative braking force replaces a frictional braking force (P1≥Pr). FIG. 18 shows how the various variables of the brake system change with time when the regenerative braking force replaces the frictional braking force (P1≥Pr). In this situation, the rotational speed of electric motor M is maintained at low speed for preparing a quick response to a future pressure increase request, and pump suction shut-off valve 29 is operated to shut off the suction passage of pump P. In this situation, the brake pedal BP is depressed down so that the master cylinder pressure (brake fluid pressure P1) exceeds the threshold pressure Pr of relief valve 15. Accordingly, solenoid out-valve 26 for each front or rear wheel is operated to reduce the wheel cylinder pressure, and store brake fluid in reservoir 24. The relationship between brake fluid pressure P1 and brake fluid pressure P2 is not changed by the reduction of the wheel cylinder pressures. In consideration of this fact, for estimating the amount of brake fluid stored in reservoir 24, the relationship among brake fluid pressure P1, brake fluid pressure P2 and brake pedal stroke S is estimated based on the condition of each valve. This estimation can be made simply, because hydraulic pressure control unit HU is based on the closed hydraulic circuit. In this way, the brake control apparatus achieves the replacement of frictional braking force with regenerative braking force.

Figure 19:
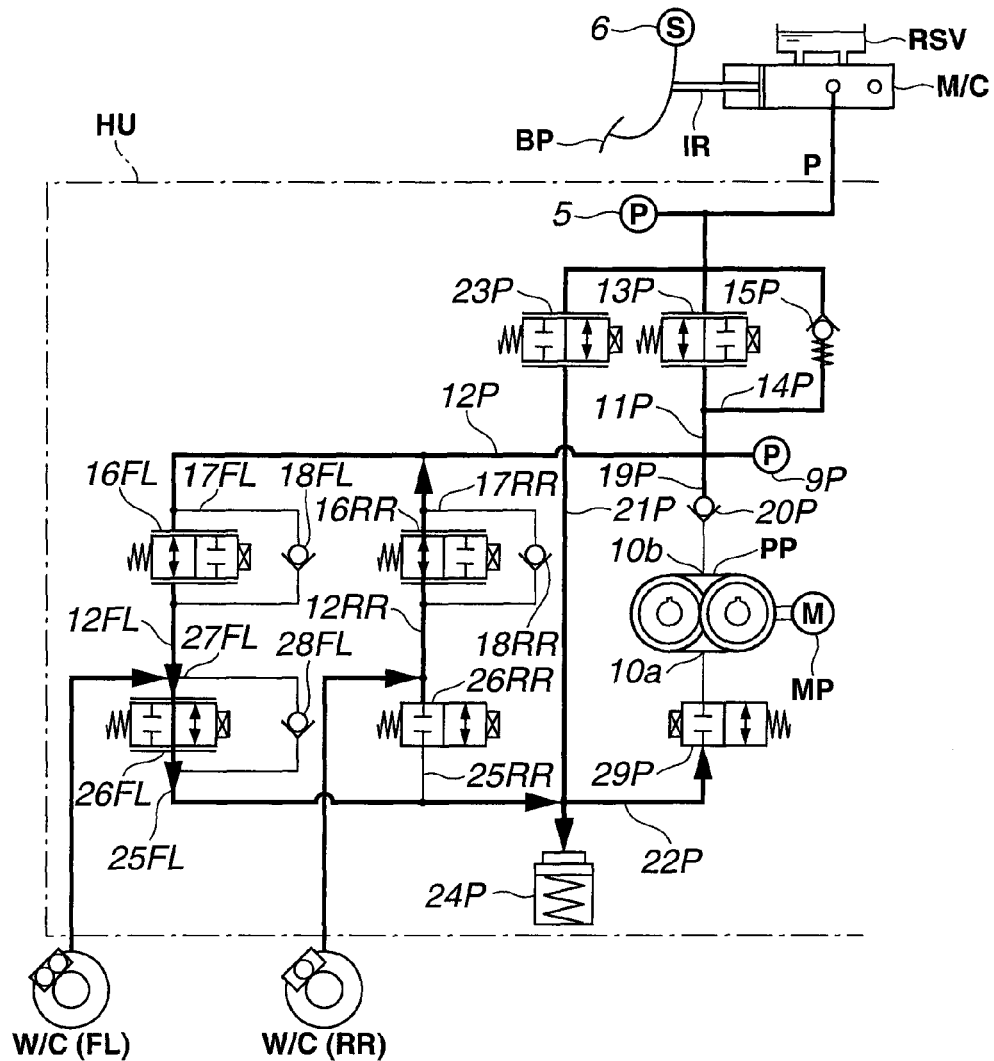
FIG. 19 is a schematic diagram showing how brake fluid flows in the hydraulic circuit when a regenerative braking force replaces a frictional braking force (P1−P2<Pr).
Figure 20:
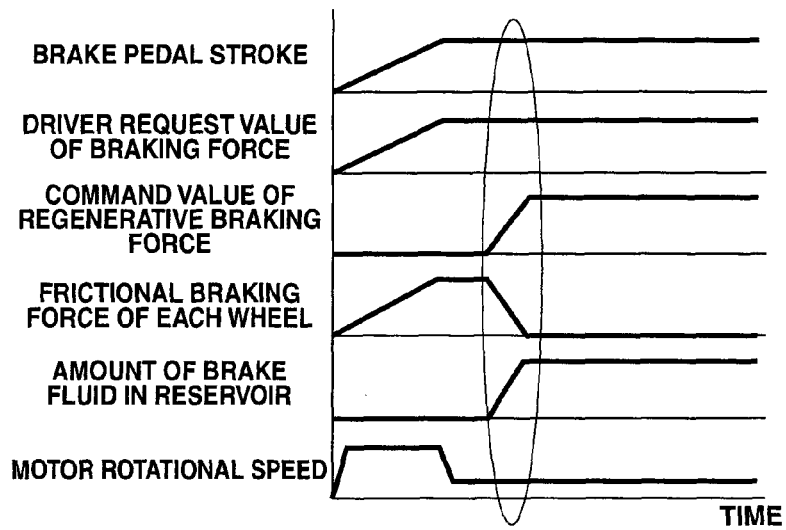
FIG. 20 is a time chart showing how the various variables of the brake system change with time when the regenerative braking force replaces the frictional braking force (P1−P2<Pr).

FIG. 19 schematically shows how brake fluid flows in the hydraulic circuit when a regenerative braking force replaces a frictional braking force (P1−P2<Pr). FIG. 20 shows how the various variables of the brake system change with time when the regenerative braking force replaces the frictional braking force (P1−P2<Pr). In this situation, the rotational speed of electric motor M is maintained at low speed for preparing a quick response to a pressure increase request, and pump suction shut-off valve 29 is operated to shut off the suction passage of pump P. In this situation, although solenoid out-valve 26RL and solenoid out-valve 26RR are maintained inactive, solenoid out-valve 26FL of left front road wheel FL and solenoid out-valve 26FR of right front road wheel FR are operated to reduce the wheel cylinder pressures of the front and rear wheels, and store an excess amount of brake fluid in reservoir 24. The feature that solenoid out-valves 26FL, 26FR are proportional electromagnetic valves serves to allow precise control of the amount of pressure reduction. In this way, the brake control apparatus achieves the replacement of frictional braking force with regenerative braking force.

Figure 21:
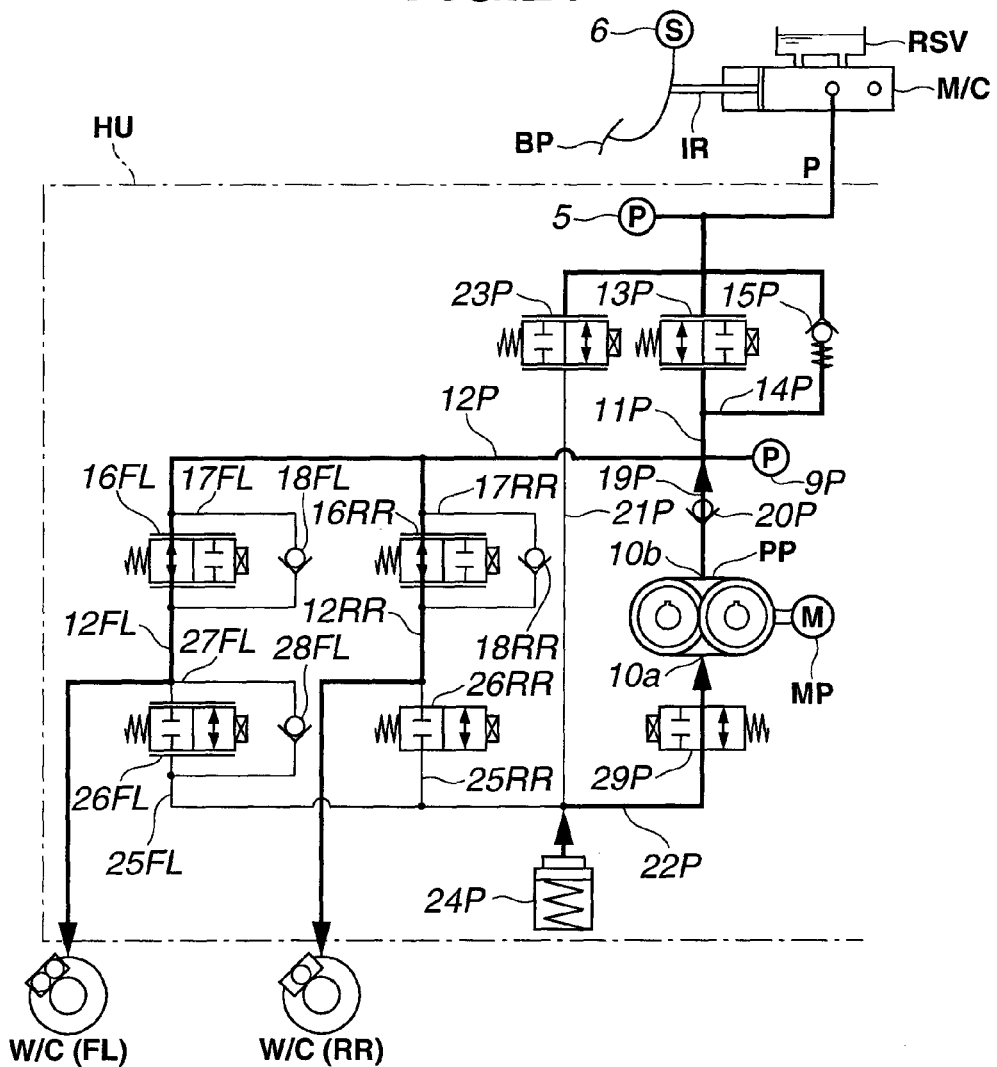
FIG. 21 is a schematic diagram showing how brake fluid flows in the hydraulic circuit when a frictional braking force replaces a regenerative braking force when the brake pedal is held in a depressed position (P1<Pr).
Figure 22:
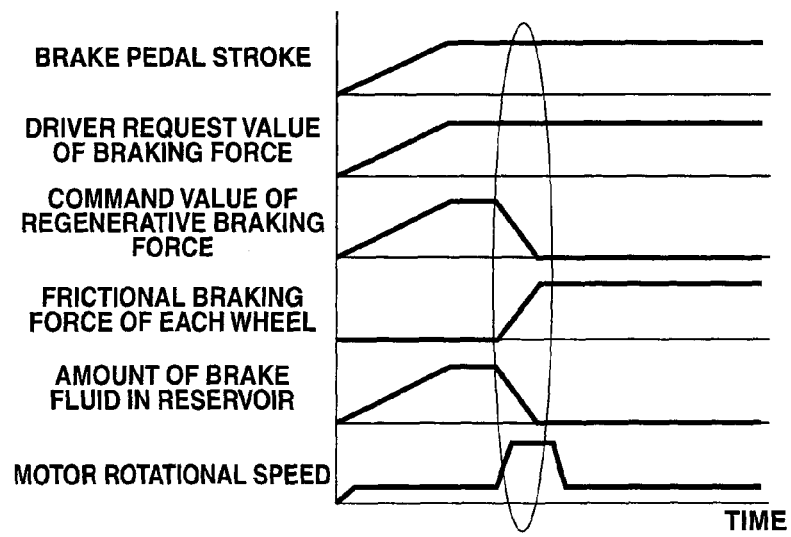
FIG. 22 is a time chart showing how the various variables of the brake system change with time when the frictional braking force replaces the regenerative braking force when the brake pedal is held in the depressed position (P1<Pr).

FIG. 21 schematically shows how brake fluid flows in the hydraulic circuit when a frictional braking force replaces a regenerative braking force when the brake pedal is held in a depressed position (P1<Pr). FIG. 22 shows how the various variables of the brake system change with time when the frictional braking force replaces the regenerative braking force when the brake pedal is held in the depressed position (P1<Pr). For replacement of regenerative braking force with frictional braking force, the brake fluid stored in reservoir 24 is brought back to wheel cylinders W/C by pump P in order to increase the wheel cylinder pressures. At this time, the pump suction shut-off valve 29 is controlled to operate to adjust the amount of sucked brake fluid of pump P so as to prevent pump P from excessively supplying brake fluid to wheel cylinders W/C. If an excess amount of brake fluid is however supplied to wheel cylinder W/C, gate-out valve 13 and gate-in valve 23 are controlled to operate to bring brake fluid back to reservoir 24 which is supplied from master cylinder M/C. In this way, the brake control apparatus achieves the replacement of frictional braking force with regenerative braking force.

Figure 23:
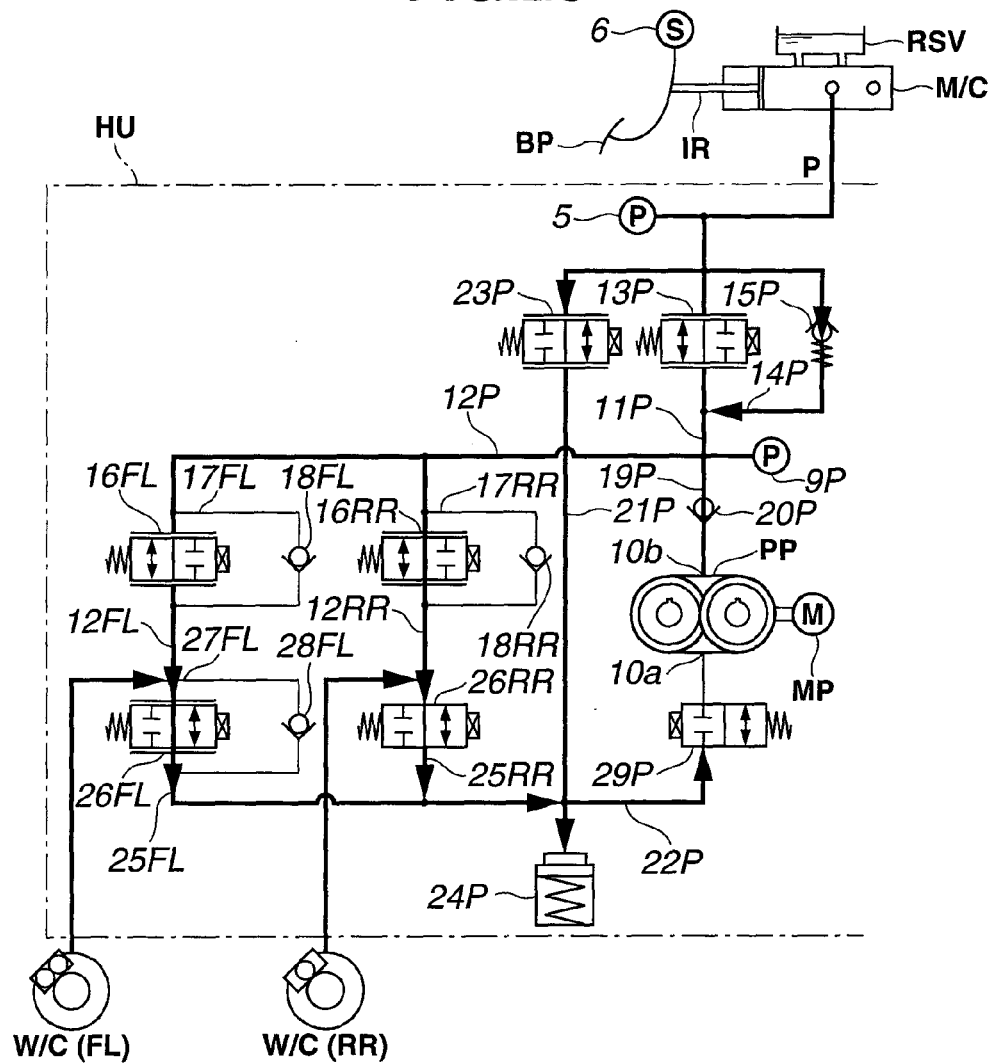
FIG. 23 is a schematic diagram showing how brake fluid flows in the hydraulic circuit when the brake pedal is further depressed down while a regenerative braking force replaces a frictional braking force (P1≥Pr).
Figure 24:
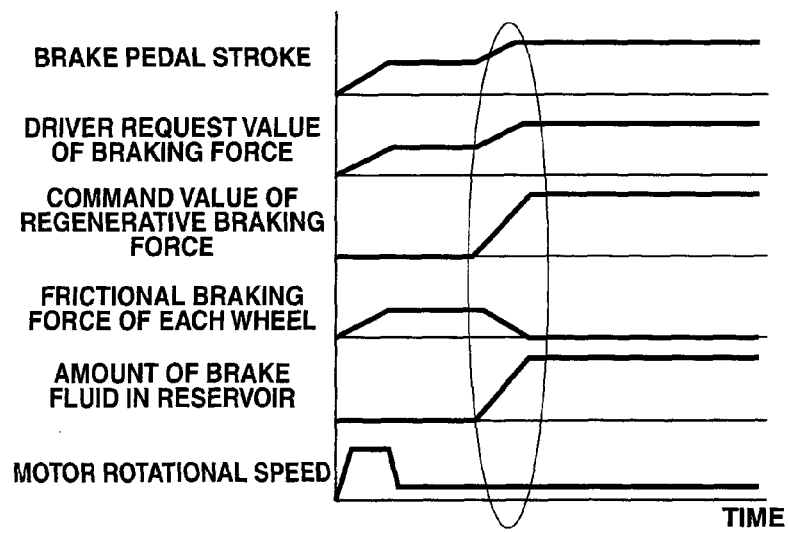
FIG. 24 is a time chart showing how the various variables of the brake system change with time when the brake pedal is further depressed down while the regenerative braking force replaces the frictional braking force (P1≥Pr).

FIG. 23 schematically shows how brake fluid flows in the hydraulic circuit when the brake pedal is further depressed down while a regenerative braking force replaces a frictional braking force (P1≥Pr). FIG. 24 shows how the various variables of the brake system change with time when the brake pedal is further depressed down while the regenerative braking force replaces the frictional braking force (P1≥Pr). In this situation, the rotational speed of electric motor M is maintained at low speed for preparing a quick response to a pressure increase request, and pump suction shut-off valve 29 is operated to shut off the suction passage of pump P. In this situation, the brake pedal BP is depressed so that the master cylinder pressure (brake fluid pressure P1) is above the threshold pressure Pr of relief valve 15. Accordingly, solenoid out-valve 26 for each front or rear wheel is operated to reduce the wheel cylinder pressure, and store brake fluid in reservoir 24. The relationship between brake fluid pressure P1 and brake fluid pressure P2 is not changed by the reduction of the wheel cylinder pressures. In consideration of this fact, for estimating the amount of brake fluid stored in reservoir 24, the relationship among brake fluid pressure P1, brake fluid pressure P2 and brake pedal stroke S is estimated based on the condition of each valve. In this way, the brake control apparatus achieves the replacement of frictional braking force with regenerative braking force.

Figure 25:
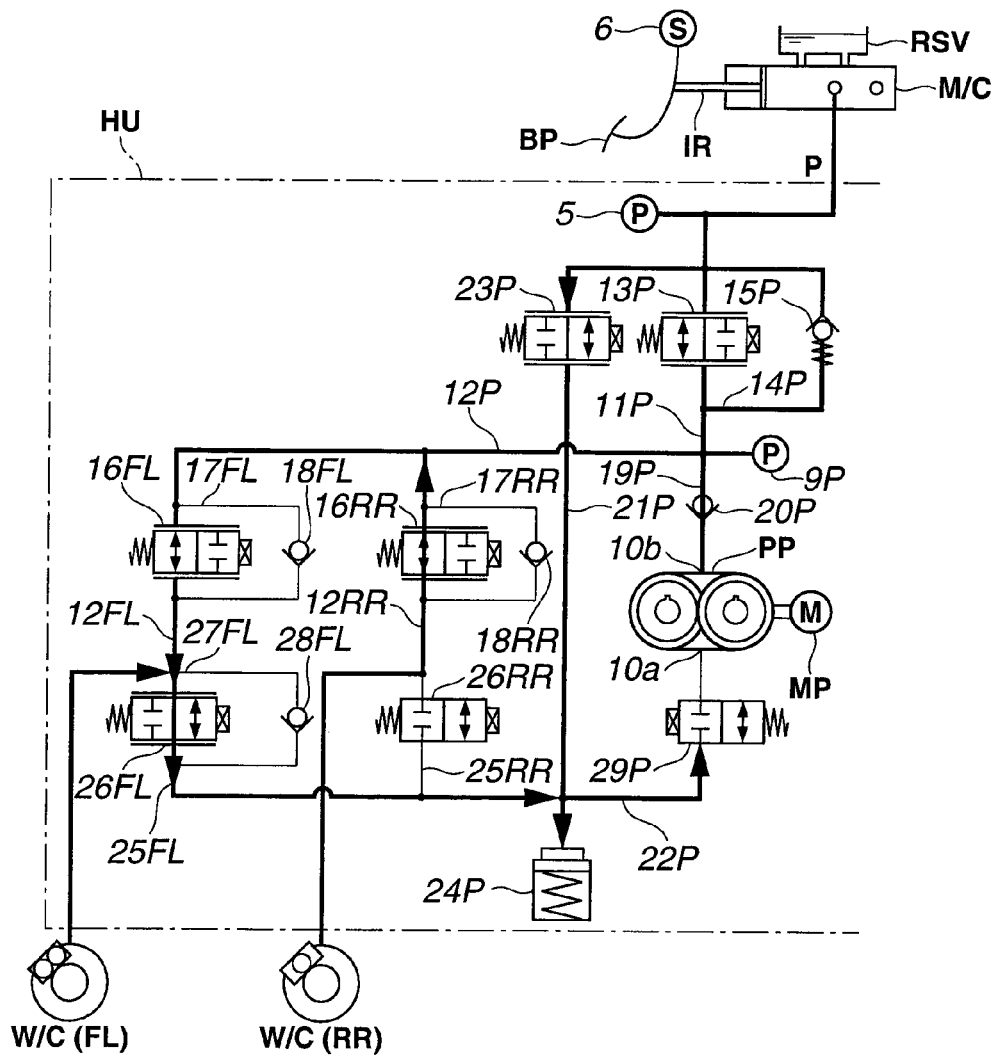
FIG. 25 is a schematic diagram showing how brake fluid flows in the hydraulic circuit when the brake pedal is further depressed down while a regenerative braking force replaces a frictional braking force (P1<Pr).
Figure 26:
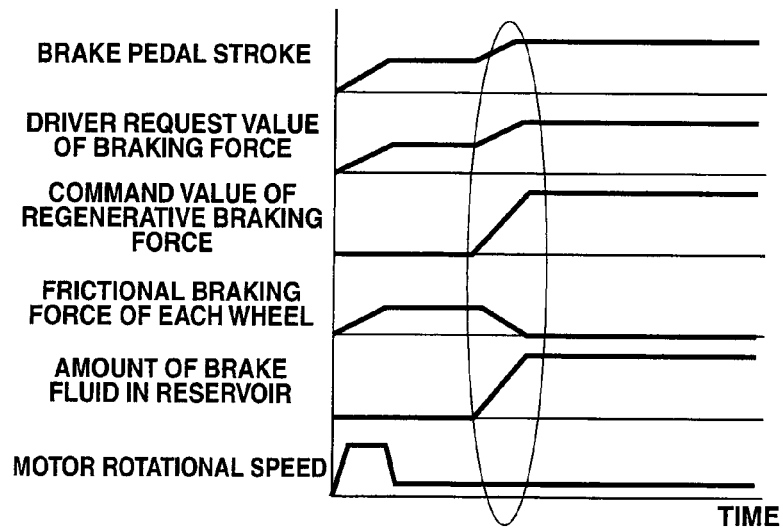
FIG. 26 is a time chart showing how the various variables of the brake system change with time when the brake pedal is further depressed down while the regenerative braking force replaces the frictional braking force (P1<Pr).

FIG. 25 schematically shows how brake fluid flows in the hydraulic circuit when the brake pedal is further depressed down while a regenerative braking force replaces a frictional braking force (P1<Pr). FIG. 26 shows how the various variables of the brake system change with time when the brake pedal is further depressed down while the regenerative braking force replaces the frictional braking force (P1<Pr). In this situation, the rotational speed of electric motor M is maintained at low speed for preparing a quick response to a pressure increase request, and pump suction shut-off valve 29 is operated to shut off the suction passage of pump P. In this situation, although solenoid out-valve 26RL and solenoid out-valve 26RR are maintained inactive, solenoid out-valve 26FL of left front road wheel FL and solenoid out-valve 26FR of right front road wheel FR are operated to reduce the wheel cylinder pressures of the front and rear wheels. The feature that solenoid out-valves 26FL, 26FR are proportional electromagnetic valves serves to allow precise control of the amount of pressure reduction. In this way, the brake control apparatus achieves the replacement of frictional braking force with regenerative braking force.

Figure 27:
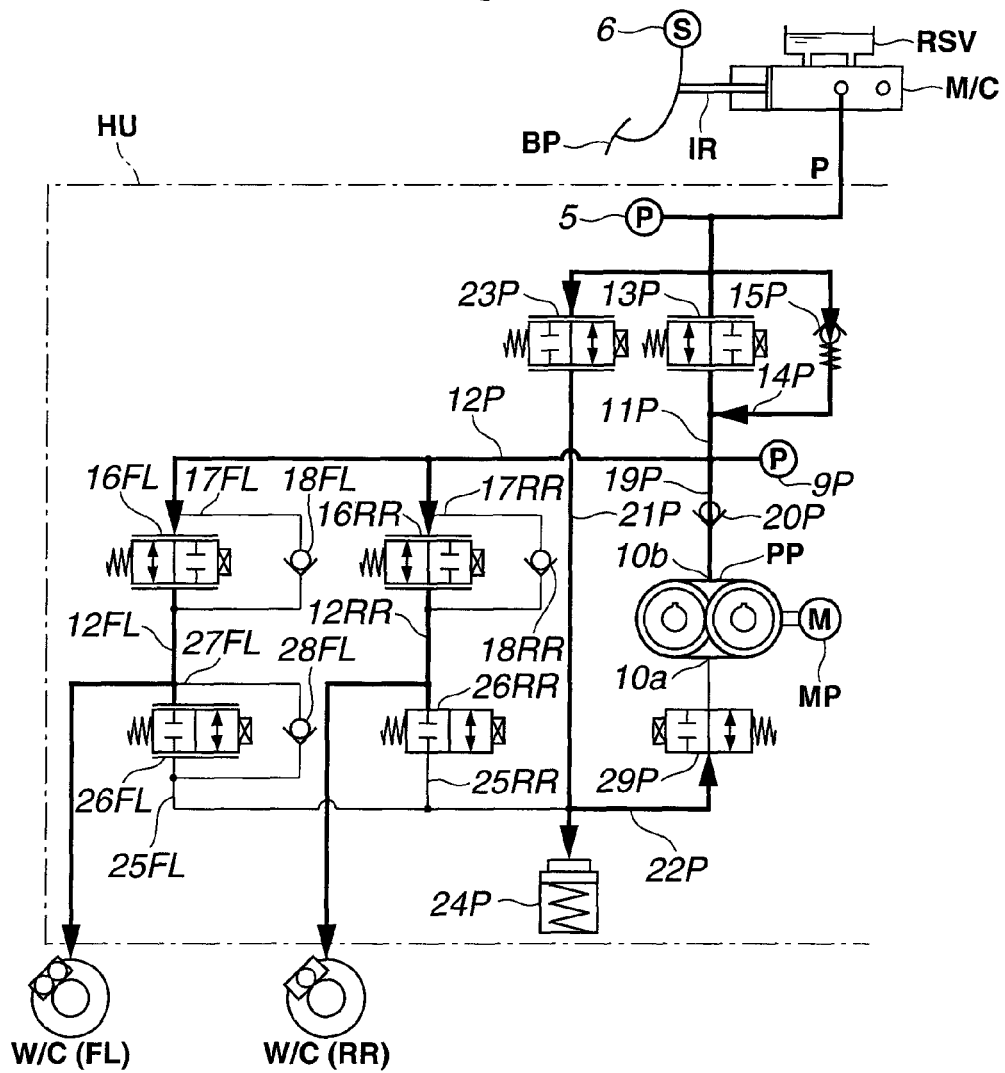
FIG. 27 is a schematic diagram showing how brake fluid flows in the hydraulic circuit when a frictional braking force replaces a regenerative braking force while the brake pedal is being depressed down (P1≥Pr).
Figure 28:
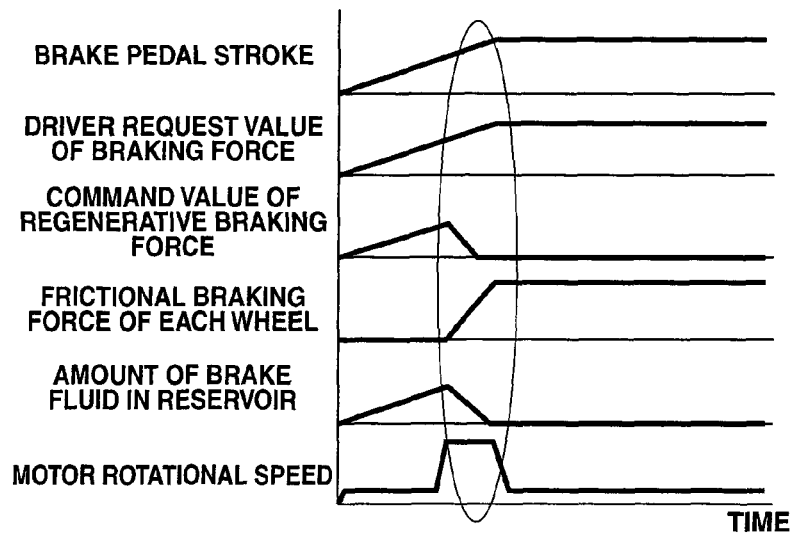
FIG. 28 is a time chart showing how the various variables of the brake system change with time when the frictional braking force replaces the regenerative braking force while the brake pedal is being depressed down (P1≥Pr).

FIG. 27 schematically shows how brake fluid flows in the hydraulic circuit when a frictional braking force replaces a regenerative braking force while the brake pedal is being depressed down (P1≥Pr). FIG. 28 shows how the various variables of the brake system change with time when the frictional braking force replaces the regenerative braking force while the brake pedal is being depressed down (P1≥Pr). In this situation, pump P is controlled to suck and discharge brake fluid from reservoir 24, while each solenoid in-valve 16 is operated to control the wheel cylinder pressure. The rotational speed of electric motor M and the duty period or operation period of pump suction shut-off valve 29 are controlled according to brake fluid pressure P2. This is because when solenoid in-valve 16 is used for pressure increase, brake fluid pressure P2 falls so that brake fluid flows from the side of master cylinder M/C through relief valve 15. Gate-out valve 13 is controlled to prevent the pressure between solenoid in-valves 16 and gate-out valve 13 from excessively rising. The wheel cylinder pressure is controlled by solenoid in-valve 16. In this way, the brake control apparatus achieves the replacement of regenerative braking force with frictional braking force.

Figure 29:
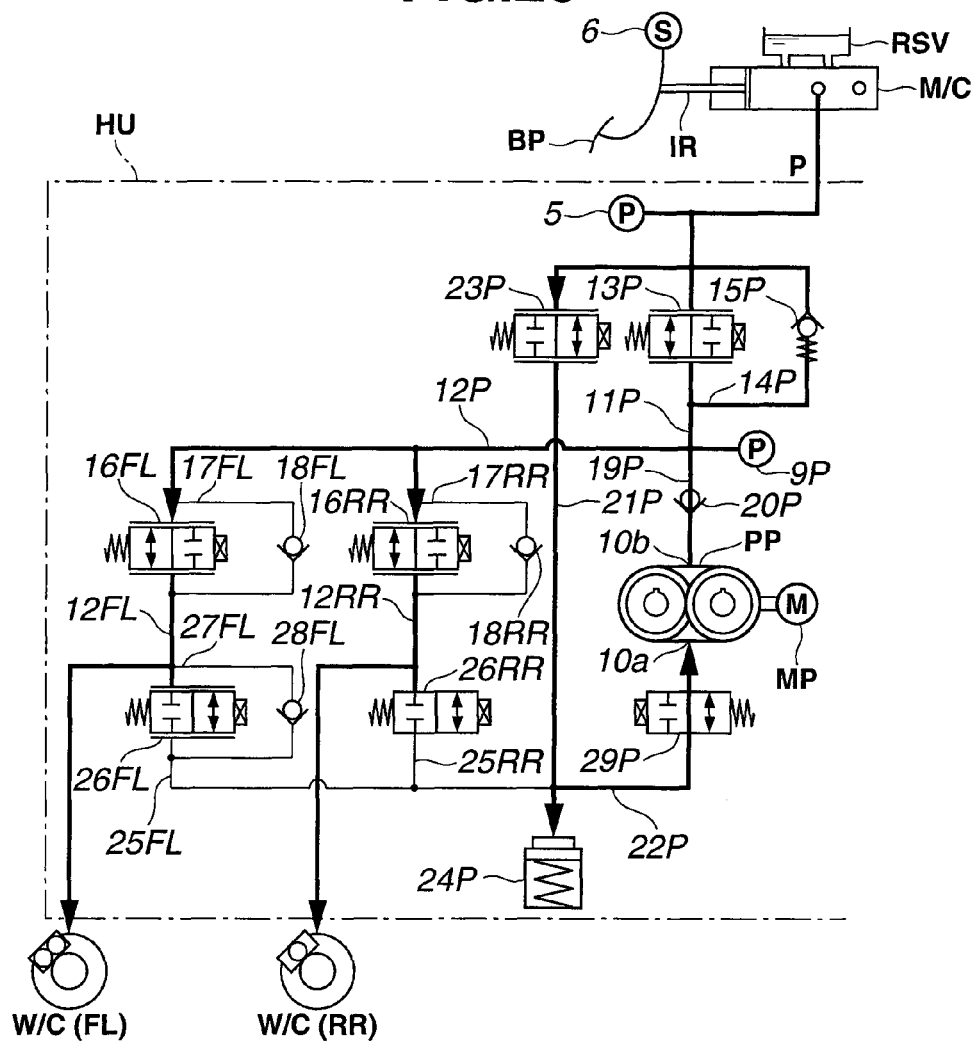
FIG. 29 is a schematic diagram showing how brake fluid flows in the hydraulic circuit when a frictional braking force replaces a regenerative braking force while the brake pedal is being depressed down (P1<Pr).
Figure 30:
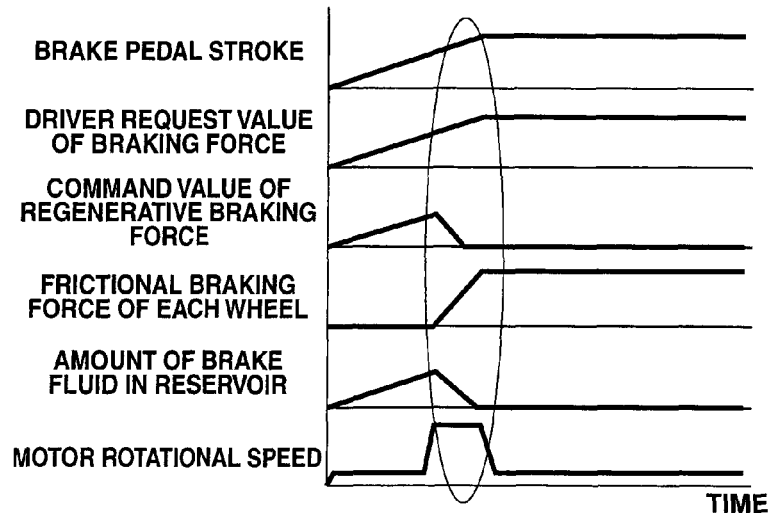
FIG. 30 is a time chart showing how the various variables of the brake system change with time when the frictional braking force replaces the regenerative braking force while the brake pedal is being depressed down (P1<Pr).

FIG. 29 schematically shows how brake fluid flows in the hydraulic circuit when a frictional braking force replaces a regenerative braking force while the brake pedal is being depressed down (P1<Pr). FIG. 30 shows how the various variables of the brake system change with time when the frictional braking force replaces the regenerative braking force while the brake pedal is being depressed down (P1<Pr). In this situation, pump P is controlled to suck and discharge brake fluid from reservoir 24, while each solenoid in-valve 16 is operated to control the wheel cylinder pressure. The rotational speed of electric motor M and the duty period or operation period of pump suction shut-off valve 29 are controlled according to brake fluid pressure P2. The wheel cylinder pressure is controlled by solenoid in-valve 16. In this way, the brake control apparatus achieves the replacement of regenerative braking force with frictional braking force.

Figure 31:
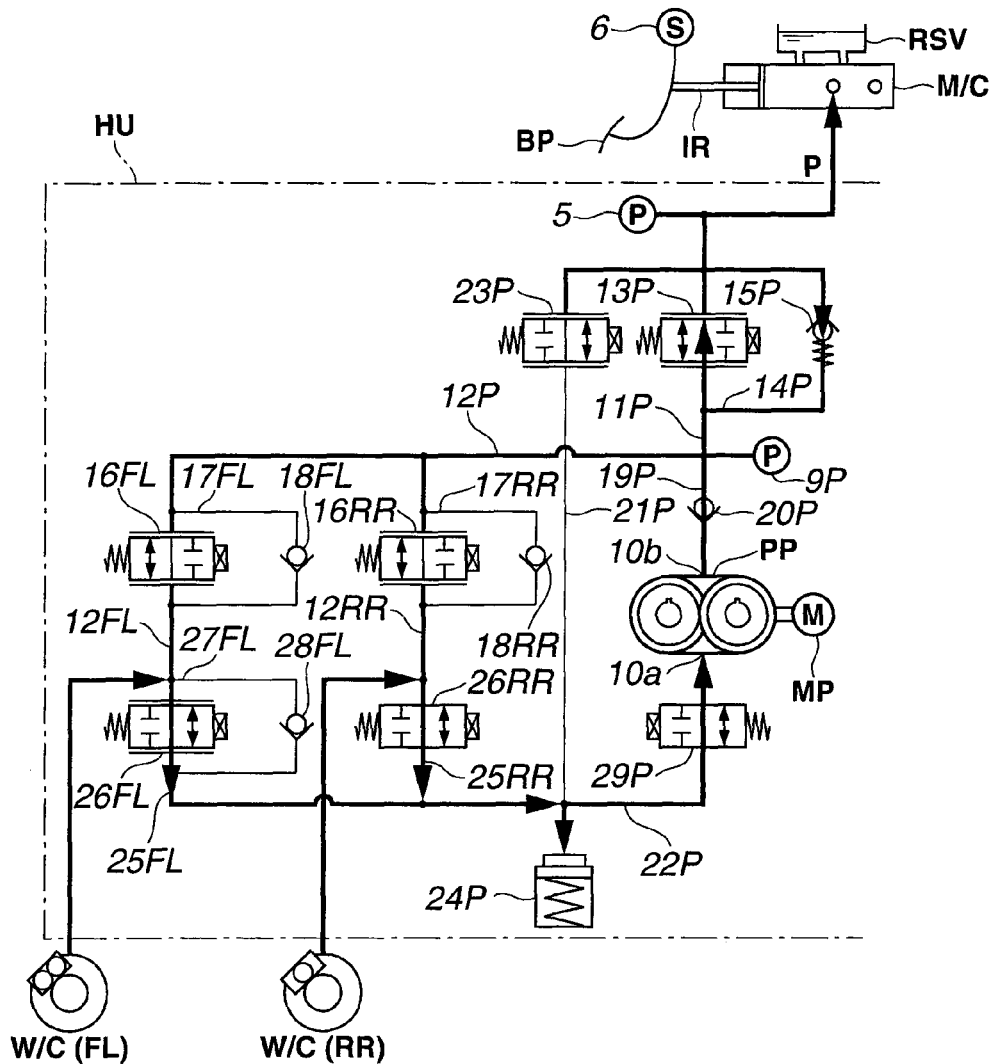
FIG. 31 is a schematic diagram showing how brake fluid flows in the hydraulic circuit when a regenerative braking force replaces a frictional braking force while the brake pedal is being released from a depressed position (P1≥Pr).
Figure 32:
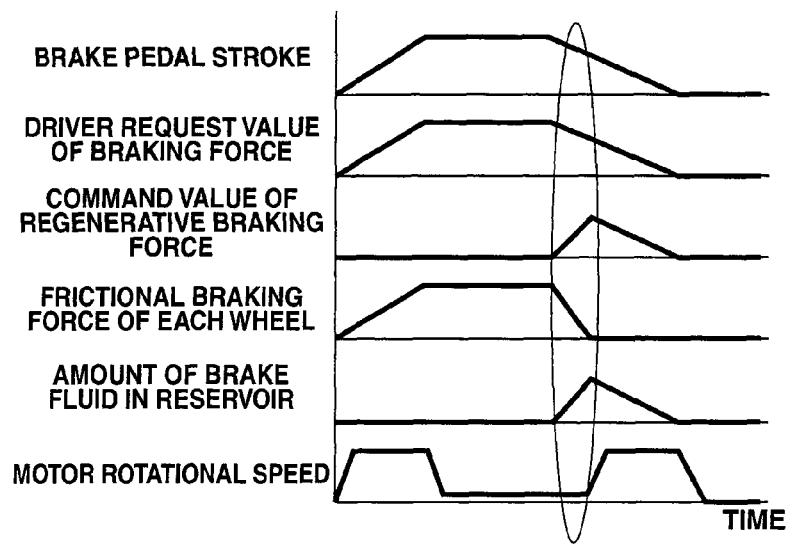
FIG. 32 is a time chart showing how the various variables of the brake system change with time when the regenerative braking force replaces the frictional braking force while the brake pedal is being released from the depressed position (P1≥Pr).

FIG. 31 schematically shows how brake fluid flows in the hydraulic circuit when a regenerative braking force replaces a frictional braking force while the brake pedal is being released from a depressed position (P1≥Pr). FIG. 32 shows how the various variables of the brake system change with time when the regenerative braking force replaces the frictional braking force while the brake pedal is being released from the depressed position (P1≥Pr). In this situation, pump P is controlled to suck and discharge brake fluid from reservoir 24, while each solenoid out-valve 26 is operated to control the master cylinder pressure. The rotational speed of electric motor M and the duty period or operation period of pump suction shut-off valve 29 are controlled according to brake fluid pressure P2. The wheel cylinder pressure is controlled by solenoid out-valve 26. In this way, the brake control apparatus achieves the replacement of frictional braking force with regenerative braking force.

Figure 33:
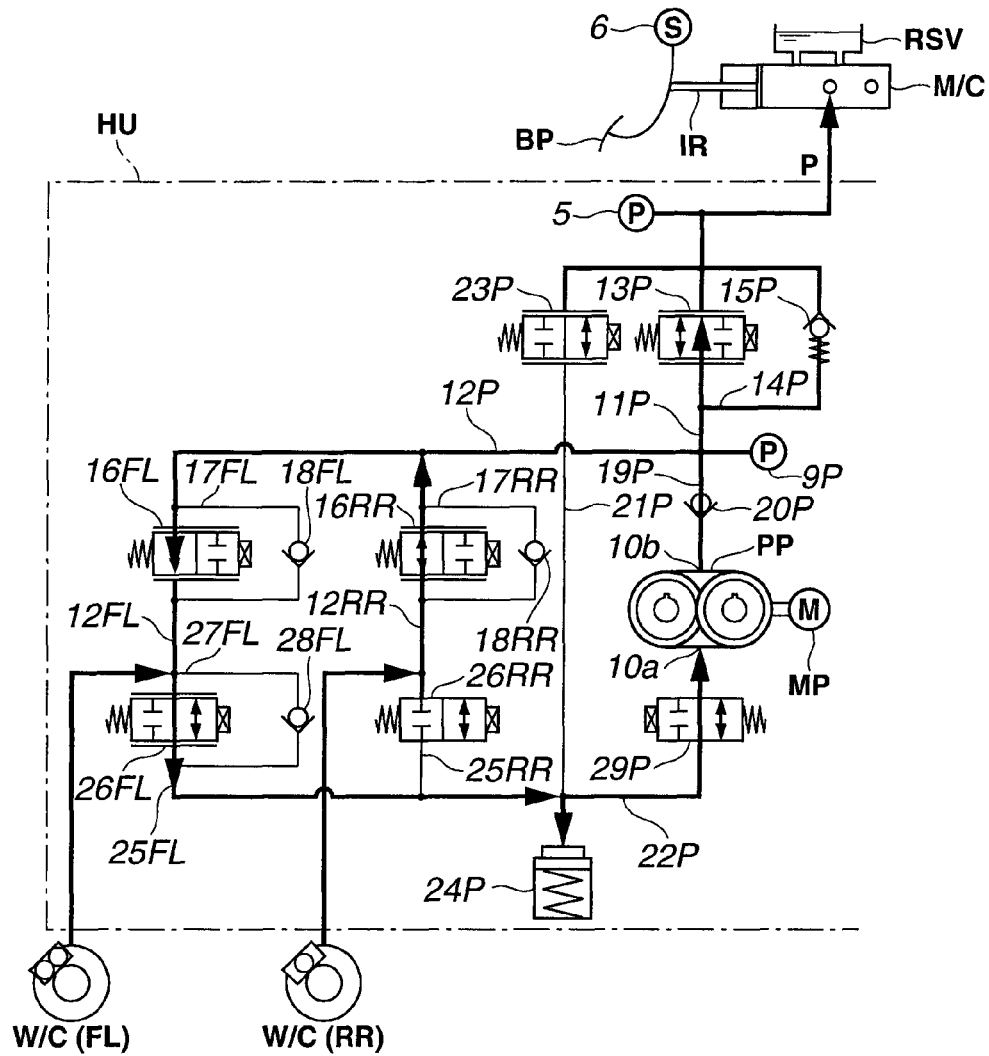
FIG. 33 is a schematic diagram showing how brake fluid flows in the hydraulic circuit when a regenerative braking force replaces a frictional braking force while the brake pedal is being released from a depressed position (P1<Pr).
Figure 34:
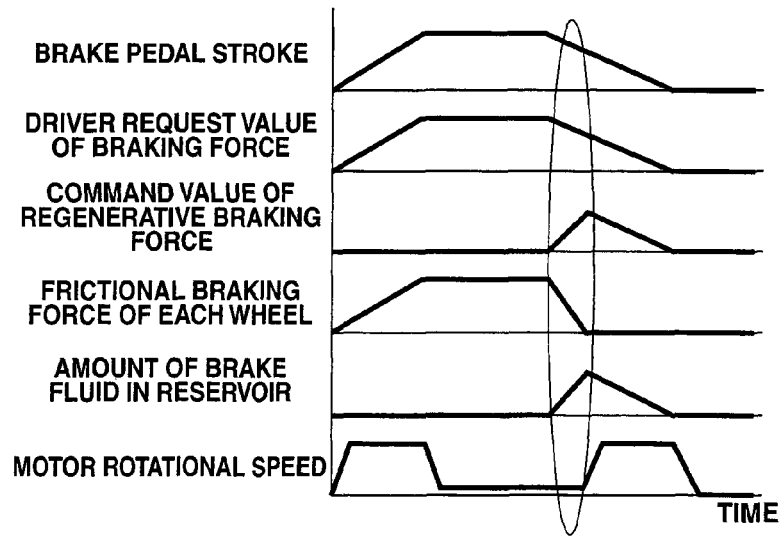
FIG. 34 is a time chart showing how the various variables of the brake system change with time when the regenerative braking force replaces the frictional braking force while the brake pedal is being released from the depressed position (P1<Pr).

FIG. 33 schematically shows how brake fluid flows in the hydraulic circuit when a regenerative braking force replaces a frictional braking force while the brake pedal is being released from a depressed position (P1<Pr). FIG. 34 shows how the various variables of the brake system change with time when the regenerative braking force replaces the frictional braking force while the brake pedal is being released from the depressed position (P1<Pr). In this situation, pump P is controlled to suck and discharge brake fluid from reservoir 24, while each solenoid out-valve 26 is operated to control the master cylinder pressure. The rotational speed of electric motor M and the duty period or operation period of pump suction shut-off valve 29 are controlled according to brake fluid pressure P2. The wheel cylinder pressure is controlled by solenoid out-valve 26FL. In this way, the brake control apparatus achieves the replacement of regenerative braking force with frictional braking force.

Figure 35:
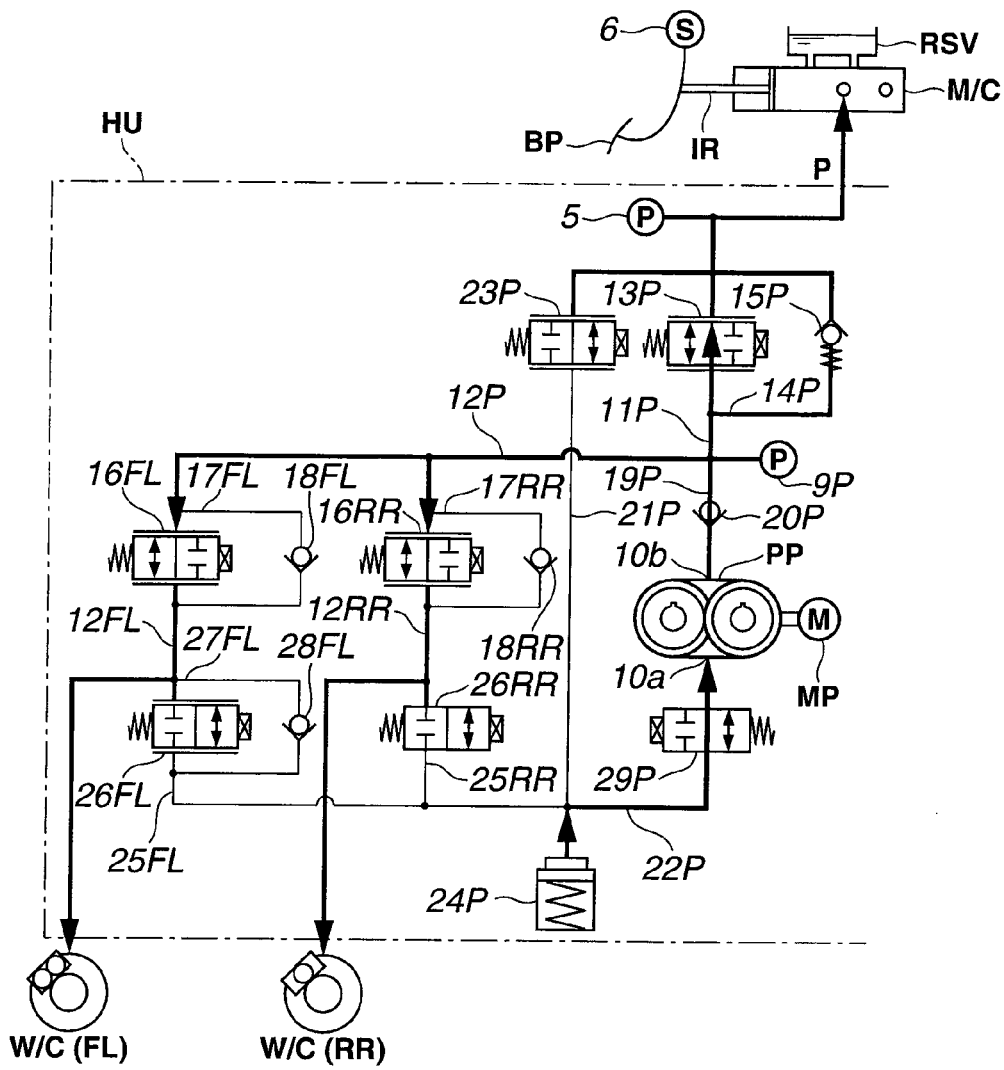
FIG. 35 is a schematic diagram showing how brake fluid flows in the hydraulic circuit when a frictional braking force replaces a regenerative braking force while the brake pedal is being released from a depressed position.
Figure 36:
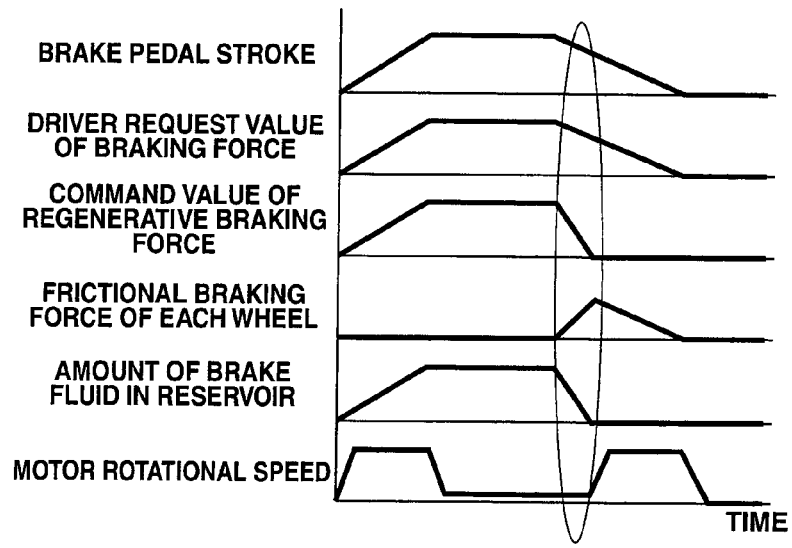
FIG. 36 is a time chart showing how the various variables of the brake system change with time when the frictional braking force replaces the regenerative braking force while the brake pedal while the brake pedal is being released from the depressed position.

FIG. 35 schematically shows how brake fluid flows in the hydraulic circuit when a frictional braking force replaces a regenerative braking force while the brake pedal is being released from a depressed position. FIG. 36 shows how the various variables of the brake system change with time when the frictional braking force replaces the regenerative braking force while the brake pedal while the brake pedal is being released from the depressed position. In this situation, pump P is controlled to suck and discharge brake fluid from reservoir 24, while each solenoid out-valve 26 is operated to control the master cylinder pressure. The rotational speed of electric motor M and the duty period or operation period of pump suction shut-off valve 29 are controlled according to brake fluid pressure P2. The wheel cylinder pressure is controlled by solenoid in-valve 16. In this way, the brake control apparatus achieves the replacement of regenerative braking force with frictional braking force.

<Interruption of Automatic Braking Control During Regenerative Braking Control> In the first embodiment, in situations where interruption of an automatic braking control system such as an ABS control system occurs during regenerative braking force control, the regenerative braking force is prevented from increasing, except when the request of braking force presented by the automatic braking control system is larger than the driver request value.

Figure 37:
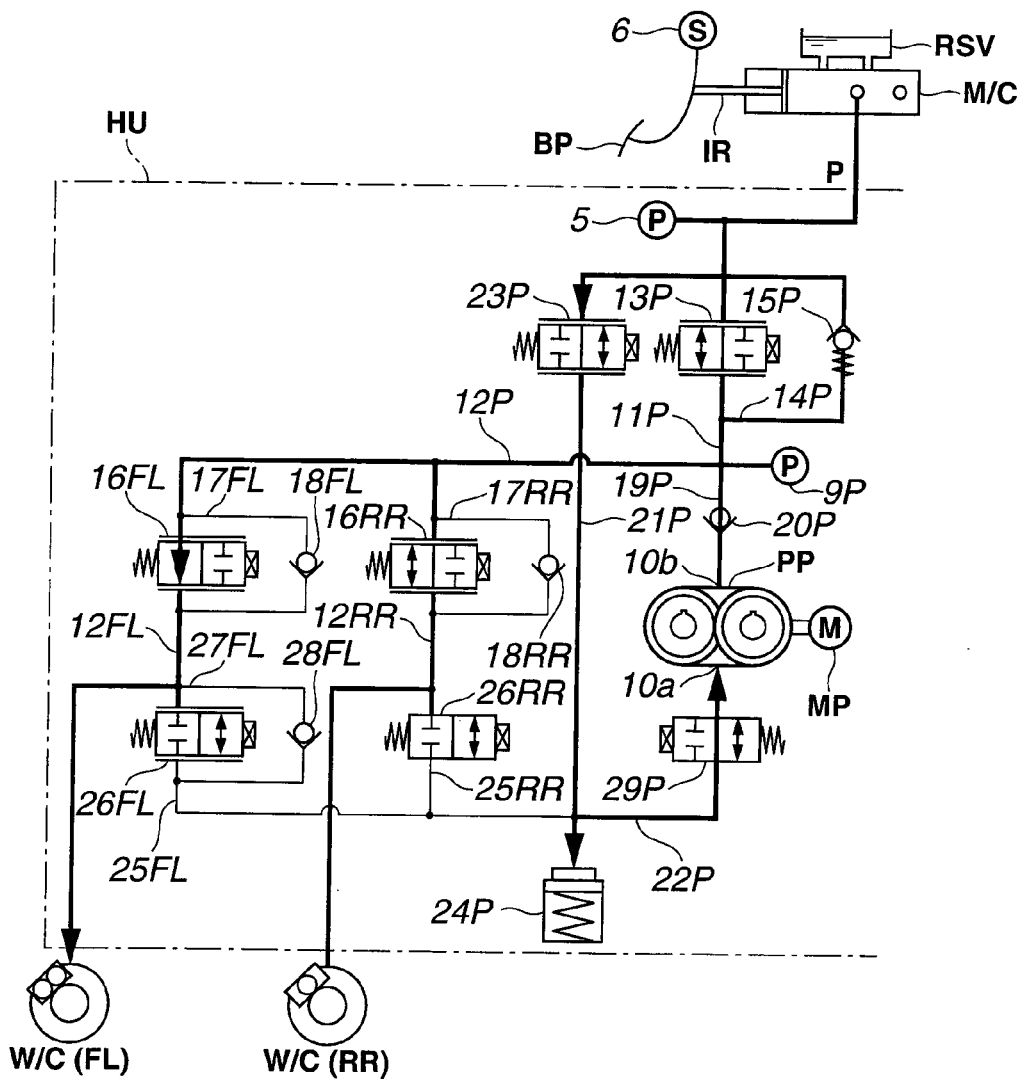
FIG. 37 is a schematic diagram showing how brake fluid flows in the hydraulic circuit when braking forces of rear wheels RL, RR are held under EBD control or before interruption of ABS control.
Figure 38:
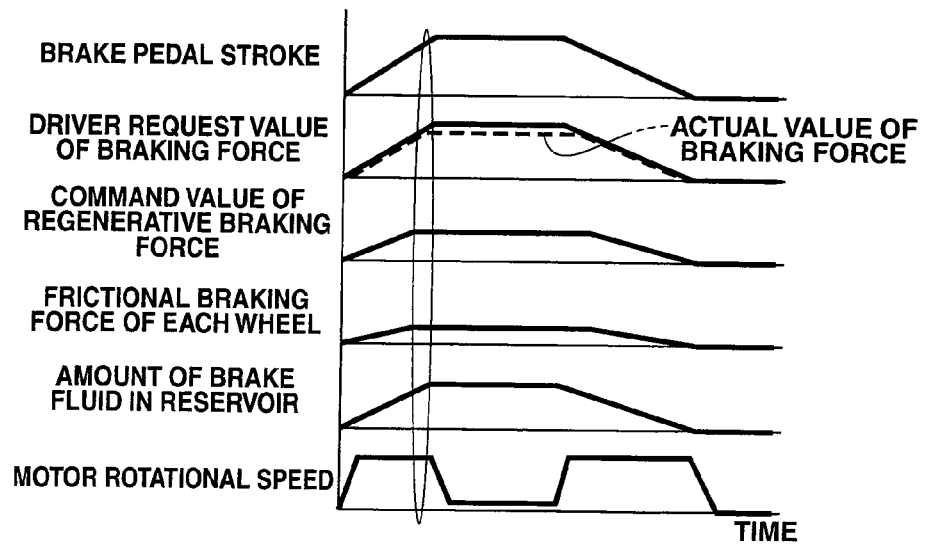
FIG. 38 is a time chart showing how the various variables of the brake system change with time when braking forces of rear wheels RL, RR are held under EBD control or before interruption of ABS control.

FIG. 37 schematically shows how brake fluid flows in the hydraulic circuit when braking forces of rear wheels RL, RR are held under EBD control or before interruption of ABS control. FIG. 38 shows how the various variables of the brake system change with time when braking forces of rear wheels RL, RR are held under EBD control or before interruption of ABS control. In this situation, pump P is controlled to suck and discharge brake fluid from reservoir 24, while each solenoid out-valve 26 is operated to control the master cylinder pressure. The rotational speed of electric motor M and the duty period or operation period of pump suction shut-off valve 29 are controlled according to brake fluid pressure P2. The wheel cylinder pressures of left and right rear road wheels RL, RR are controlled by solenoid in-valves 16RL, 16RR. In this way, the brake control apparatus can increase the wheel cylinder pressures of left and right front road wheels FL, FR according to brake pedal stroke S, while holding the wheel cylinder pressures of left and right rear road wheels RL, RR.

Figure 39:
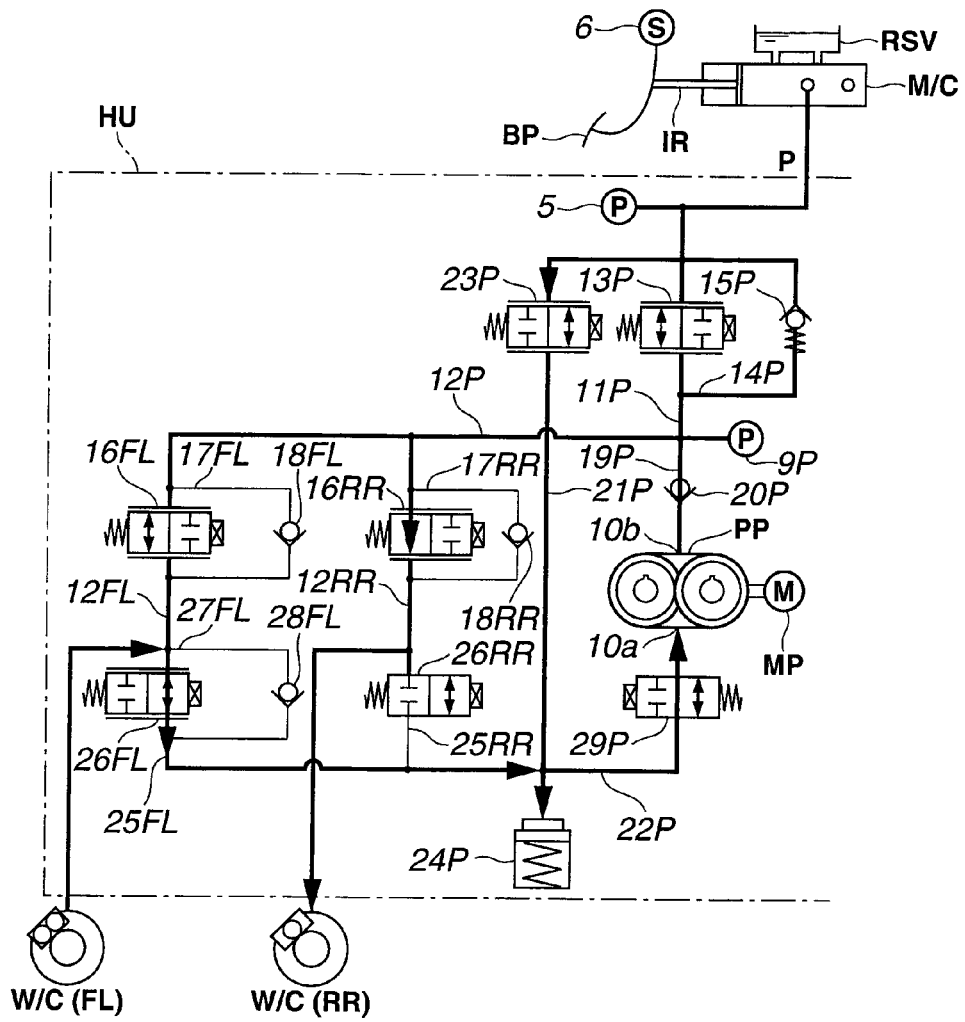
FIG. 39 is a schematic diagram showing how brake fluid flows in the hydraulic circuit when wheel cylinder pressure of left front road wheel FL is reduced under interruption of ABS control and regenerative braking force is maintained (with a driver request of braking force increased).
Figure 40:
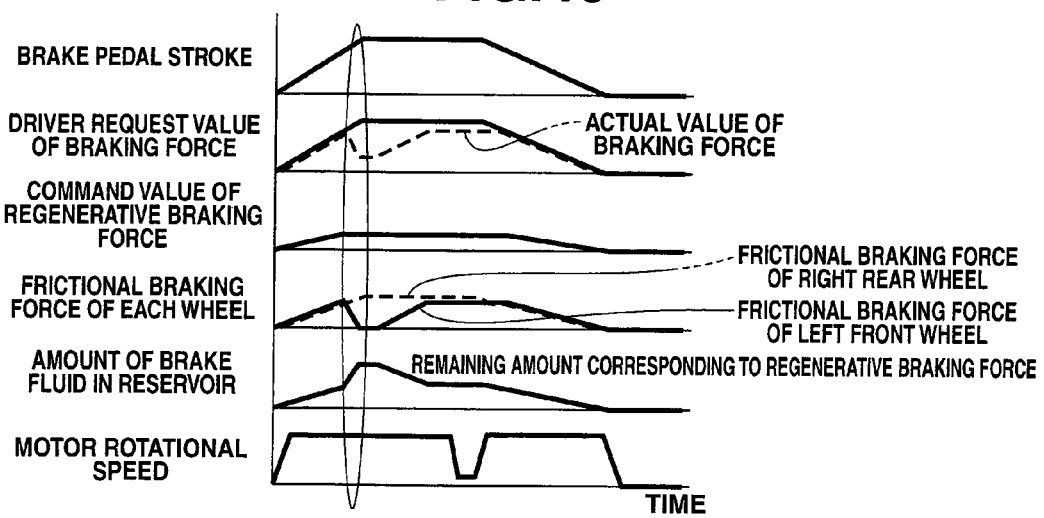
FIG. 40 is a time chart showing how the various variables of the brake system change with time when wheel cylinder pressure of left front road wheel FL is reduced under interruption of ABS control and regenerative braking force is maintained (with a driver request of braking force increased).

FIG. 39 schematically shows how brake fluid flows in the hydraulic circuit when wheel cylinder pressure of left front road wheel FL is reduced under interruption of ABS control and regenerative braking force is maintained (with a driver request of braking force increased). FIG. 40 shows how the various variables of the brake system change with time when wheel cylinder pressure of left front road wheel FL is reduced under interruption of ABS control and regenerative braking force is maintained (with a driver request of braking force increased). In this situation, pump P is controlled to suck and discharge brake fluid from reservoir 24, while each solenoid out-valve 26 is operated to control the master cylinder pressure. The rotational speed of electric motor M and the duty period or operation period of pump suction shut-off valve 29 are controlled according to brake fluid pressure P2. When the ABS control system is in operation, the rotational speed of electric motor M is maintained high, whereas the discharge amount of pump P is controlled by pump suction shut-off valve 29. The wheel cylinder pressure of left front road wheel FL is controlled by solenoid in-valve 16FL and solenoid out-valve 26FL. In this way, the brake control apparatus can suppress left front road wheel FL, as a target of the ABS control, from locking, by reducing the frictional braking force.

Figure 41:
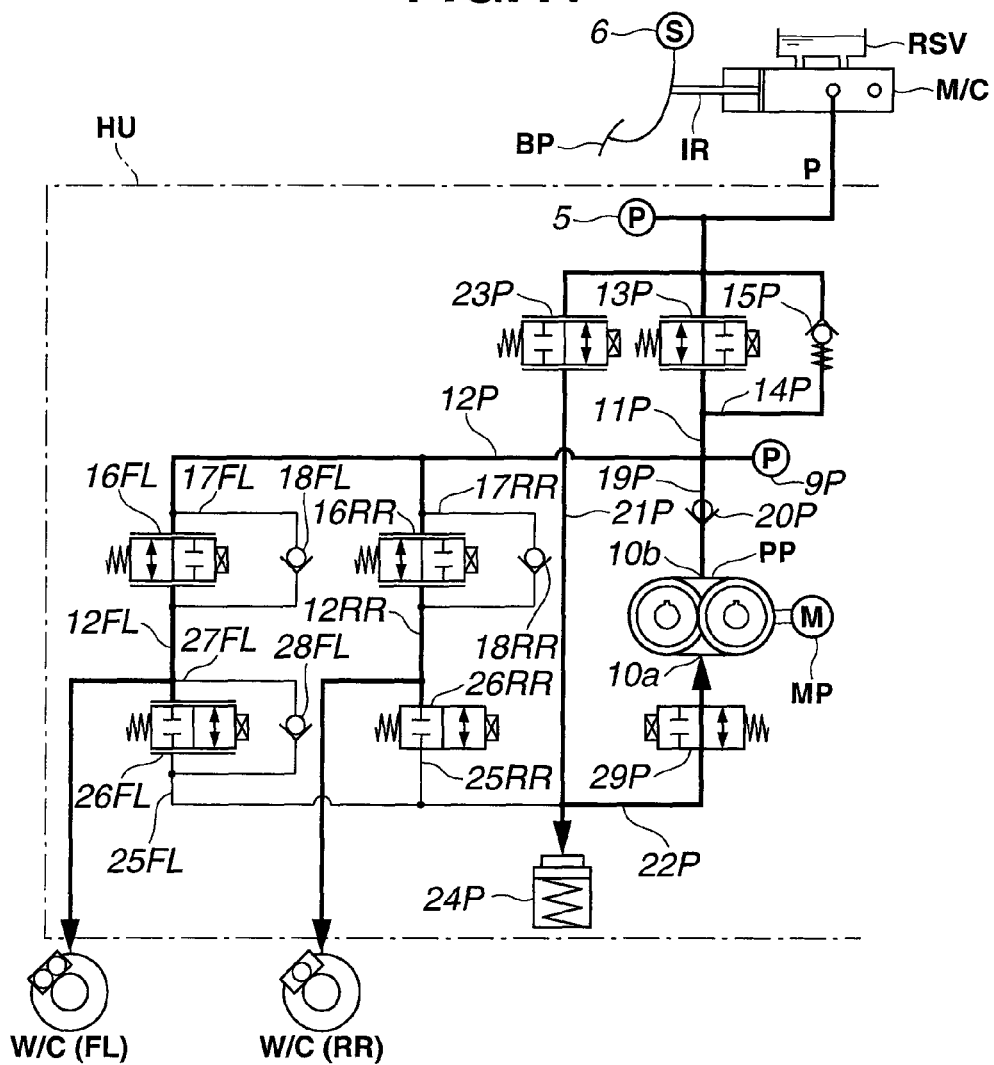
FIG. 41 is a schematic diagram showing how brake fluid flows in the hydraulic circuit when regenerative braking force is reduced under interruption of ABS control and frictional braking force is maintained.
Figure 42:
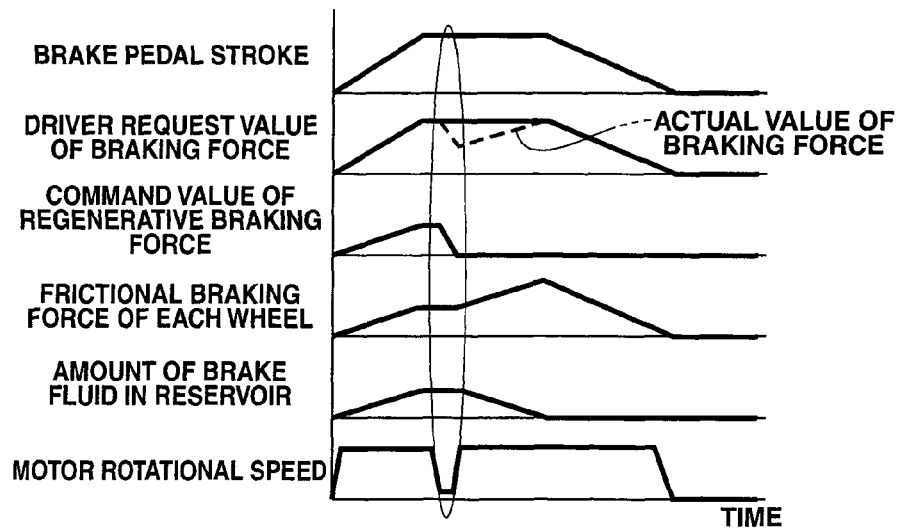
FIG. 42 is a time chart showing how the various variables of the brake system change with time when regenerative braking force is reduced under interruption of ABS control and frictional braking force is maintained.

FIG. 41 schematically shows how brake fluid flows in the hydraulic circuit when regenerative braking force is reduced under interruption of ABS control and frictional braking force is maintained. FIG. 42 shows how the various variables of the brake system change with time when regenerative braking force is reduced under interruption of ABS control and frictional braking force is maintained. In this situation, pump P is controlled to suck and discharge brake fluid from reservoir 24, while each solenoid out-valve 26 is operated to control the master cylinder pressure. The rotational speed of electric motor M and the duty period or operation period of pump suction shut-off valve 29 are controlled according to brake fluid pressure P2. In cases where the frictional braking force is to be held, the rotational speed of electric motor M is reduced, and pump suction shut-off valve 29 is operated. The wheel cylinder pressures of left and right front road wheels FL, FR and left and right rear road wheels RL, RR are controlled by solenoid in-valves 16FL, 16RR, 16RL and 16FR. In this way, the brake control apparatus can suppress left front road wheel FL, as a target of the ABS control, from locking, by reducing the regenerative braking force.

Figure 43:
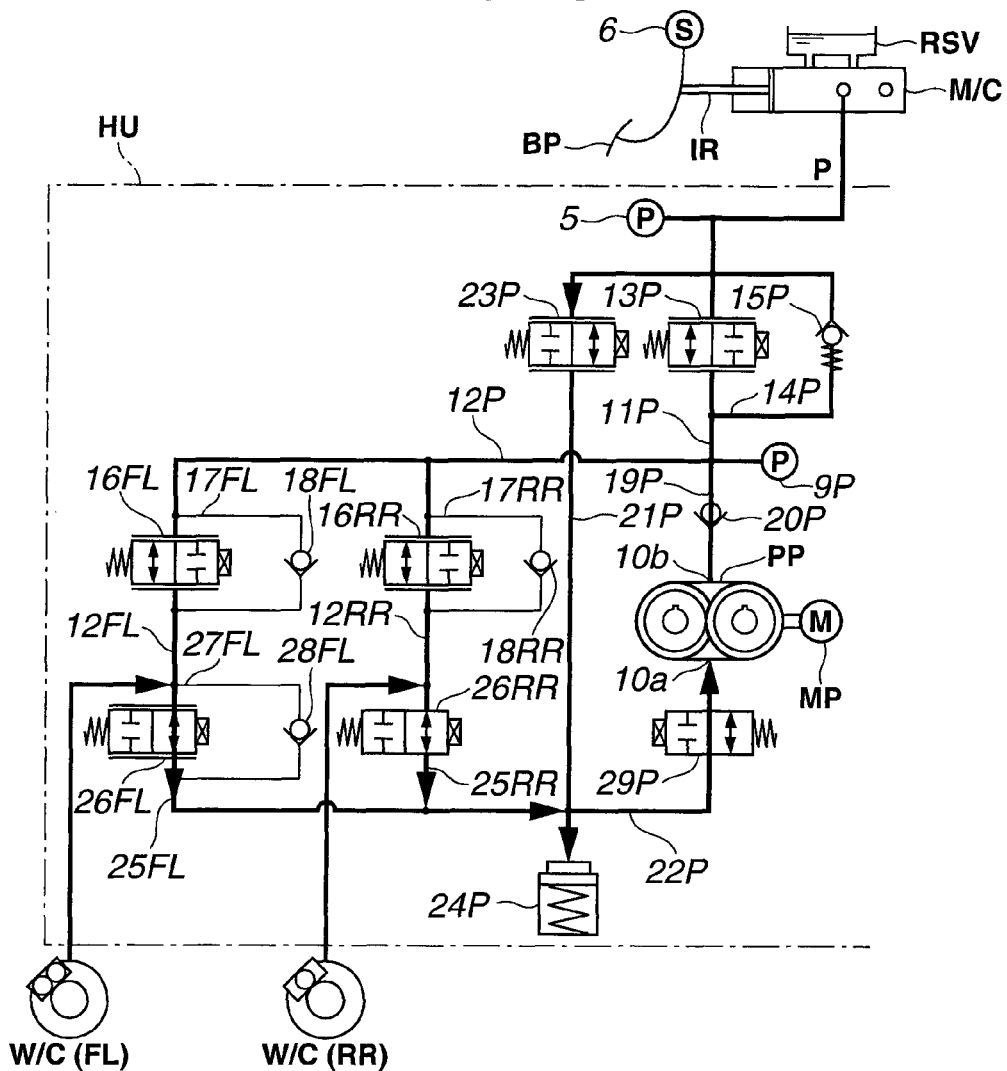
FIG. 43 is a schematic diagram showing how brake fluid flows in the hydraulic circuit when both of regenerative braking force and frictional braking force are reduced under interruption of ABS control.
Figure 44:
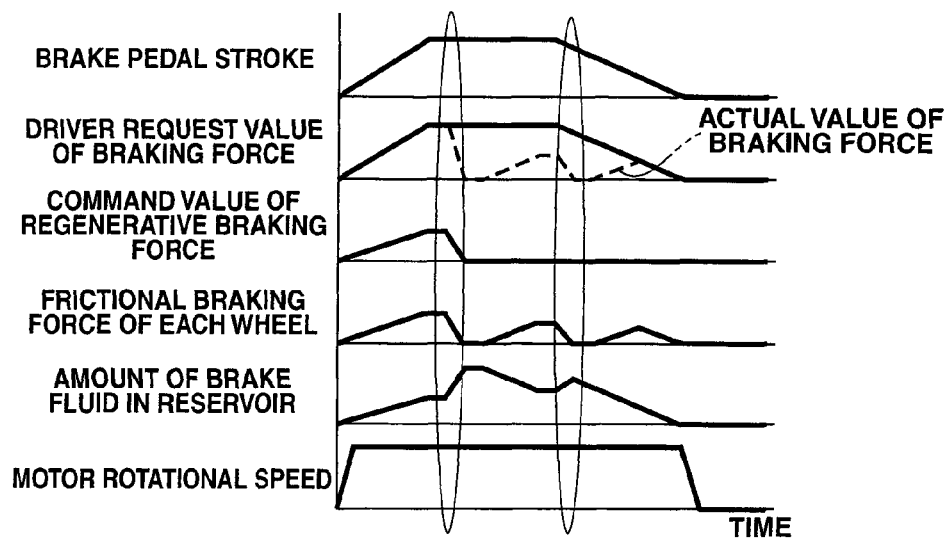
FIG. 44 is a time chart showing how the various variables of the brake system change with time when both of regenerative braking force and frictional braking force are reduced under interruption of ABS control.

FIG. 43 schematically shows how brake fluid flows in the hydraulic circuit when both of regenerative braking force and frictional braking force are reduced under interruption of ABS control. FIG. 44 shows how the various variables of the brake system change with time when both of regenerative braking force and frictional braking force are reduced under interruption of ABS control. In this situation, pump P is controlled to suck and discharge brake fluid from reservoir 24, while each solenoid out-valve 26 is operated to control the master cylinder pressure. The rotational speed of electric motor M and the duty period or operation period of pump suction shut-off valve 29 are controlled according to brake fluid pressure P2. In the event of interruption of ABS control, the rotational speed of electric motor M is maintained high for quick response to a pressure increase request. The wheel cylinder pressures of left and right front road wheels FL, FR and left and right rear road wheels RL, RR are controlled by solenoid in-valves 16FL, 16RR, 16RL and 16FR. In this way, the brake control apparatus can suppress left front road wheel FL, as a target of the ABS control, from locking, by reducing the regenerative braking force and frictional braking force.

Figure 45:
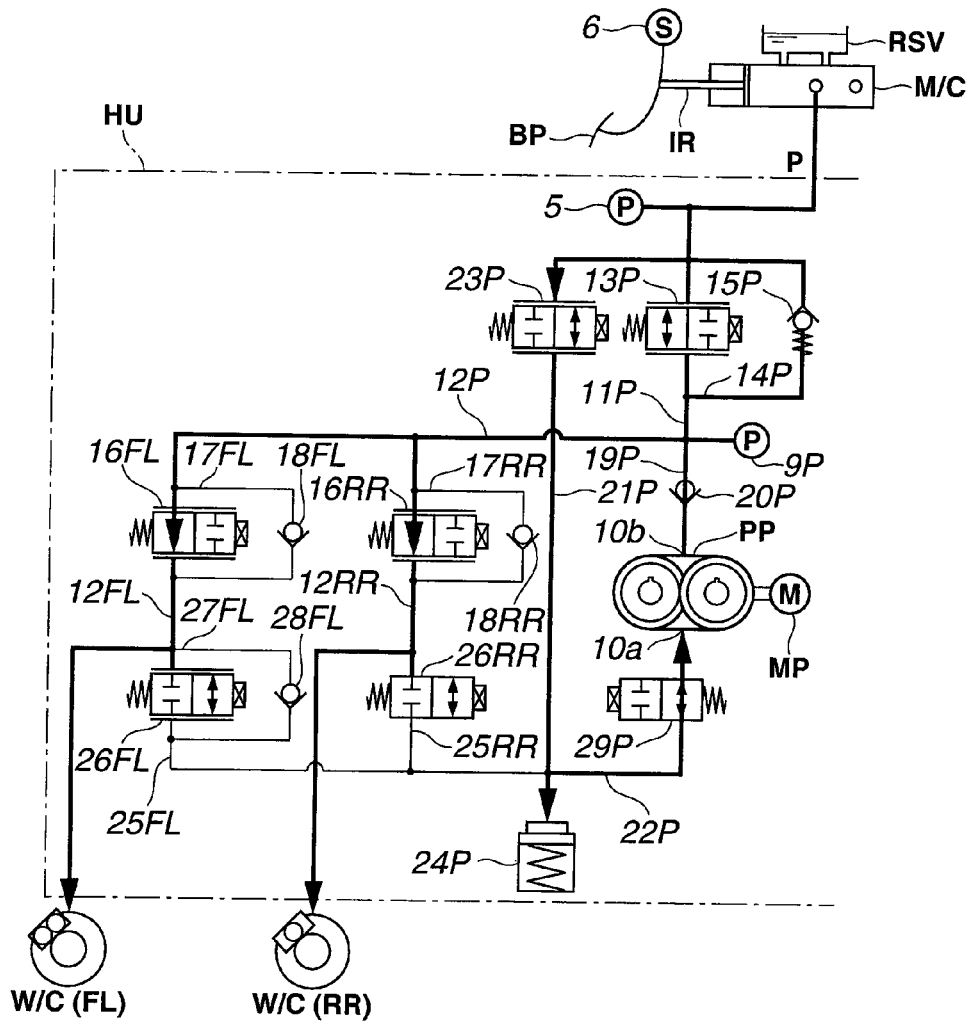
FIG. 45 is a schematic diagram showing how brake fluid flows in the hydraulic circuit when both of regenerative braking force and frictional braking force are increased under interruption of brake assist control.
Figure 46:
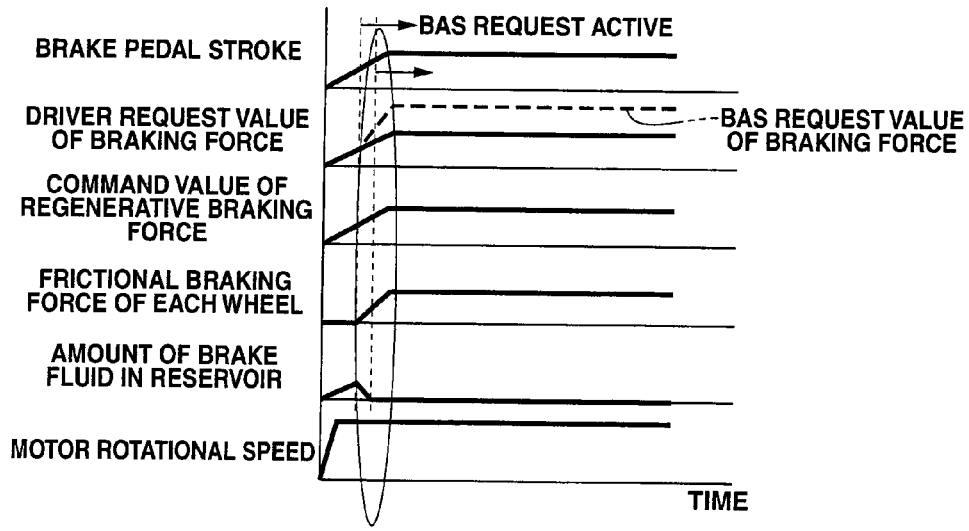
FIG. 46 is a time chart showing how the various variables of the brake system change with time when both of regenerative braking force and frictional braking force are increased under interruption of brake assist control.

FIG. 45 schematically shows how brake fluid flows in the hydraulic circuit when both of regenerative braking force and frictional braking force are increased under interruption of brake assist control. FIG. 46 shows how the various variables of the brake system change with time when both of regenerative braking force and frictional braking force are increased under interruption of brake assist control. When brake fluid pressure P1 is higher than a value corresponding to brake pedal stroke S in the specific relationship, gate-in valve 23 is operated to send brake fluid to reservoir 24 and thereby allow the brake pedal stroke S. When a request of braking force issued by the brake assist system (BAS request braking force) is higher than the driver request, gate-in valve 23 is controlled to supply an amount of brake fluid needed for pressure increase. In this situation, pump P is controlled to suck and discharge brake fluid from reservoir 24, while each solenoid out-valve 26 is operated to control the master cylinder pressure. The rotational speed of electric motor M and the duty period or operation period of pump suction shut-off valve 29 are controlled according to brake fluid pressure P2. In the event of interruption of brake assist control, the rotational speed of electric motor M is maintained high to be ready for increasing the wheel cylinder pressures up to a point at which the wheels are in slipping state. In this way, the brake control apparatus can achieve brake assist control by increasing the regenerative braking force and frictional braking force.

Figure 47:
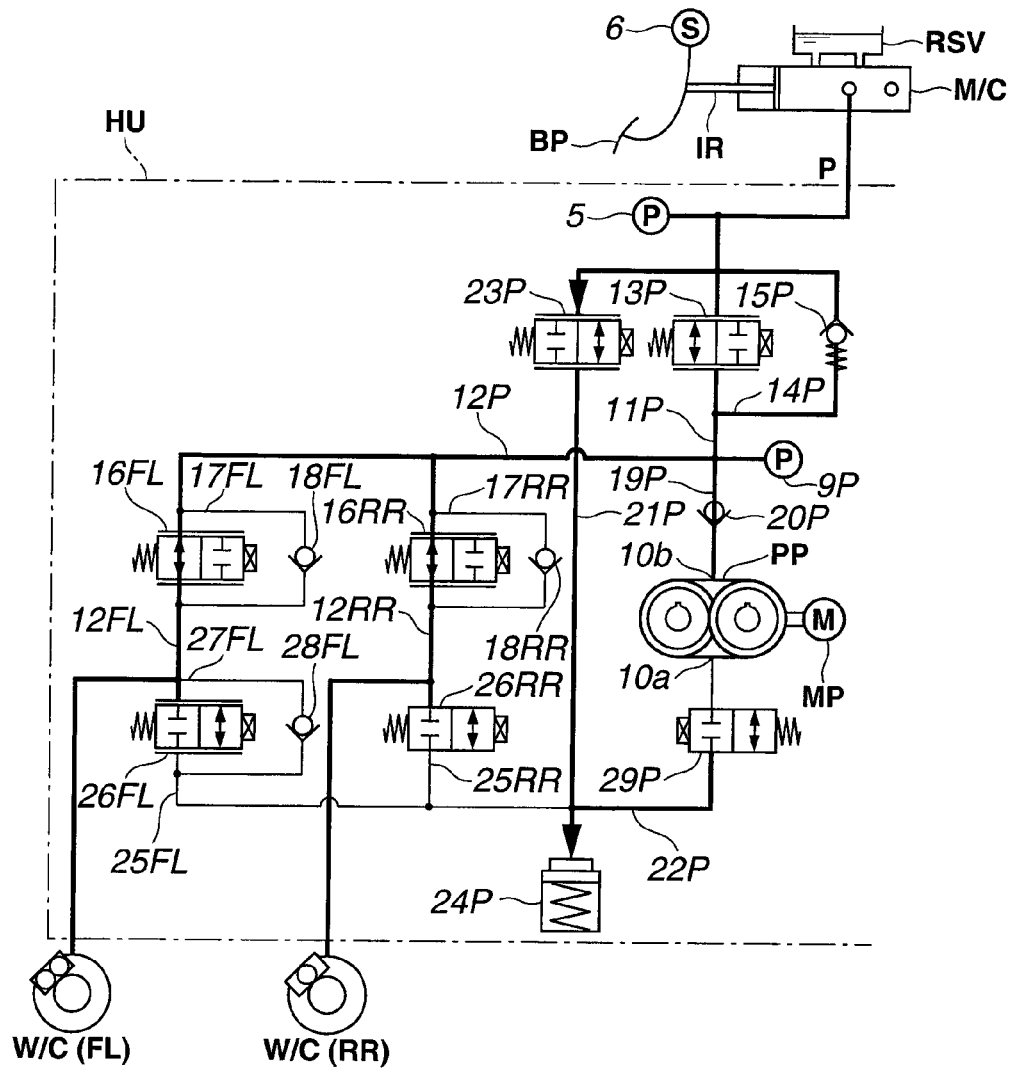
FIG. 47 is a schematic diagram showing how brake fluid flows in the hydraulic circuit when regenerative braking force is increased under interruption of brake assist control, and frictional braking force is maintained.
Figure 48:
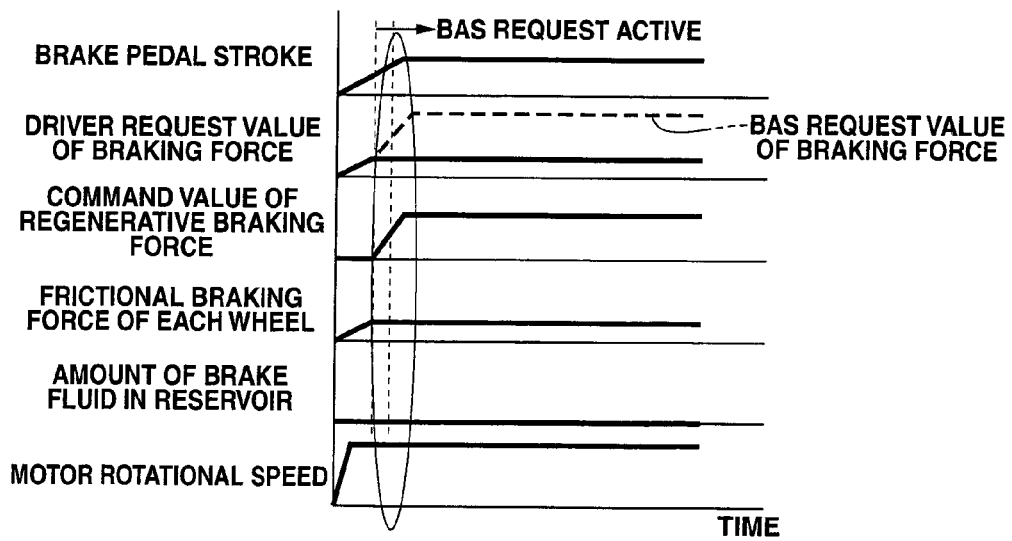
FIG. 48 is a time chart showing how the various variables of the brake system change with time when regenerative braking force is increased under interruption of brake assist control, and frictional braking force is maintained.

FIG. 47 schematically shows how brake fluid flows in the hydraulic circuit when regenerative braking force is increased under interruption of brake assist control, and frictional braking force is maintained. FIG. 48 shows how the various variables of the brake system change with time when regenerative braking force is increased under interruption of brake assist control, and frictional braking force is maintained. When brake fluid pressure P1 is higher than a value corresponding to brake pedal stroke S in the specific relationship, gate-in valve 23 is operated to send brake fluid to reservoir 24 and thereby allow the brake pedal stroke S. When a request of braking force issued by the brake assist system (BAS request braking force) is higher than the driver request, gate-in valve 23 is controlled to supply an amount of brake fluid needed for pressure increase. In this situation, pump P is controlled to suck and discharge brake fluid from reservoir 24, while each solenoid out-valve 26 is operated to control the master cylinder pressure. The rotational speed of electric motor M and the duty period or operation period of pump suction shut-off valve 29 are controlled according to brake fluid pressure P2. In the event of interruption of brake assist control, the rotational speed of electric motor M is maintained high to be ready for increasing the wheel cylinder pressures up to a point at which the wheels are in slipping state. In this way, the brake control apparatus can achieve brake assist control by increasing the regenerative braking force.

Figure 49:
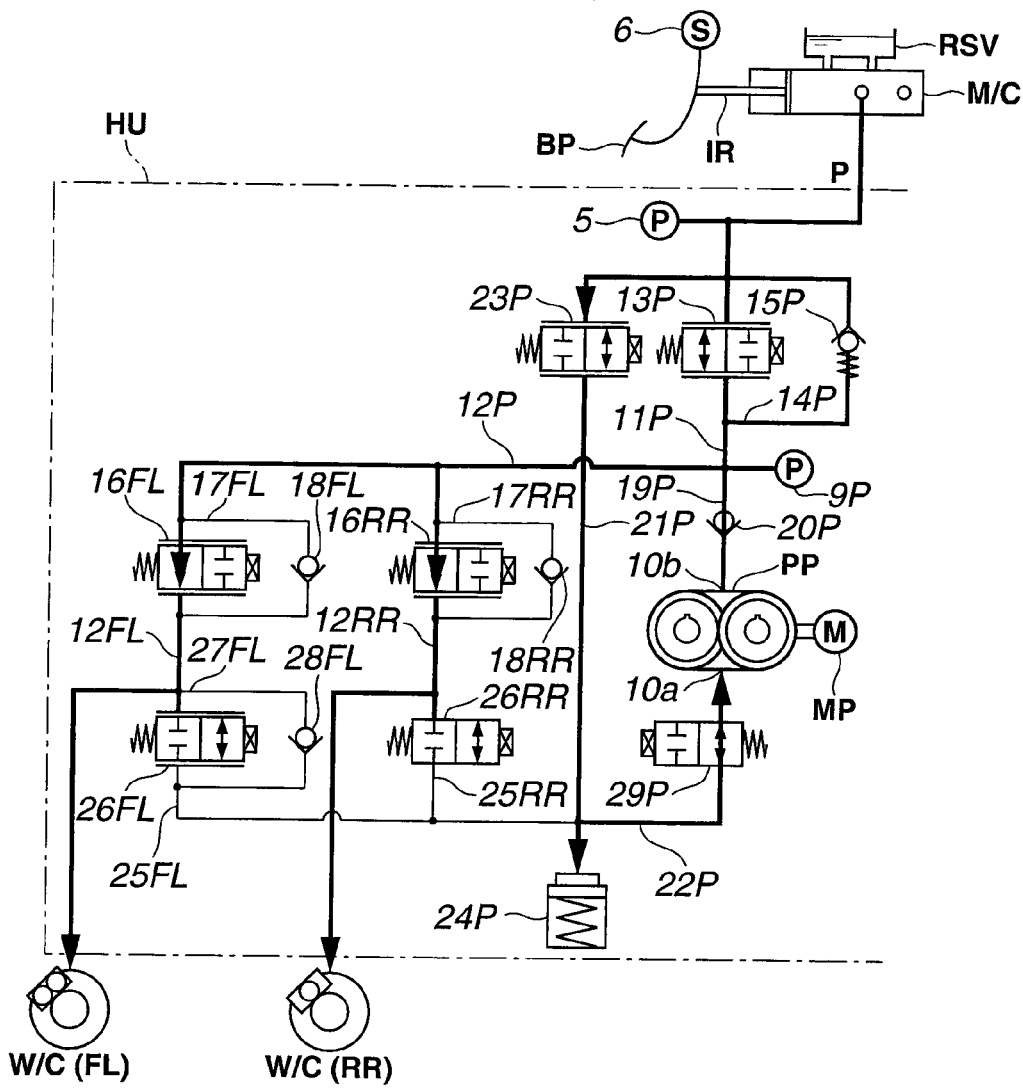
FIG. 49 is a schematic diagram showing how brake fluid flows in the hydraulic circuit when frictional braking force is increased under interruption of brake assist control, and regenerative braking force is maintained.
Figure 50:
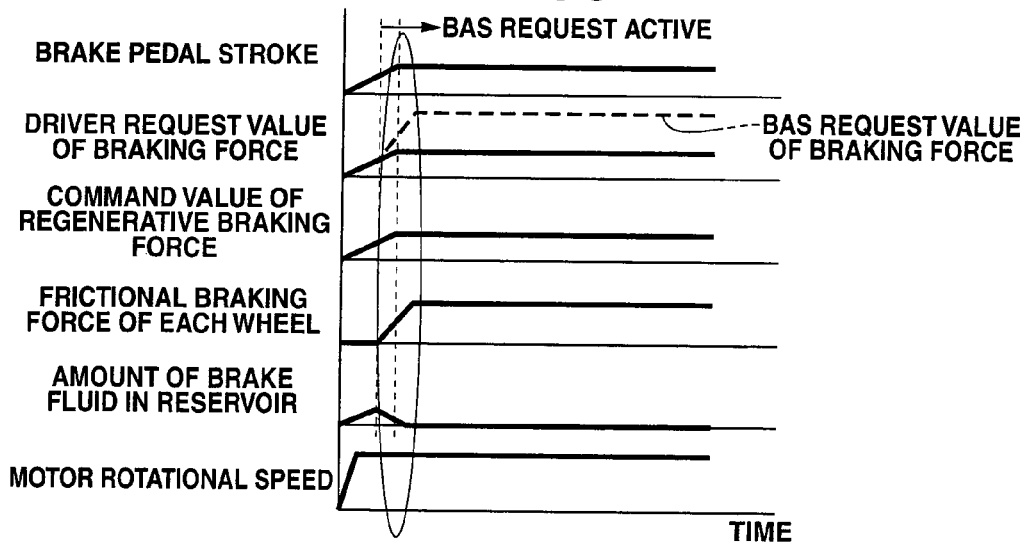
FIG. 50 is a time chart showing how the various variables of the brake system change with time when frictional braking force is increased under interruption of brake assist control, and regenerative braking force is maintained.

FIG. 49 schematically shows how brake fluid flows in the hydraulic circuit when frictional braking force is increased under interruption of brake assist control, and regenerative braking force is maintained. FIG. 50 shows how the various variables of the brake system change with time when frictional braking force is increased under interruption of brake assist control, and regenerative braking force is maintained. When brake fluid pressure P1 is higher than a value corresponding to brake pedal stroke S in the specific relationship, gate-in valve 23 is operated to send brake fluid to reservoir 24 and thereby allow the brake pedal stroke S. When a request of braking force issued by the brake assist system (BAS request braking force) is higher than the driver request, gate-in valve 23 is controlled to supply an amount of brake fluid needed for pressure increase. In this situation, pump P is controlled to suck and discharge brake fluid from reservoir 24, while each solenoid out-valve 26 is operated to control the master cylinder pressure. The rotational speed of electric motor M is controlled according to brake fluid pressure P2. In the event of interruption of brake assist control, the rotational speed of electric motor M is maintained high to be ready for increasing the wheel cylinder pressures up to a point at which the wheels are in slipping state. On the other hand, pump suction shut-off valve 29 is maintained inactive because the frictional braking force increases simply or monotonously. In this way, the brake control apparatus can implement the brake assist control by increasing the frictional braking force.

Figure 51:
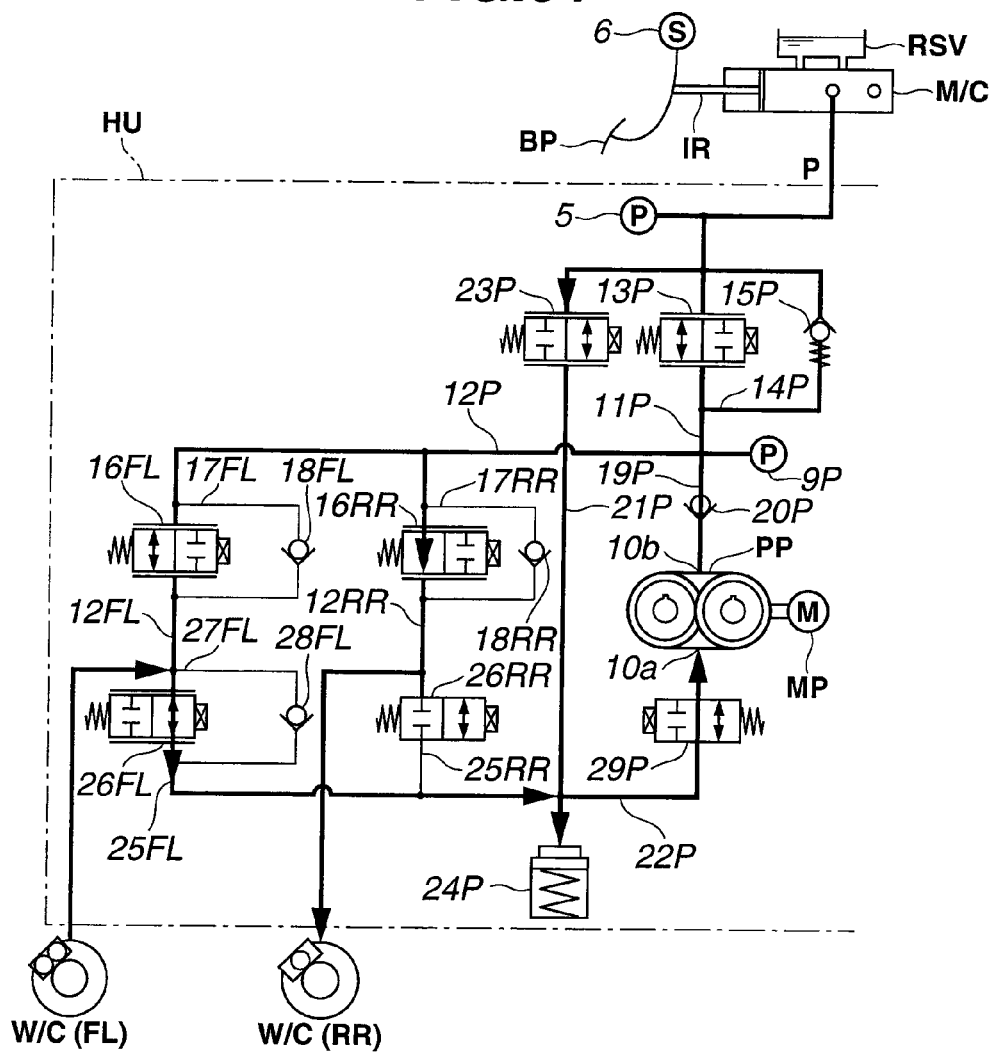
FIG. 51 is a schematic diagram showing how brake fluid flows in the hydraulic circuit when frictional braking force of left front road wheel FL is reduced under interruption of ABS control, and regenerative braking force is maintained (with a driver request of braking force unchanged).
Figure 52:
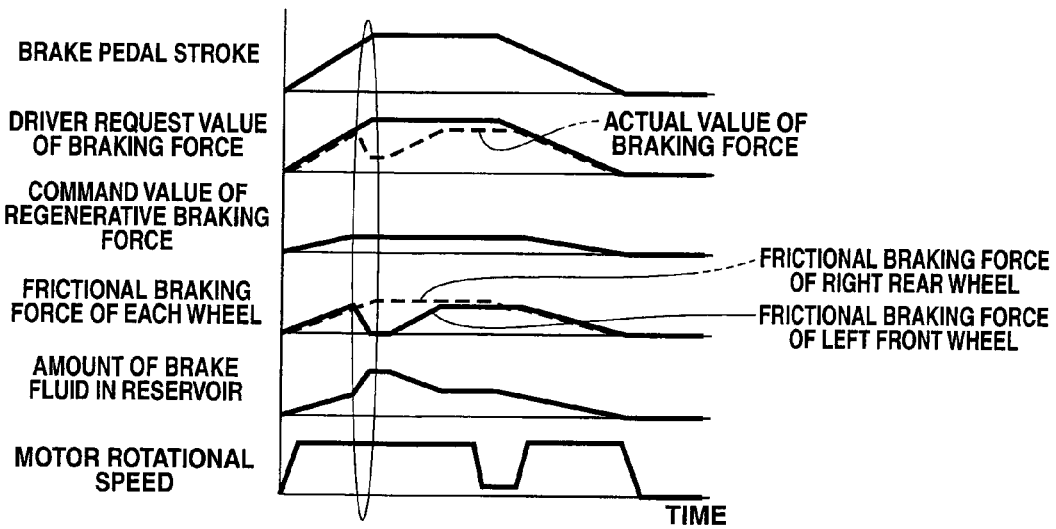
FIG. 52 is a time chart showing how the various variables of the brake system change with time when frictional braking force of left front road wheel FL is reduced under interruption of ABS control, and regenerative braking force is maintained (with a driver request of braking force unchanged).

FIG. 51 schematically shows how brake fluid flows in the hydraulic circuit when frictional braking force of left front road wheel FL is reduced under interruption of ABS control, and regenerative braking force is maintained (with a driver request of braking force unchanged). FIG. 52 shows how the various variables of the brake system change with time when frictional braking force of left front road wheel FL is reduced under interruption of ABS control, and regenerative braking force is maintained (with a driver request of braking force unchanged). In this situation, pump P is controlled to suck and discharge brake fluid from reservoir 24, while each solenoid out-valve 26 is operated to control the master cylinder pressure. The rotational speed of electric motor M and the duty period or operation period of pump suction shut-off valve 29 are controlled according to brake fluid pressure P2. When the ABS control system is in operation, the rotational speed of electric motor M is maintained high, whereas the discharge amount of pump P is controlled by pump suction shut-off valve 29. The wheel cylinder pressure of left front road wheel FL is controlled by solenoid in-valve 16FL and solenoid out-valve 26FL. In this way, the brake control apparatus can suppress left front road wheel FL, as a target of the ABS control, from locking, by reducing the frictional braking force.

Figure 53:
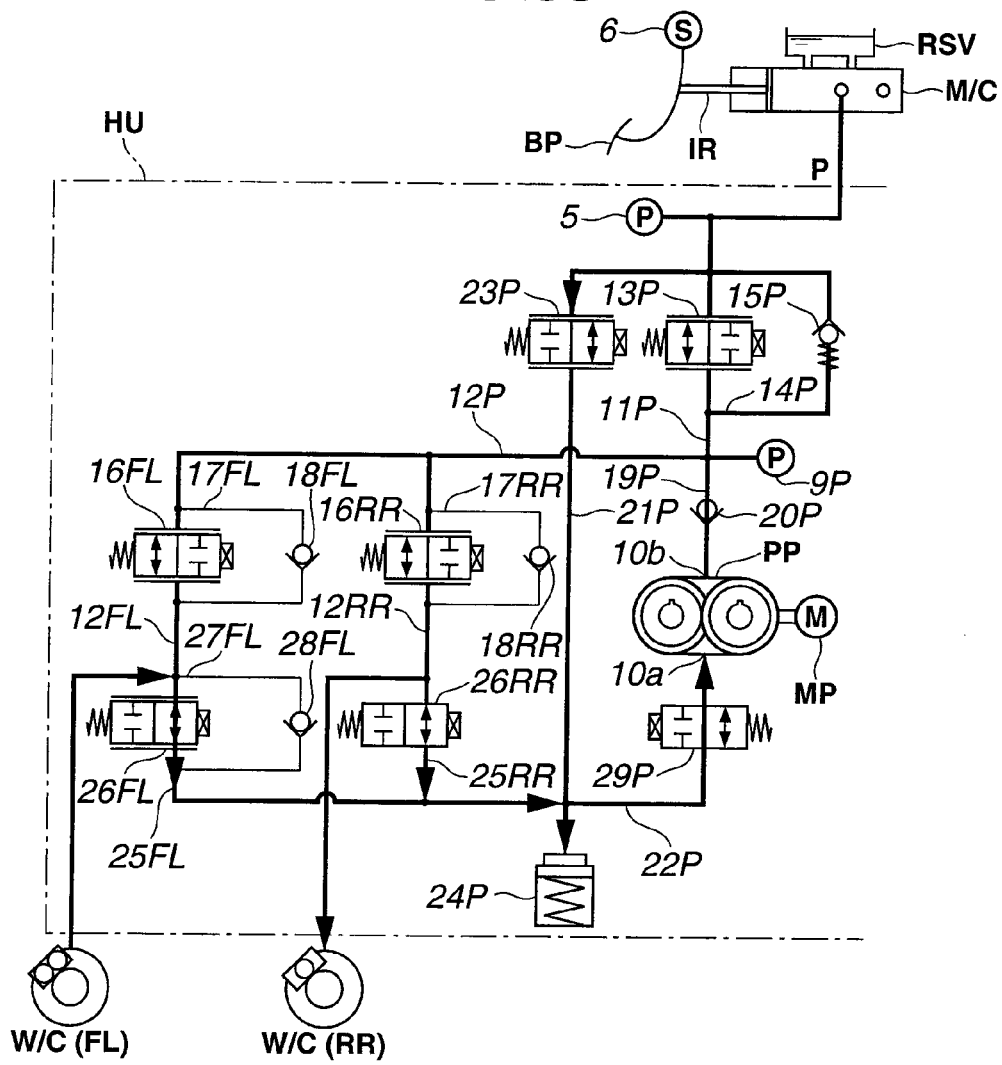
FIG. 53 is a schematic diagram showing how brake fluid flows in the hydraulic circuit when frictional braking force of every wheel is reduced, and regenerative braking force is maintained, under interruption of ABS control during a transition from a high friction coefficient road to a low friction coefficient road.

FIG. 53 schematically shows how brake fluid flows in the hydraulic circuit when frictional braking force of every wheel is reduced, and regenerative braking force is maintained, under interruption of ABS control during a transition from a high friction coefficient road to a low friction coefficient road.

Figure 54:
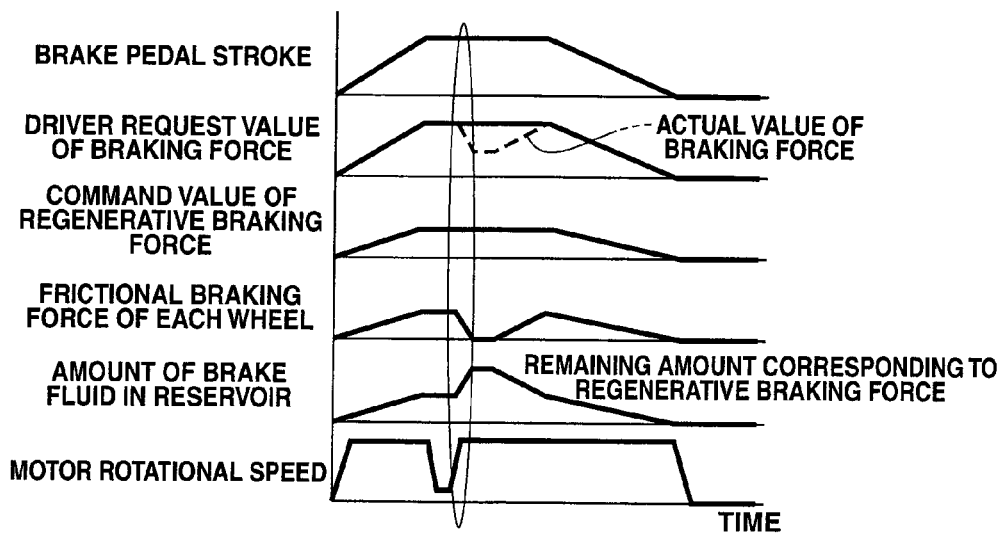
FIG. 54 is a time chart showing how the various variables of the brake system change with time when frictional braking force of every wheel is reduced, and regenerative braking force is maintained, under interruption of ABS control during the transition from the high friction coefficient road to the low friction coefficient road.

FIG. 54 shows how the various variables of the brake system change with time when frictional braking force of every wheel is reduced, and regenerative braking force is maintained, under interruption of ABS control during the transition from the high friction coefficient road to the low friction coefficient road. In this situation, pump P is controlled to suck and discharge brake fluid from reservoir 24, while each solenoid out-valve 26 is operated to control the master cylinder pressure. The rotational speed of electric motor M and the duty period or operation period of pump suction shut-off valve 29 are controlled according to brake fluid pressure P2. When the ABS control system is in operation, the rotational speed of electric motor M is maintained high. The wheel cylinder pressures of left and right front road wheels FL, FR and left and right rear road wheels RL, RR are controlled by solenoid in-valves 16FL, 16FR, 16RL and 16RR and solenoid out-valves 26FL, 26FR, 26RL and 26RR. In this way, the brake control apparatus can suppress wheel slip at the time of entrance to the low friction coefficient road by reducing the frictional braking force.

Figure 55:
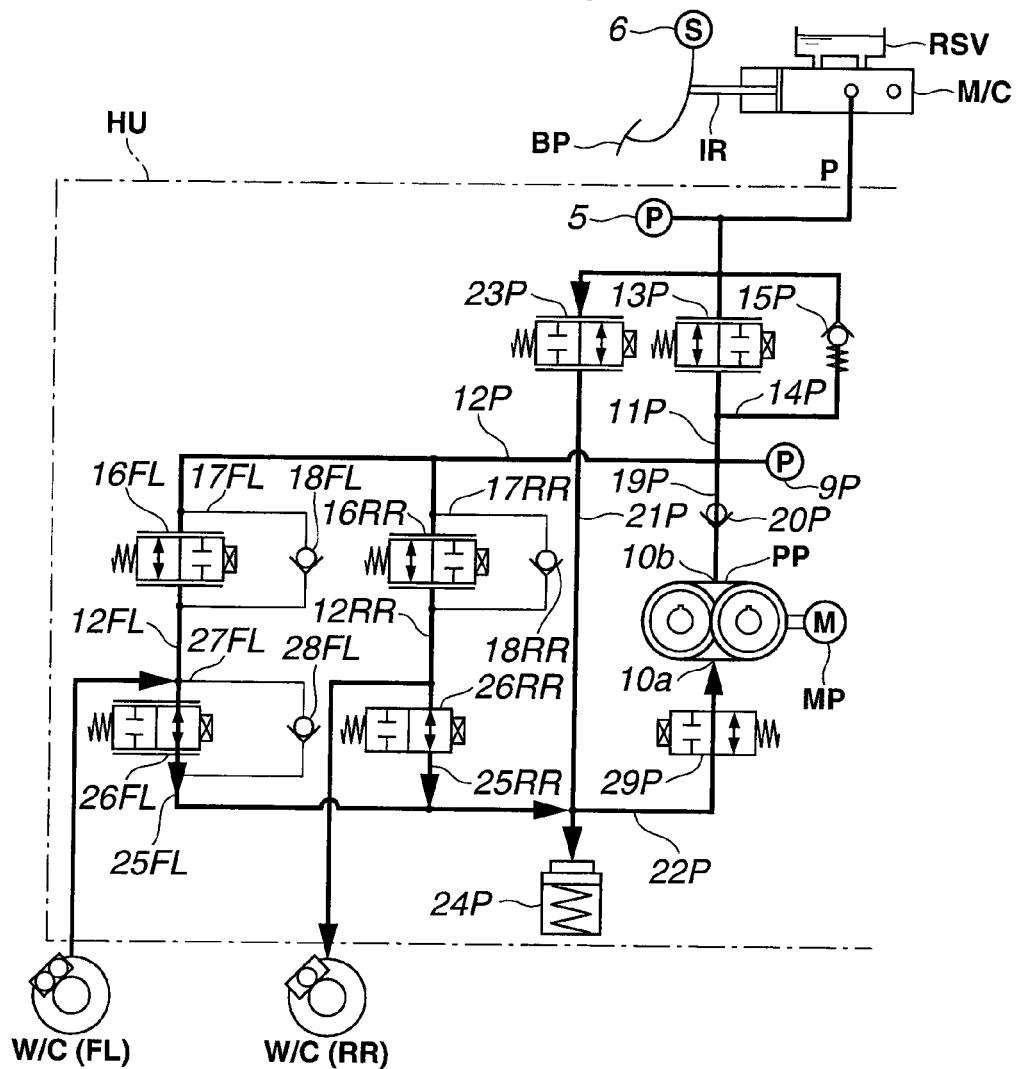
FIG. 55 is a schematic diagram showing how brake fluid flows in the hydraulic circuit when frictional braking force of every wheel is reduced, and regenerative braking force is reduced under interruption of ABS control during a transition from a high friction coefficient road to a low friction coefficient road.
Figure 56:
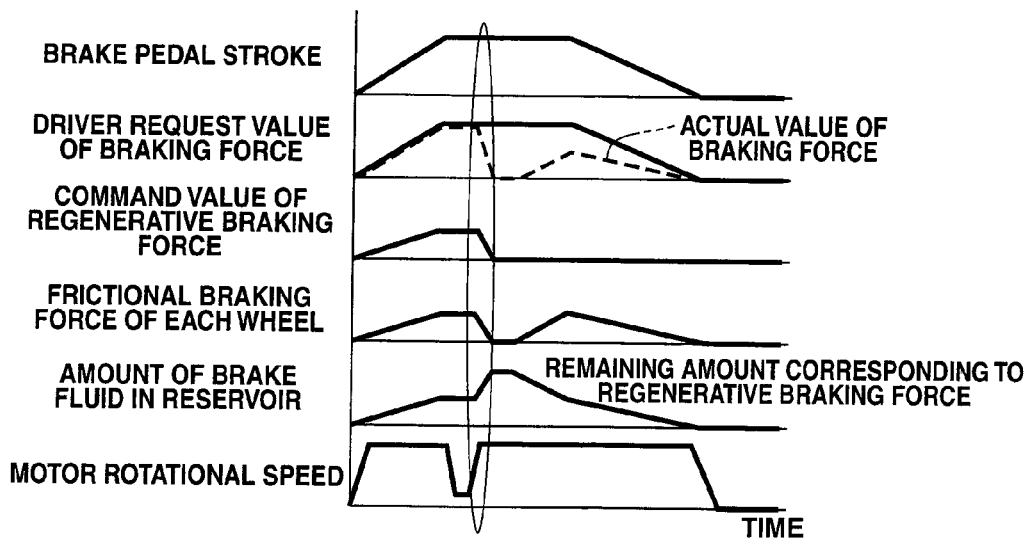
FIG. 56 is a time chart showing how the various variables of the brake system change with time when frictional braking force of every wheel is reduced, and regenerative braking force is reduced under interruption of ABS control during the transition from the high friction coefficient road to the low friction coefficient road.

FIG. 55 schematically shows how brake fluid flows in the hydraulic circuit when frictional braking force of every wheel is reduced, and regenerative braking force is reduced under interruption of ABS control during a transition from a high friction coefficient road to a low friction coefficient road. FIG. 56 shows how the various variables of the brake system change with time when frictional braking force of every wheel is reduced, and regenerative braking force is reduced under interruption of ABS control during the transition from the high friction coefficient road to the low friction coefficient road. In this situation, pump P is controlled to suck and discharge brake fluid from reservoir 24, while each solenoid out-valve 26 is operated to control the master cylinder pressure. The rotational speed of electric motor M and the duty period or operation period of pump suction shut-off valve 29 are controlled according to brake fluid pressure P2. When the ABS control system is in operation, the rotational speed of electric motor M is maintained high. The wheel cylinder pressures of left and right front road wheels FL, FR and left and right rear road wheels RL, RR are controlled by solenoid in-valves 16FL, 16FR, 16RL and 16RR and solenoid out-valves 26FL, 26FR, 26RL and 26RR. In this way, the brake control apparatus can suppress wheel slip at the time of entrance to low friction road by reducing the regenerative braking force and frictional braking force.

Figure 57:
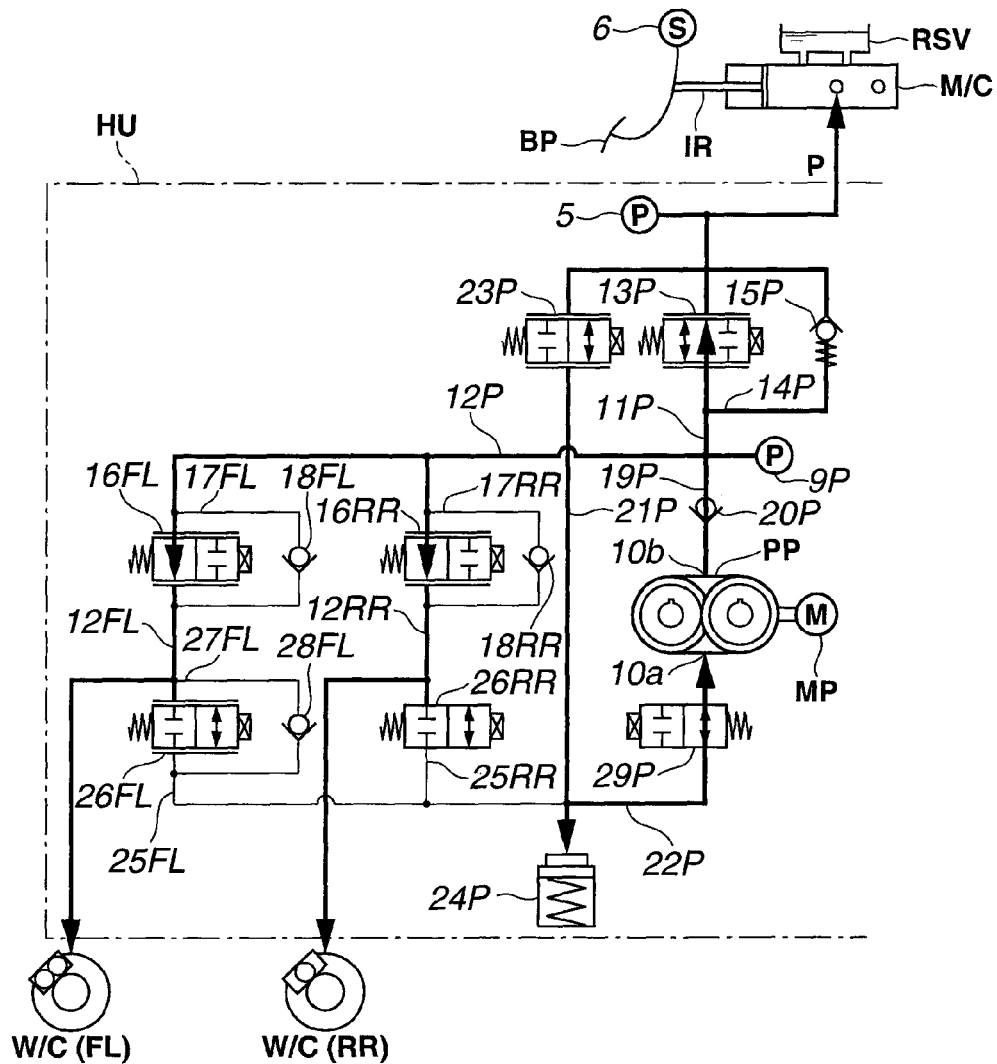
FIG. 57 is a schematic diagram showing how brake fluid flows in the hydraulic circuit when the brake pedal is released from a depressed position under interruption of brake assist control, where regenerative braking force is maintained, and frictional braking force is increased.
Figure 58:
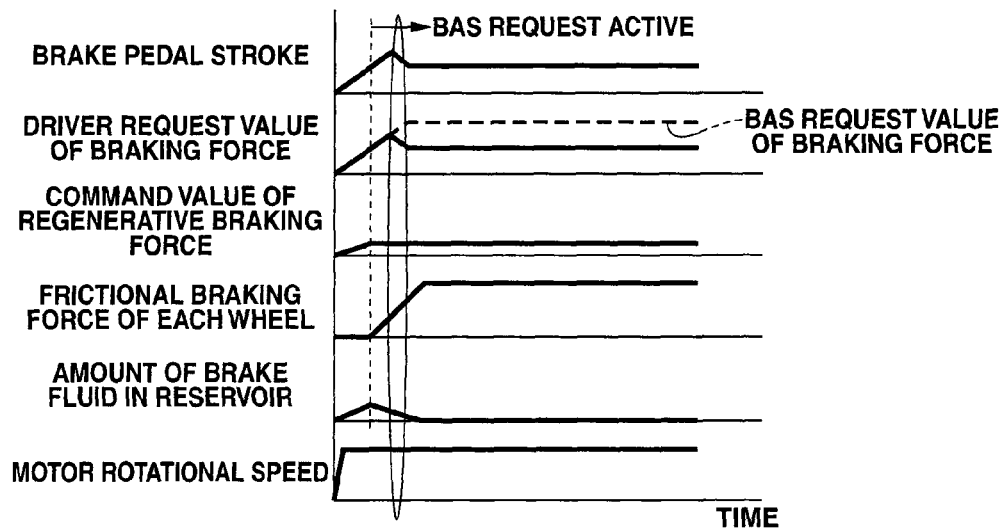
FIG. 58 is a time chart showing how the various variables of the brake system change with time when the brake pedal is released from the depressed position under interruption of brake assist control, where regenerative braking force is maintained, and frictional braking force is increased.

FIG. 57 schematically shows how brake fluid flows in the hydraulic circuit when the brake pedal is released from the depressed position under interruption of brake assist control, where regenerative braking force is maintained, and frictional braking force is increased. FIG. 58 shows how the various variables of the brake system change with time when the brake pedal is released from the depressed position under interruption of brake assist control, where regenerative braking force is maintained, and frictional braking force is increased. In this situation, pump P is controlled to suck and discharge brake fluid from reservoir 24, while each solenoid out-valve 26 is operated to control the master cylinder pressure. The rotational speed of electric motor M and the duty period or operation period of pump suction shut-off valve 29 are controlled according to brake fluid pressure P2. In the event of interruption of brake assist control, the rotational speed of electric motor M is maintained high to be ready for increasing the wheel cylinder pressures up to a point at which the wheels are in slipping state. On the other hand, pump suction shut-off valve 29 is maintained inactive because the frictional braking force increases simply or monotonously. In this way, the brake control apparatus can implement the brake assist control by increasing the frictional braking force.

Figure 59:
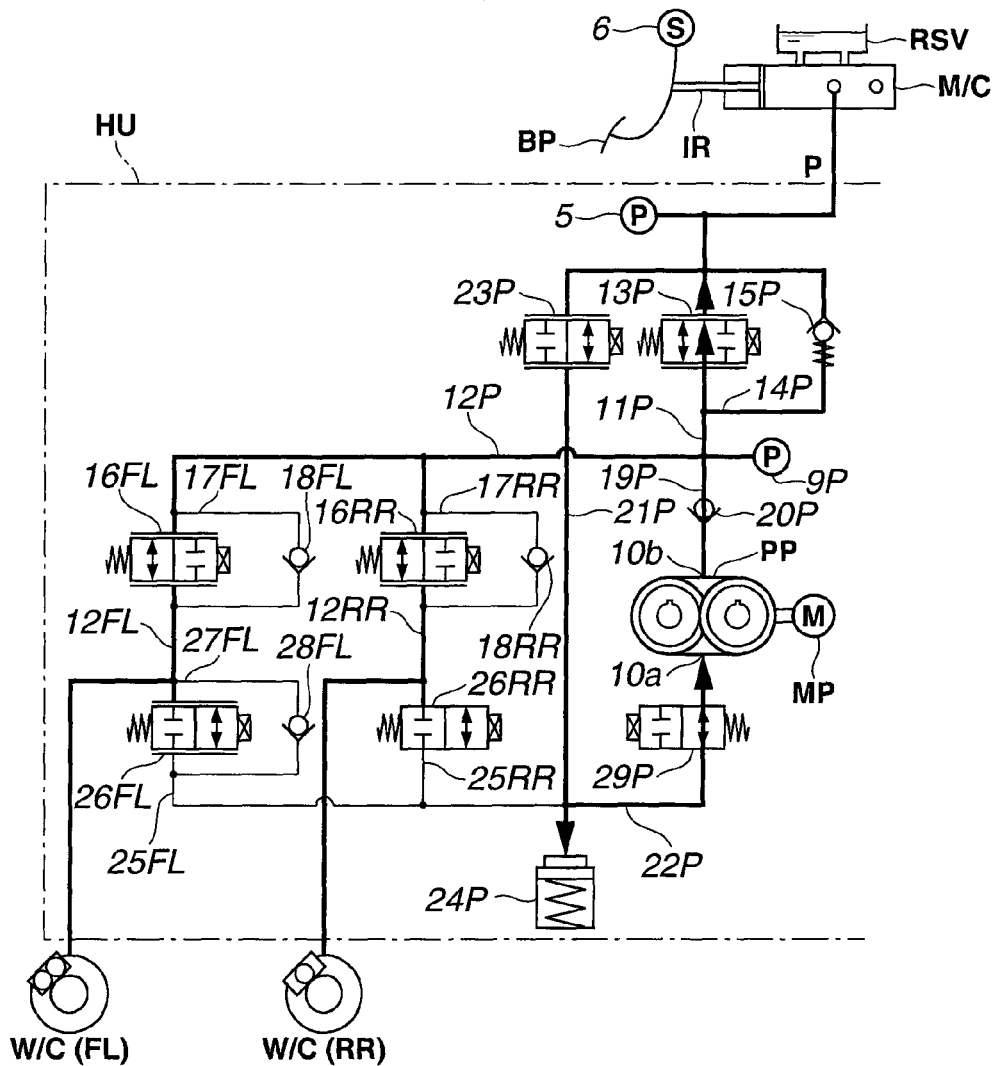
FIG. 59 is a schematic diagram showing how brake fluid flows in the hydraulic circuit when the brake pedal is released from the depressed position under interruption of ABS control, where regenerative braking force is maintained, and frictional braking force is reduced.
Figure 60:
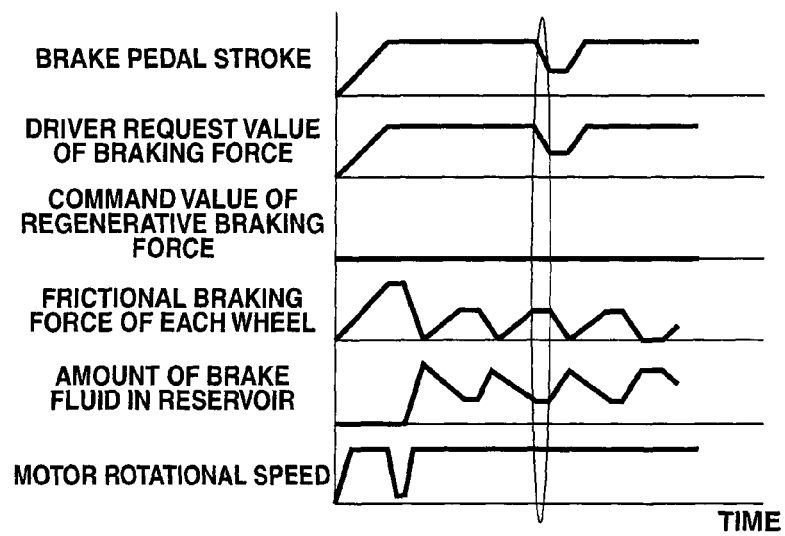
FIG. 60 is a time chart showing how the various variables of the brake system change with time when the brake pedal is released from the depressed position under interruption of ABS control, regenerative braking force is maintained, and frictional braking force is reduced.

FIG. 59 schematically shows how brake fluid flows in the hydraulic circuit when the brake pedal is released from the depressed position under interruption of ABS control, where regenerative braking force is maintained, and frictional braking force is reduced. FIG. 60 shows how the various variables of the brake system change with time when the brake pedal is released from the depressed position under interruption of ABS control, where regenerative braking force is maintained, and frictional braking force is reduced. In this situation, pump P is controlled to suck and discharge brake fluid from reservoir 24, while each solenoid out-valve 26 is operated to control the master cylinder pressure. When the ABS control system is in operation, the rotational speed of electric motor M is maintained high. The duty period or operation period of pump suction shut-off valve 29 is controlled according to brake fluid pressure P2. In this way, the brake control apparatus can suppress left front road wheel FL, as a target of the ABS control, from locking, by reducing the frictional braking force.

Figure 61:
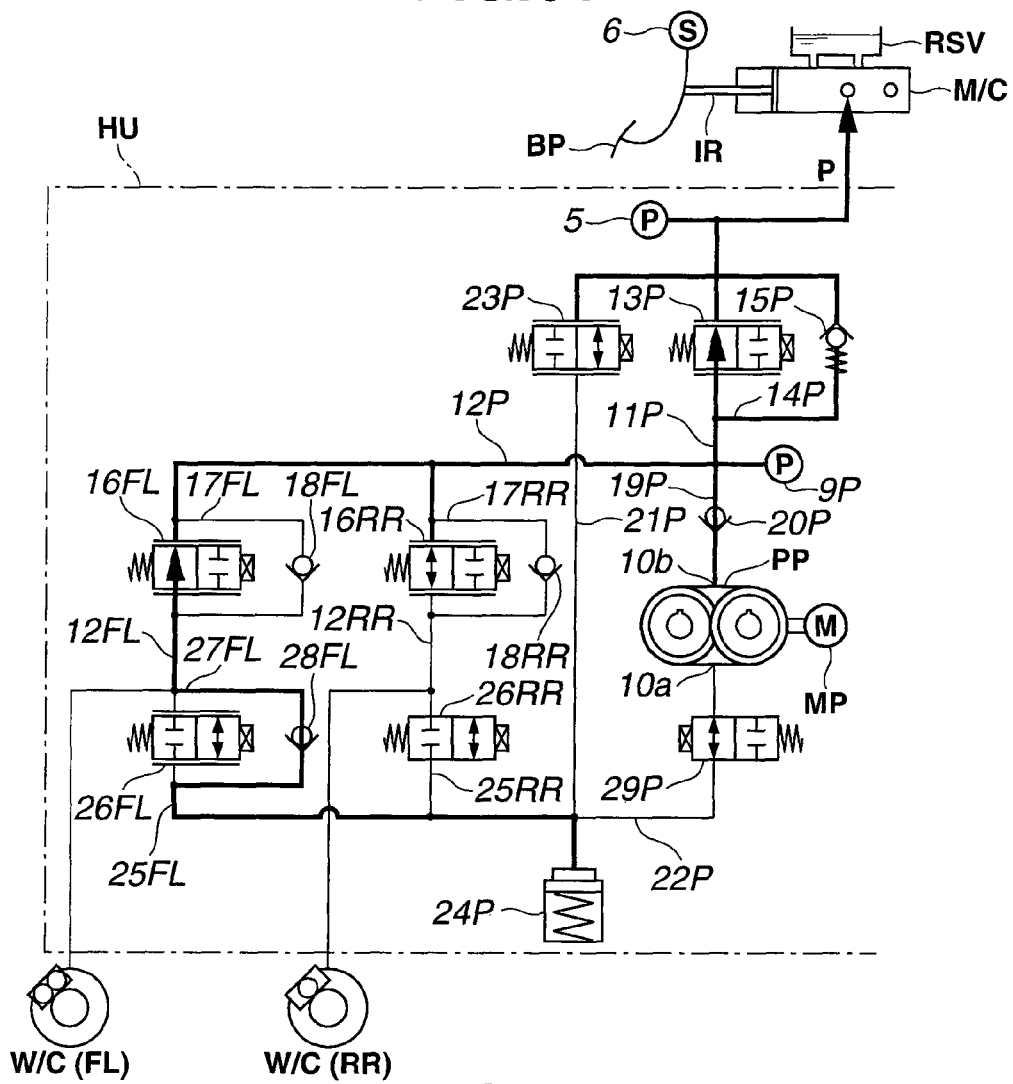
FIG. 61 is a schematic diagram showing how brake fluid flows in the hydraulic circuit when the brake pedal is released by a driver's foot while regenerative braking is active.
Figure 62:
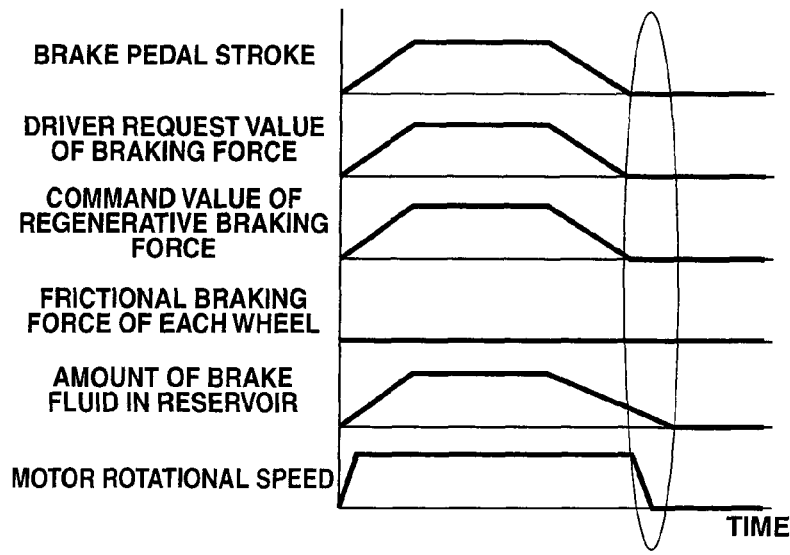
FIG. 62 is a time chart showing how the various variables of the brake system change with time when the brake pedal is released by the driver's foot while regenerative braking is active.

<Exit of Braking Operation> FIG. 61 schematically shows how brake fluid flows in the hydraulic circuit when the brake pedal is released by a driver's foot while regenerative braking is active. FIG. 62 shows how the various variables of the brake system change with time when the brake pedal is released by the driver's foot while regenerative braking is active. When the brake pedal stroke S becomes equal to zero during the cooperative regenerative braking force control, brake control unit BCU determines that the foot of the driver is off the brake pedal BP completely, and stops operation of each valve and electric motor M. The brake fluid stored in reservoir 24 is returned to master cylinder M/C through check valve 28 that is arranged parallel with solenoid out-valve 26.

The brake control apparatus configured as described above produces the following advantageous effects. Hydraulic pressure control unit HU has a simple configuration composed of gate-in valves, gate-out valves, solenoid in-valves, solenoid out-valves, and a pump, and is capable of implementing a braking force boosting function by driving the pump and thereby producing a differential pressure between master cylinder pressure and wheel cylinder pressure. In the first embodiment, the brake pedal stroke S of brake pedal BP is allowed and controlled by opening the gate-in valve 23, and allowing brake fluid to flow into reservoir 24 directly through the master cylinder line connected between master cylinder M/C and fluid passage 21. During control of brake pedal stroke S, gate-in valve 23 and gate-out valve 13 are operated to bring the measured value of brake pedal stroke S obtained by brake pedal stroke sensor 6 and the master cylinder pressure (brake fluid pressure P1) measured by master cylinder pressure sensor 5 into a specific relationship or specific brake pedal characteristic, for achieving a preferable braking feel.

In the first embodiment, while the brake pedal BP is being operated or depressed by a driver, electric motor M continues to be driven constantly. In general, it is unnecessary to operate pump P when the wheel cylinder pressure is to be held or reduced. However, if pump P is at rest in such a situation that the maximum possible regenerative braking force decreases to a low level so that it becomes necessary to replace regenerative braking force with frictional braking force, it may cause a delay of rise in wheel cylinder pressures. If the rate of increase of wheel cylinder pressure is low with respect to the rate of decrease of regenerative braking force, there occurs a temporary dropout in the deceleration of the motor vehicle. In contrast, in the first embodiment, the feature that pump P is on standby or constantly in operation, serves to quickly respond to a request for increase in wheel cylinder pressure, and thereby enhance the response of replacement of regenerative braking force with frictional braking force, without any dropout in the deceleration of the motor vehicle.

On the other hand, the condition that the electric motor M and pump P are constantly rotating may cause pump P to suck and discharge brake fluid stored in reservoir 24 to the discharge side. This may uselessly circulate and return brake fluid to the suction side of pump P, which may disadvantageously increase noise level. In contrast, in the first embodiment, the provision of pump suction shut-off valve 29 that is used to control the amount of sucked brake fluid of pump P serves to suppress or restrict an useless or excess amount of brake fluid discharged through discharge-side valve 20 while pump P is maintained in operation. This serves to prevent the adverse effect of uselessly circulating and returning brake fluid to the suction side of pump P, and thereby increasing noise level. Incidentally, in the first embodiment, when the brake pedal BP is released by the driver's foot, then electric motor M is stopped. Even when the electric motor M is at rest, hydraulic pressure control unit HU can return brake fluid from reservoir 24 to master cylinder M/C because of provision of check valve 28 in parallel with solenoid out-valve 26.

In the first embodiment, the target of rotational speed of pump P is determined depending on the brake fluid pressure P1 (master cylinder pressure) measured by master cylinder pressure sensor 5 and the brake fluid pressure P2 (wheel cylinder pressure). Namely, pump P is operated to conform the wheel cylinder pressure to a value corresponding to master cylinder pressure, in which the amount of discharged brake fluid is controlled to achieve a desired wheel cylinder pressure according to the master cylinder pressure. In this way, the brake control apparatus can carry out a desired boosting function.

In the first embodiment, the feature that the pump suction shut-off valve 29 and pump P are controlled according to brake fluid pressure P2 measured by wheel cylinder pressure sensor 9 serves to allow the control of achieving a desired wheel cylinder pressure by adjusting the discharge amount of pump P, and suppress an excess amount of brake fluid from being discharged from pump P.

In the first embodiment, the feature that the relief valve 15 and gate-out valve 13 are arranged in parallel and the threshold pressure Pr of relief valve 15 is set equivalent to the upper limit of regenerative braking force, serves to suppress brake fluid from flowing under pressure from master cylinder M/C to wheel cylinder W/C when the driver request of braking force can be satisfied only by regenerative braking force, and thereby enhance energy recovery efficiency. On the other hand, when regenerative braking force is insufficient with respect to the driver request, the high pressure of master cylinder pressure is used to quickly increase the wheel cylinder pressure.

In the first embodiment, the feature that solenoid out-valve 26 is provided with check valve 28 in parallel for allowing brake fluid to flow from reservoir 24, serves to allow brake fluid to be returned from reservoir 24, in which the brake fluid is stored, to master cylinder M/C through check valve 28, when the brake pedal BP is released by the driver so that electric motor M is stopped.

In the first embodiment, the feature that hydraulic pressure control unit HU is composed of two sections, namely, P-line section and S-line section, each of which includes the brake fluid passage, pump P, valves, reservoir 24, pump suction shut-off valve 29, and electric motor M, serves to continue the control of the wheel cylinder pressures of at least two of the wheels with one of the P-line section and S-line section, even when the other malfunctions. Among other things, the provision of independent electric motor MP, MS for driving the pump PP, PS, serves to allow one of electric motors MP, MS to increase the wheel cylinder pressures to implement the braking force boosting function, even when the other malfunctions.

The following summarizes the technical features of the brake control apparatus described above, and advantageous effects produced by the brake control apparatus.

<1> A brake control apparatus for a vehicle provided with a regenerative braking system (motor generator MG, inverter INV, battery BATT), includes: a braking operation detecting section (brake pedal stroke sensor 6) configured to detect a condition of driver's braking operation (brake pedal stroke S of brake pedal BP); a first brake fluid passage (fluid passages 11, 12) hydraulically connecting a master cylinder (M/C) to a wheel cylinder (W/C), wherein the master cylinder (M/C) generates a brake fluid pressure in response to driver's braking operation (S), and wherein the brake fluid pressure acts on the wheel cylinder (W/C); a pump (P) configured to suck brake fluid from the master cylinder (M/C), and provided with a discharge-side valve (20) on a discharge side (discharge port 10b) of the pump (P); a second brake fluid passage (fluid passage 19) hydraulically connecting the discharge side (10b) of the pump (P) to a first connecting portion of the first brake fluid passage (11, 12); a third brake fluid passage (fluid passages 21, 22) hydraulically connecting a suction side (suction port 10a) of the pump (P) to a second connecting portion of the first brake fluid passage (11, 12), wherein the second connecting portion is between the master cylinder (M/C) and the first connecting portion; an inflow valve (solenoid in-valve 16) disposed in a section of the first brake fluid passage (11, 12) between the wheel cylinder (W/C) and the first connecting portion of the first brake fluid passage (11, 12); a fourth brake fluid passage (fluid passages 22, 25) hydraulically connecting the suction side (10a) of the pump (P) to a third connecting portion of the first brake fluid passage (11, 12), wherein the third connecting portion is between the inflow valve (16) and the wheel cylinder (W/C); an outflow valve (solenoid out-valve 26) disposed in the fourth brake fluid passage (22, 25); a reservoir (24) hydraulically connected to the third brake fluid passage (21, 22), and hydraulically connected to a connecting portion of the fourth brake fluid passage (22, 25), wherein the connecting portion of the fourth brake fluid passage (22, 25) is between the outflow valve (26) and the suction side (10a) of the pump (P); and a pump discharge restricting section (pump suction shut-off valve 29) configured to restrict discharge of brake fluid through the discharge-side valve (20) from the pump (P) when the pump (P) is being driven. This construction serves to carry out replacement of regenerative braking force with frictional braking force with an enhanced quick response.

<2> The brake control apparatus further includes a brake fluid pressure control section (brake control unit BCU) configured to control the brake fluid pressure by operating at least one of the inflow valve (solenoid in-valve 16), the outflow valve (solenoid out-valve 26) and the pump (P), based on the detected condition of driver's braking operation (brake pedal stroke S) and a condition of brake regeneration of the regenerative braking system (MG, INV, BATT). This feature serves to achieve a control of frictional braking force to conform the total of regenerative braking force and frictional braking force to a driver request of braking force, and thereby enhance the energy recovery efficiency while satisfying the driver request.

<3> In the brake control apparatus, the pump discharge restricting section (29) includes a pump suction shut-off valve (29) disposed in a section of the fourth brake fluid passage (fluid passages 22, 25) between the reservoir (24) and the suction side (10a) of the pump (P). This feature serves to allow pump suction shut-off valve 29 to control the amount of brake fluid sucked by pump P, and thereby prevent an excess amount of brake fluid from being discharged through the discharge-side valve 20, while the rotation of pump P is maintained.

<4> In the brake control apparatus, the brake fluid pressure control section (brake control unit BCU) is configured to drive the pump (P) constantly while the braking operation detecting section (brake pedal stroke sensor 6) is detecting presence of driver's braking operation (brake pedal stroke S). This feature serves to enhance the response to request of increase of wheel cylinder pressure.

<5> In the brake control apparatus, the brake fluid pressure control section (BCU) is configured to operate the pump suction shut-off valve (29) in a closing direction when the regenerative braking system (MG, INV, BATT) is carrying out regenerative braking operation. This feature serves to restrict or prevent supply of brake fluid from pump P to wheel cylinder W/C, and thereby enhance the energy recovery efficiency of regenerative braking.

Second Embodiment

Figure 63:
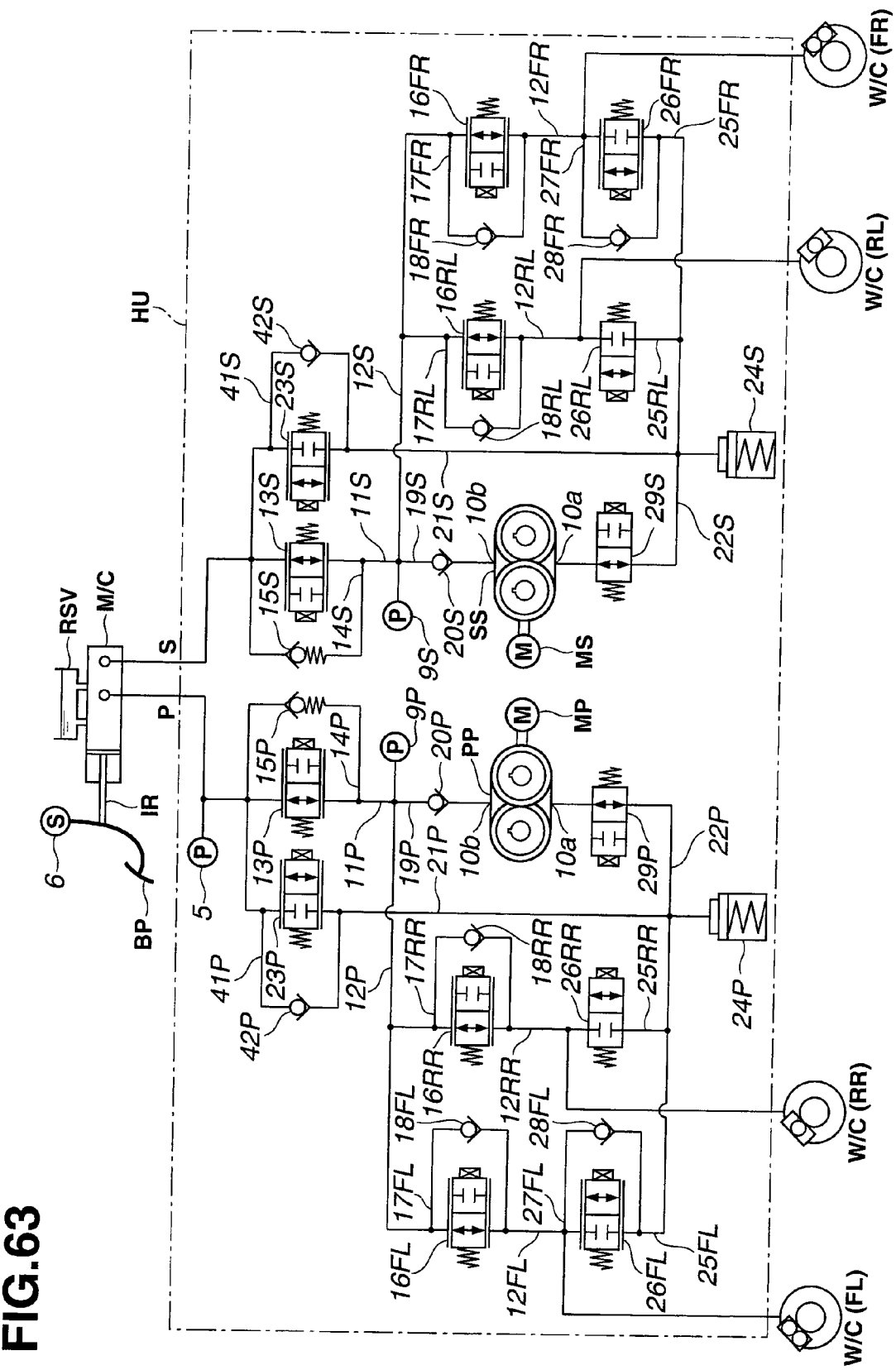
FIG. 63 is a schematic diagram showing a hydraulic circuit of a brake control apparatus according to a second embodiment of the present invention.

FIG. 63 schematically shows a hydraulic circuit of a brake control apparatus according to a second embodiment of the present invention. In the second embodiment, hydraulic pressure control unit HU is provided with a fluid passage 41 and a check valve 42 in addition to check valve 28 of the hydraulic circuit shown in FIG. 2. The combination of fluid passage 41 and check valve 42 may replace the check valve 28 alternatively. Fluid passage 41 is arranged in parallel with gate-in valve 23, whereas check valve 42 allows brake fluid to flow from wheel cylinder W/C to master cylinder M/C, and prevent brake fluid from flowing inversely. The parallel arrangement of gate-in valve 23 and check valve 42 serves to allow brake fluid to return brake fluid from reservoir 24, in which the brake fluid is stored, to master cylinder M/C through check valve 42, when the brake pedal BP is released by the driver's foot so that the electric motor M is stopped. In this way, the brake control apparatus according to the second embodiment operates similarly and produces similar advantageous effects as in the first embodiment.

Third Embodiment

Figure 64:
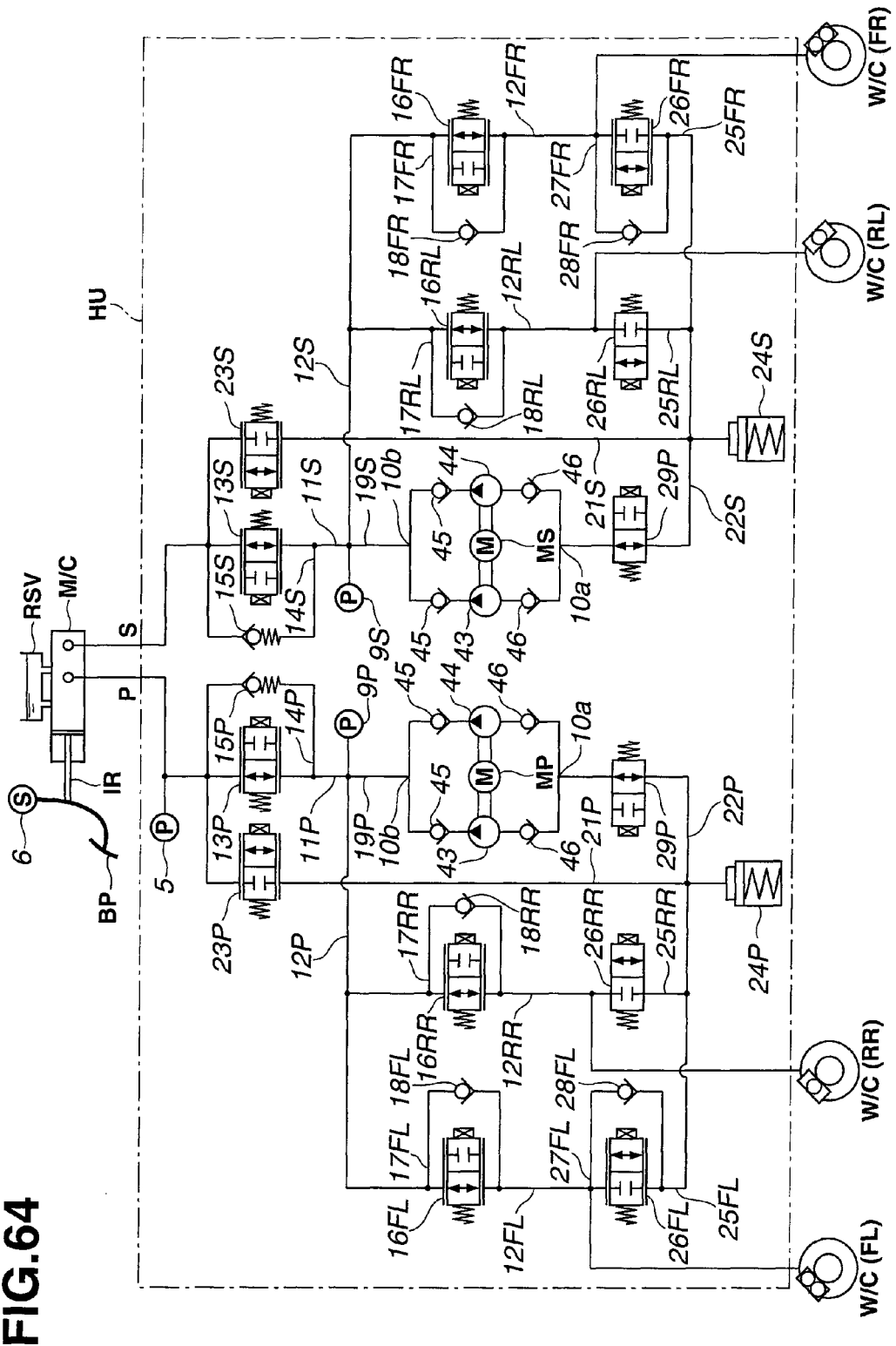
FIG. 64 is a schematic diagram showing a hydraulic circuit of a brake control apparatus according to a third embodiment of the present invention.

FIG. 64 schematically shows a hydraulic circuit of a brake control apparatus according to a third embodiment of the present invention. In the third embodiment, hydraulic pressure control unit HU is provided with two plunger pumps 43, 44 arranged in parallel, namely, a tandem-type plunger pump set, which replaces the pump P in the hydraulic circuit shown in FIG. 2. The discharge side of each plunger pump 43, 44 is provided with a discharge-side valve 45, whereas the suction side of each plunger pump 43, 44 is provided with a check valve 46. Each valve 45, 46 allows brake fluid to flow in the direction from the suction side to the discharge side of plunger pump 43, 44, and prevents brake fluid from flowing inversely. The brake control apparatus according to the third embodiment operates similarly and produces similar advantageous effects as in the first embodiment. In addition, the provision of two plunger pumps 43, 44 in each of the P-line section and S-line section serves to allow one of two plunger pumps 43, 44 to increase the wheel cylinder pressures and thereby maintain the braking force boosting function, even when the other malfunctions.

Fourth Embodiment

Figure 65:
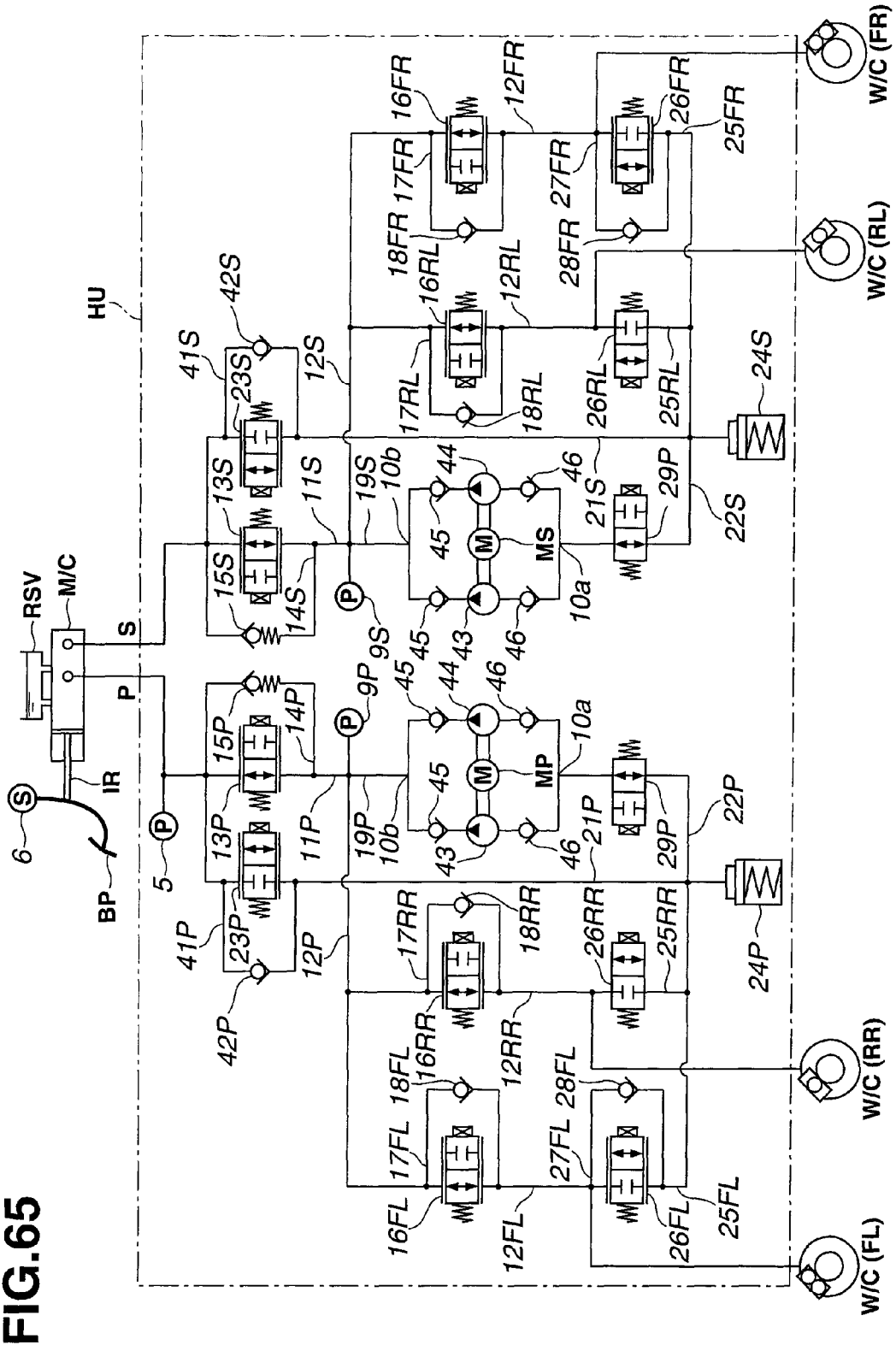
FIG. 65 is a schematic diagram showing a hydraulic circuit of a brake control apparatus according to a fourth embodiment of the present invention.

FIG. 65 schematically shows a hydraulic circuit of a brake control apparatus according to a fourth embodiment of the present invention. This brake control apparatus is constructed by combining the features of the second and third embodiments. Namely, hydraulic pressure control unit HU is provided with fluid passage 41, check valve 42, and a tandem-type plunger pump set (two plunger pumps 43, 44), in stead of pump P. The brake control apparatus of this embodiment operates similarly and produces similar advantageous effects as in the second and third embodiments.

Fifth Embodiment

Figure 66:
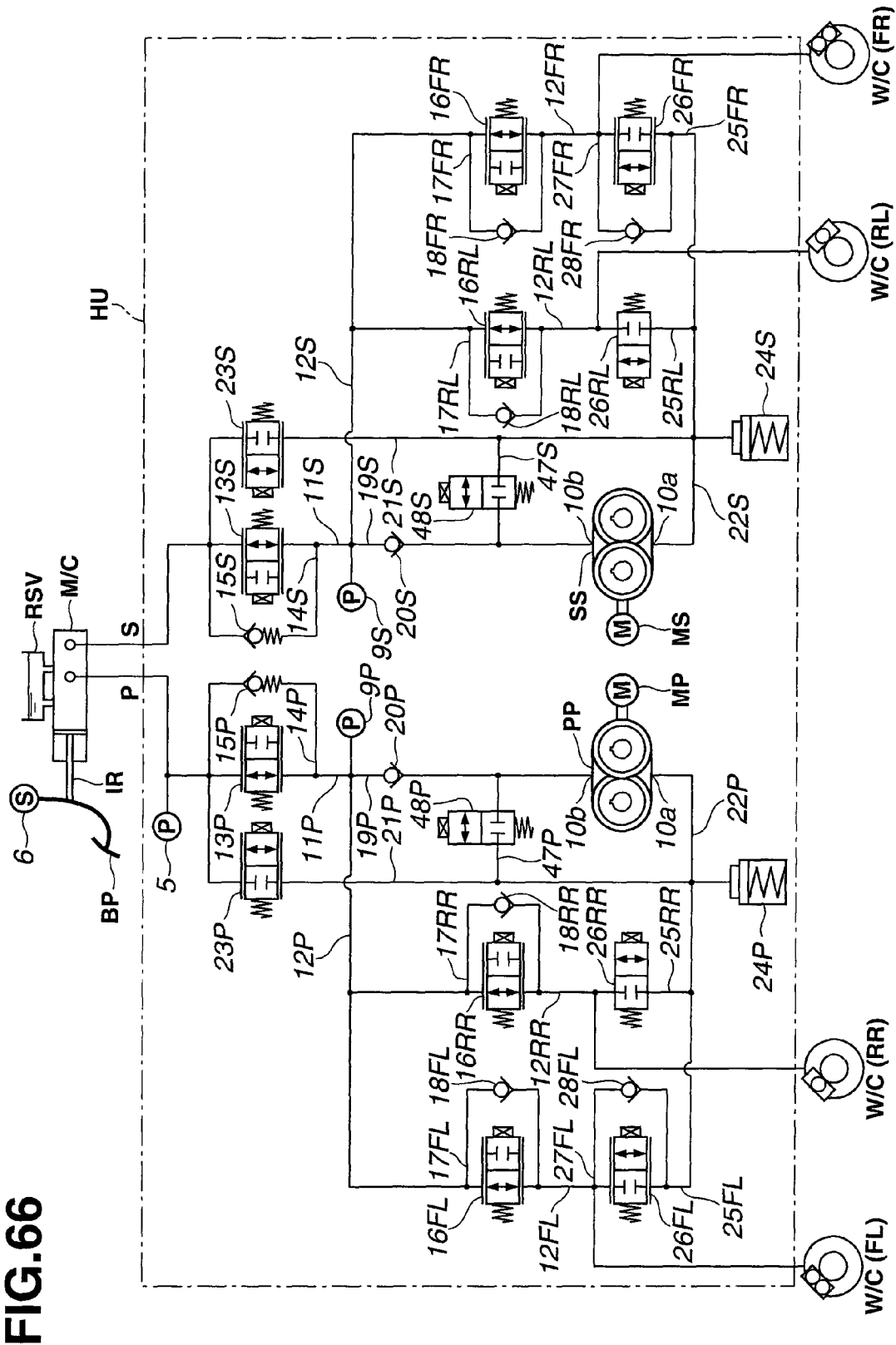
FIG. 66 is a schematic diagram showing a hydraulic circuit of a brake control apparatus according to a fifth embodiment of the present invention.

FIG. 66 schematically shows a hydraulic circuit of a brake control apparatus according to a fifth embodiment of the present invention. In the fifth embodiment, hydraulic pressure control unit HU is provided with a circulating passage 47 and a flow-switching valve 48 which replace pump suction shut-off valve 29 in the hydraulic circuit shown in FIG. 2. Circulating passage 47 hydraulically connects the discharge side of pump P (fluid passage 19) and the suction side of pump P (fluid passage 21). Flow-switching valve 48 is arranged in circulating passage 47, wherein flow-switching valve 48 is a normally closed electromagnetic valve. Flow-switching valve 48 is operated to implement the function of pump suction shut-off valve 29 of the first embodiment. In the fifth embodiment, the provision of flow-switching valve 48 serves to control the flow rate of brake fluid discharged by pump P, and thereby prevent an excess amount of brake fluid from flowing through the discharge-side valve 20, while pump P is maintained in operation. The feature that flow-switching valve 48 is a normally closed electromagnetic valve serves to reduce energy consumption because operation of flow-switching valve 48 is basically active only when pump P is active so that an excess supply of brake fluid can be produced. The brake control apparatus of this embodiment operates similarly and produces similar advantageous effects as in the first embodiment.

<Modifications> The present embodiments may be modified variously. For example, although the first embodiment is an example applied to an electric hybrid vehicle, the brake control apparatus described above may be applied to any other vehicle provided with a regenerative braking system, such as electric vehicles, for producing similar advantageous effects as in the present embodiments.

The entire contents of Japanese Patent Application 2011-132770 filed Jun. 15, 2011 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A brake control apparatus for a vehicle provided with a regenerative braking system, the brake control apparatus comprising:
   a braking operation detecting section configured to detect a condition of driver's braking operation;
   a first brake fluid passage hydraulically connecting a master cylinder to a wheel cylinder, wherein the master cylinder generates a brake fluid pressure in response to driver's braking operation, and wherein the brake fluid pressure acts on the wheel cylinder;
   a pump configured to suck brake fluid from the master cylinder, and provided with a discharge-side valve on a discharge side of the pump;
   a second brake fluid passage hydraulically connecting the discharge side of the pump to a first connecting portion of the first brake fluid passage;
   a third brake fluid passage hydraulically connecting a suction side of the pump to a second connecting portion of the first brake fluid passage, wherein the second connecting portion is between the master cylinder and the first connecting portion;
   an inflow valve disposed in a section of the first brake fluid passage between the wheel cylinder and the first connecting portion of the first brake fluid passage;
   a fourth brake fluid passage hydraulically connecting the suction side of the pump to a third connecting portion of the first brake fluid passage, wherein the third connecting portion is between the inflow valve and the wheel cylinder;
   an outflow valve disposed in the fourth brake fluid passage;
   a reservoir hydraulically connected to the third brake fluid passage, and hydraulically connected to a connecting portion of the fourth brake fluid passage, wherein the connecting portion of the fourth brake fluid passage is between the outflow valve and the suction side of the pump; and
   a pump discharge restricting section configured to restrict discharge of brake fluid through the discharge-side valve from the pump when the pump is being driven.

2. The brake control apparatus as claimed in claim 1, further comprising a brake fluid pressure control section configured to control the brake fluid pressure by operating at least one of the inflow valve, the outflow valve and the pump, based on the detected condition of driver's braking operation and a condition of brake regeneration of the regenerative braking system.

3. The brake control apparatus as claimed in claim 2, wherein the pump discharge restricting section includes a pump suction shut-off valve disposed in a section of the fourth brake fluid passage between the reservoir and the suction side of the pump.

4. The brake control apparatus as claimed in claim 3, wherein the brake fluid pressure control section is configured to drive the pump constantly while the braking operation detecting section is detecting presence of driver's braking operation.

5. The brake control apparatus as claimed in claim 4, wherein the brake fluid pressure control section is configured to operate the pump suction shut-off valve in a closing direction when the regenerative braking system is carrying out regenerative braking operation.

6. The brake control apparatus as claimed in claim 4, further comprising:
   a master cylinder condition detecting section configured to detect a condition of brake fluid pressure in the master cylinder; and
   a wheel cylinder condition detecting section configured to detect a condition of brake fluid pressure in the wheel cylinder;
   wherein the brake fluid pressure control section is configured to determine a target value of rotational speed of the pump based on the conditions detected by the braking operation detecting section, the master cylinder condition detecting section and the wheel cylinder condition detecting section.

7. The brake control apparatus as claimed in claim 1, further comprising:
- a gate-out valve disposed in a section of the first brake fluid passage between the first connecting portion and the second connecting portion;
- a gate-in valve disposed in the third brake fluid passage;
- a first pressure detecting section configured to detect a brake fluid pressure in a section of the first brake fluid passage between the gate-out valve and the master cylinder; and
- a brake fluid pressure control section;

wherein:
- the braking operation detecting section includes a stroke sensor configured to detect a brake pedal stroke; and
- the brake fluid pressure control section is configured to bring the detected brake pedal stroke and the detected brake fluid pressure into a preset relationship by regulating openings of the gate-in valve and the gate-out valve.

8. The brake control apparatus as claimed in claim 7, further comprising a second pressure detecting section configured to detect a second brake fluid pressure in a section of the second brake fluid passage, wherein:
- the pump discharge restricting section includes a pump suction shut-off valve disposed in a section of the fourth brake fluid passage between the reservoir and the suction side of the pump; and
- the brake fluid pressure control section is configured to operate at least one of the pump suction shut-off valve and the pump based on the detected second brake fluid pressure.

9. The brake control apparatus as claimed in claim 7, further comprising a relief valve arranged in parallel with the gate-out valve, and configured to allow brake fluid to flow from the master cylinder under pressure above a preset threshold pressure, wherein the threshold pressure is substantially equivalent to a component of braking force produced by the regenerative braking system.

10. The brake control apparatus as claimed in claim 1, further comprising a check valve arranged in parallel with the outflow valve, and configured to allow brake fluid to flow from the reservoir.

11. The brake control apparatus as claimed in claim 7, further comprising a check valve arranged in parallel with the gate-in valve, and configured to allow brake fluid to flow from the reservoir.

12. The brake control apparatus as claimed in claim 1, further comprising a circulating passage hydraulically connecting the suction side of the pump to a section of the second brake fluid passage between the discharge-side valve and the discharge side of the pump,
- wherein the pump discharge restricting section includes a flow-switching valve disposed in the circulating passage.

13. The brake control apparatus as claimed in claim 12, wherein the flow-switching valve is a normally closed electromagnetic valve, and is configured to be opened to restrict discharge of brake fluid through the discharge-side valve from the pump.

14. The brake control apparatus as claimed in claim 1, further comprising a fifth brake fluid passage hydraulically connecting the second brake fluid passage to the third brake fluid passage,
- wherein the pump discharge restricting section includes a flow-switching valve disposed in the fifth brake fluid passage.

15. The brake control apparatus as claimed in claim 14, wherein the flow-switching valve is a normally closed electromagnetic valve, and is configured to be opened to restrict discharge of brake fluid through the discharge-side valve from the pump.

16. The brake control apparatus as claimed in claim 1, further comprising a motor configured to drive the pump, wherein:
- the vehicle includes a first line section and a second line section, wherein a left front road wheel and a right rear road wheel belong to the first line section, and wherein a right front road wheel and a left rear road wheel belong to the second line section; and
- each of the first and second line sections includes an independent set of the first, second, third, fourth and fifth brake fluid passages, the pump, the discharge-side valve, the inflow valve, the outflow valve, the reservoir, and the pump discharge restricting section.

17. The brake control apparatus as claimed in claim 16, wherein each of the first and second line sections includes an independent set of a plurality of the pumps arranged in parallel with each other.

* * * * *